United States Patent
Nakazawa et al.

(10) Patent No.: US 11,435,502 B2
(45) Date of Patent: Sep. 6, 2022

(54) OPTICAL FILM AND FRONT PANEL OF IMAGE DISPLAY APPARATUS, IMAGE DISPLAY APPARATUS, MIRROR WITH IMAGE DISPLAY FUNCTION, RESISTIVE FILM-TYPE TOUCH PANEL, AND CAPACITANCE-TYPE TOUCH PANEL HAVING OPTICAL FILM

(71) Applicant: FUJIFILM Corporation, Tokyo (JP)

(72) Inventors: Yuki Nakazawa, Kanagawa (JP); Yutaka Nozoe, Kanagawa (JP); Keigo Ueki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 587 days.

(21) Appl. No.: 16/522,030

(22) Filed: Jul. 25, 2019

(65) Prior Publication Data

US 2019/0346592 A1    Nov. 14, 2019

Related U.S. Application Data

(63) Continuation of application No. PCT/JP2018/010946, filed on Mar. 20, 2018.

(30) Foreign Application Priority Data

Mar. 30, 2017  (JP) .............................. JP2017-067156

(51) Int. Cl.
   *G02B 1/14*        (2015.01)
   *B32B 23/04*       (2006.01)
   (Continued)

(52) U.S. Cl.
   CPC ................ *G02B 1/14* (2015.01); *B32B 23/04* (2013.01); *B32B 23/20* (2013.01);
   (Continued)

(58) Field of Classification Search
   None
   See application file for complete search history.

(56) References Cited

U.S. PATENT DOCUMENTS 7,201,949 B2 *  4/2007  Houghtaling .......... G02B 1/113
                                              428/323
7,248,395 B2 *  7/2007  Komatsu ............. G02F 1/16757
                                              345/107
(Continued)

FOREIGN PATENT DOCUMENTS

JP      10-44292 A      2/1998
JP    2001-100042 A     4/2001
(Continued)

OTHER PUBLICATIONS

International Search Report Issued in PCT/JP2018/010946 dated Jun. 19, 2018.
(Continued)

*Primary Examiner* — Duane N Taylor, Jr.
(74) *Attorney, Agent, or Firm* — Edwards Neils LLC; Jean C. Edwards, Esq.

(57) ABSTRACT

An optical film, a front panel of an image display apparatus, the image display apparatus, a mirror with an image display function, a resistive film-type touch panel, and a capacitance-type touch panel which have the optical film can be provided. The optical film includes at least a first resin film, an adhesive layer disposed on one side of the first resin film, and a second resin film disposed on the adhesive layer, and the adhesive layer contains a polysaccharide.

12 Claims, 3 Drawing Sheets

(51) Int. Cl.
*B32B 23/20* (2006.01)
*G06F 3/044* (2006.01)
*G06F 3/045* (2006.01)

(52) U.S. Cl.
CPC ..... *B32B 2457/208* (2013.01); *B32B 2551/00* (2013.01); *G06F 3/044* (2013.01); *G06F 3/045* (2013.01)

(56) References Cited

U.S. PATENT DOCUMENTS

| | | | | |
|---|---|---|---|---|
| 7,907,237 | B2* | 3/2011 | Maeda | G02F 1/133514 |
| | | | | 349/110 |
| 8,105,126 | B2* | 1/2012 | Jiang | G06F 3/045 |
| | | | | 445/24 |
| 8,551,612 | B2* | 10/2013 | Katou | G02B 5/3033 |
| | | | | 428/323 |
| 8,947,984 | B2* | 2/2015 | Hattori | G11B 5/7334 |
| | | | | 369/13.41 |
| 9,514,776 | B2* | 12/2016 | Hattori | H01F 1/11 |
| 9,840,651 | B2* | 12/2017 | Hui | C09J 9/02 |
| 2009/0257003 | A1* | 10/2009 | Yoshihara | G02B 5/3083 |
| | | | | 359/507 |
| 2014/0145976 | A1* | 5/2014 | Tang | G06F 3/0418 |
| | | | | 345/173 |
| 2016/0026039 | A1* | 1/2016 | Sakai | G02F 1/133555 |
| | | | | 345/1.3 |

FOREIGN PATENT DOCUMENTS

| | | |
|---|---|---|
| JP | 2008-249901 A1 | 10/2008 |
| JP | 2014-148078 A | 8/2014 |
| WO | 2014/112525 A1 | 7/2014 |
| WO | 2016/167149 A1 | 10/2016 |

OTHER PUBLICATIONS

Written Opinion Issued in PCT/JP2018/010946 dated Jun. 19, 2018.
International Preliminary Report on Patentability Issued in PCT/JP2018/010946 dated Oct. 1, 2019.
Office Action, issued by the Japanese Patent office dated Dec. 10, 2019, in connection with corresponding Japanese Patent Application No. 2019-509373.

* cited by examiner

OPTICAL FILM AND FRONT PANEL OF IMAGE DISPLAY APPARATUS, IMAGE DISPLAY APPARATUS, MIRROR WITH IMAGE DISPLAY FUNCTION, RESISTIVE FILM-TYPE TOUCH PANEL, AND CAPACITANCE-TYPE TOUCH PANEL HAVING OPTICAL FILM

CROSS-REFERENCE TO RELATED APPLICATIONS

This application is a Continuation of PCT International Application No. PCT/JP2018/010946, filed on Mar. 20, 2018, which was published under PCT Article 21(2) in Japanese, and which claims priority under 35 U.S.C. § 119(a) to Japanese Patent Application No. 2017-067156, filed on Mar. 30, 2017. The above applications are hereby expressly incorporated by reference, in their entirety, into the present application.

BACKGROUND OF THE INVENTION

1. Field of the Invention

The present invention relates to an optical film and a front panel of an image display apparatus, the image display apparatus, a mirror with an image display function, a resistive film-type touch panel, and a capacitance-type touch panel which have the optical film.

2. Description of the Related Art

In the related art, as an optical film for a front panel of an image display apparatus, particularly, a front panel of a touch panel and the like that is required to have high durability, glass such as chemically strengthened glass has been used. In recent years, various functionalities (light-weightness, toughness (breakproofness), thin film workability (capable of being thinned), and the like) of resin films have drawn attention, and it has been expected that the use of the resin films as substitute materials for glass could improve the functionality of optical films.

As the resin film of substitute materials for glass, for example, JP2014-148078A describes a transparent conductive laminate which has an easily adhesive layer on one side and a transparent conductive layer on the other side of a transparent film substrate, and is bonded to another film substrate through a transparent curing type adhesive layer on the easily adhesive layer. Further, it is described that the easily adhesive layer of the transparent conductive laminate is formed of a composition which contains a polymer component such as polyvinyl alcohol and which has a functional group capable of forming a crosslinked structure, and thus, adhesiveness to the transparent curing type adhesive layer is improved, and precipitation of an oligomer can be prevented even in case where the transparent conductive layer is formed by a process including heat treatment such as a sputtering.

SUMMARY OF THE INVENTION

The surface of a front panel of a touch panel or the like is struck with a stylus pen in everyday life. Therefore, in a case where a resin film is used in the front panel or the like, it is important for the resin film to fully satisfy keystroke durability which prevents the resin film from being broken or depressed no matter how many times the resin film is struck.

As a result of conducting a thorough examination, the inventors of the present invention have found that the keystroke durability can be improved by increasing the film thickness of the resin film. In addition, the inventors have also found that as the film thickness of the resin film increases, the problems such as smoothness deterioration, deformation of the resin film, and difficulty in peeling the thick resin film from a support at the time of manufacturing the resin film arise as well. Furthermore, it takes a long time to manufacture a resin film having a large film thickness, and particularly in a case where a solution film-forming method is adopted, the time required for a drying step for removing a residual solvent is increased. Therefore, problems occur in the manufacturing efficiency. In this way, it has been revealed that there is a so-called trade-off relationship between the keystroke durability of the resin film and the appearance or the manufacturing suitability (manufacturing efficiency) of the resin film.

As a result of conducting a thorough examination by the inventors of the present invention, the manufacturing suitability tends to be improved by adopting a method of preparing a sheet of thick optical film by bonding resin films to each other. On the other hand, it is difficult to obtain an optical film having sufficient keystroke durability in this method. In addition, as a new problem, it has been found that interference unevenness occurs by bonding resin films to each other.

The present invention has been made in consideration of the above problems, and an object of the present invention is to provide an optical film, in which the interference unevenness is sufficiently suppressed, and which is excellent in the keystroke durability and the manufacturing suitability, and a front panel of an image display apparatus, the image display apparatus, a mirror with an image display function, a resistive film-type touch panel, and a capacitance-type touch panel which have the optical film.

That is, the object was achieved by the following means.

(1)

An optical film comprising at least a first resin film an adhesive layer disposed on one side of the first resin film, and a second resin film disposed on the adhesive layer, in which the adhesive layer contains a polysaccharide.

(2)

The optical film according to (1), in which the polysaccharide is at least one selected from glycogen, amylose, cellulose, or pullulan.

(3)

The optical film according to (1) or (2), in which the polysaccharide is cellulose.

(4)

The optical film according to (3), in which the cellulose is a cellulose ether compound.

(5)

The optical film according to (4), in which the cellulose ether compound is a cellulose ether compound represented by Molecular formula (1),

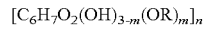  Molecular formula (1), in the formula, R represents *—$(R^1O)_{p1}$H, $R^1$ represents a hydrocarbon group, p1 is an integer of 1 to 15, * represents a binding site; and m is 0.8 to 3 and n is 20 to 2.000.

(6)

The optical film according to any one of (1) to (5), in which the first resin film and the second resin film are a cellulose ester resin film.

(7)

The optical film according to (6), in which the cellulose ester resin film is a cellulose acylate resin film.

(8)

A front panel of an image display apparatus comprising the optical film according to any one of (1) to (7).

(9)

An image display apparatus comprising the front panel according to (8) and an image display device.

(10)

The image display apparatus according to (9), in which the image display device is a liquid crystal display device.

(11)

The image display apparatus according to (9), in which the image display device is an organic electroluminescence display device.

(12)

The image display apparatus according to any one of (9) to (11), in which the image display device is an in-cell touch panel display device.

(13)

The image display apparatus according to any one of (9) to (11), in which the image display device is an on-cell touch panel display device.

(14)

A resistive film-type touch panel comprising the front panel according to (8).

(15)

A capacitance-type touch panel comprising the front panel according to (8).

(16)

A mirror with an image display function using the image display device according to any one of (9) to (13).

In the present specification, a range of numerical values described using "to" means a range including numerical values listed before and after "to" as an upper limit and a lower limit respectively.

In the present specification. "(meth) acrylate" is used to mean either or both of acrylate and methacrylate. Furthermore, "(meth) acryloyl group" is used to mean either or both of an acryloyl group and a meth acryloyl group. "(Meth) acryl" is used to mean either or both of acryl and meth acryl.

Regarding each component described in the present specification, only one kind of component may be used, or two or more kinds of components having different structures may be used in combination. In a case where two or more kinds of components having different structures are used in combination, the content of each component means the total content thereof.

In the present specification, representations of compounds include those in which a part of the structure is changed within a range that does not impairs the intended effect.

Moreover, the compound which does not specify substitution or non-substitution includes the thing which has arbitrary substituents within a range that does not impairs the intended effect. The same applies to substituents, linking groups, ring structures and the like (hereinafter, referred to as substituents and the like).

In the present specification, in a case where there are a plurality of substituents and the like represented by a specific code, or in a case where the plurality of substituents and the like are simultaneously defined, unless otherwise specified, each of the substituents and the like may be the same as or different from each other. The same applies to the definition of the number of substituents and the like. In addition, in a case where a plurality of substituents and the like are close (especially, adjacent), unless otherwise specified, the plurality of substituents may be linked to each other to form a ring.

In the present invention, in a case where there are a plurality of repeating units represented by the same chemical structure in a polymer, each repeating unit present in the polymer may be the same as or different from each other. The same applies to each group forming the repeating unit.

In addition, in a case where the number of carbon atoms of the group is limited, the number of carbon atoms of this group means the total number of carbon atoms including the substituent, unless otherwise specified.

In the present invention, in a case where a group can form a non-cyclic skeleton and a cyclic skeleton, this group includes a non-cyclic skeleton group and a cyclic skeleton group, unless otherwise specified. For example, alkyl group includes a linear alkyl group, a branched alkyl group, and a cyclic (cyclo) alkyl group. In a case where a group can form the cyclic skeleton, the lower limit of the number of atoms of the group forming the cyclic skeleton is equal to or greater than 3, preferably equal to or greater than 5, regardless of the lower limit of the number of atoms specifically described for this group.

In the present specification, unless otherwise specified, a weight-average molecular weight (Mw) can be measured by GPC as a molecular weight expressed in terms of polystyrene. At this time, by using HLC-8220 (manufactured by Tosoh Corporation) as a GPC apparatus and using G3000HXL+G2000HXL as columns, the weight-average molecular weight is measured by detecting RI at 23° C. and a flow rate of 1 mL/min. The eluent can be selected from tetrahydrofuran (THF), chloroform, N-methyl-2-pyrrolidone (NMP), and m-cresol/chloroform (manufactured by Shonan Wako Junyaku K.K.). As the eluent, THF can be used as long as it dissolves a sample.

In the present specification, the thickness, refractive index and a tensile modulus of each layer are measured by the methods described in examples. In the present invention, the refractive index means the refractive index at 25° C. of light having a wavelength of 589 nm, and the tensile modulus means the tensile modulus at 25° C.

The optical film according to the embodiment of the present invention can be suitability used as a front panel of the touch panel and the like, and can also be suitability used as the optical film such as a polarizing film, a phase difference film, or a brightness enhancement film for a liquid crystal display.

The optical film according to the embodiment of the present invention has the interference unevenness sufficiently suppressed, has excellent keystroke durability, can be suitably used as the front panel of the touch panel, and has excellent manufacturing suitability. Furthermore, the front panel of an image display apparatus, the image display apparatus, the mirror with an image display function, the resistive film-type touch panel, and the capacitance-type touch panel according to the embodiment of the present invention have the optical film according to the embodiment of the present invention, and show excellent keystroke durability and excellent manufacturing suitability by sufficiently suppressing the interference unevenness.

DESCRIPTION OF THE PREFERRED EMBODIMENTS

Preferred embodiments of the optical film according to the embodiment of the present invention will be described.

[Optical Film]

Figure 1:
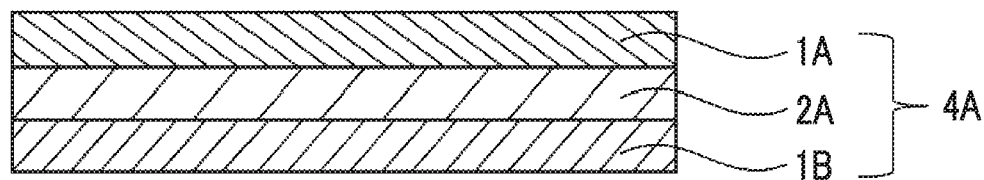
FIG. 1 is a vertical cross-sectional view showing the constitution of an optical film according to the embodiment of the present invention.

FIG. 1 shows a preferred embodiment of the optical film according to the embodiment of the present invention. An optical film 4A shown in FIG. 1 is an optical film formed by laminating at least a first resin film (A), an adhesive layer (B), and a second resin film (C) in this order (in FIG. 1, these are represented by references 1A, 2A, and 1B in this order). The above-mentioned adhesive layer (B) (hereinafter, also simply referred to as "adhesive layer") in the optical film contains a polysaccharide.

The optical film according to the embodiment of the present invention can realize sufficient suppression of the interference unevenness and excellent keystroke durability by having the above-described configuration. It is estimated that the reason why the interference unevenness can be sufficiently suppressed is that the refractive index of the adhesive layer becomes around 1.5 and a difference of refractive index between the layers of the optical film (the resin film and the adhesive layer) can be reduced by forming the adhesive layer using the polysaccharide. In addition, it is estimated that the reason why the excellent keystroke durability can be realized is that generally, an optical film having a resin film bonded to each other using the adhesive layer generates distortion on the adhesive surface in a case where the keystroke is repeated, but the optical film according to the embodiment of the present invention exhibits the desired strength and interlaminar adhesion formed by the interaction through a plurality of hydroxyl groups which the polysaccharide contained in the adhesive layer has and the generation of the distortion can be effectively suppressed. In addition, although the optical film according to the embodiment of the present invention is a laminate, the thickness of each film can be suppressed. Therefore, the smoothness of the optical film is improved and the manufacturing suitability is also excellent.

The resin film and the adhesive layer may be isotropy or anisotropic.

The optical film according to the embodiment of the present invention has at least three-layer structure in which the first resin film (A), the adhesive layer (B), and the second resin film (C) are laminated. Each of the first resin films (A) and (C) and the adhesive layer (B) may be constituted with a single layer or multiple layers.

(Thickness of Optical Film)

In view of the keystroke durability, the thickness of the optical film according to the embodiment of the present invention is preferably equal to or greater than 120 μm, more preferably equal to or greater than 150 μm, even more preferably equal to or greater than 180 μm, and still more preferably equal to or greater than 220 μm. The upper limit thereof is substantially equal to or smaller than 320 μm.

(Retardation in in-Plane Direction)

In view of reducing the interference unevenness, the retardation of the optical film in an in-plane direction at a wavelength of 550 nm is preferably smaller than 6,000 nm, more preferably equal to or smaller than 1,000 nm, even more preferably equal to or smaller than 500 nm, and particularly preferably equal to or smaller than 50 nm.

The phase difference (retardation) of the optical film in the in-plane direction is defined as below. Linear polarization is allowed to come into the optical film, and then the light passing through the optical film is decomposed into two linear polarizations polarized along a fast axis and a slow axis. At this time, a refractive index on the fast axis is represented by Nx, a refractive index on the slow axis is represented by Ny, and the thickness of the optical film is represented by d (unit: nm). From Nx, Ny, and d, R (unit: nm) defining the retardation is calculated by Equation (A).

$$R = d \times (Nx - Ny) \tag{A}$$

In the embodiment of the present invention and the present specification, the retardation in the in-plane direction at a wavelength of 550 nm is measured by allowing light having a wavelength of 550 nm to come into a film or layer, which is a measurement target, along a normal direction in KOBRA 21ADH (manufactured by Oji Scientific Instruments). At the time of selecting a measurement wavelength, by manually replacing the wavelength-selective filter or by converting the measured value by using a program or the like, the retardation can be measured. The retardation in the in-plane direction can also be measured using AxoScan (manufactured by Axometrics, Inc).

Hereinafter, the components and the preparation methods of the films and the layers constituting the optical film according to the embodiment of the present invention will be specifically described.

(1) Resin Film (Material of Resin Film)

The material of the resin film used in the embodiment of the present invention is not particularly limited.

The resin film may be, for example, an acrylic resin film, a polycarbonate (PC) resin film, a cellulose ester resin film such as a cellulose acylate resin film (for example, triacetyl cellulose (TAC) resin film), a polyethylene terephthalate (PET) resin film, a polyolefin resin film, a polyester resin film, and an acrylonitrile-butadiene-styrene copolymer film can be mentioned, and a film selected from the acrylic resin film, the cellulose ester resin film, the polyethylene terephthalate resin film and the polycarbonate resin film is preferable. In view of moisture permeability, the cellulose ester resin film is more preferable, and the cellulose acylate resin film is more preferable.

The acrylic resin film refers to a resin film of a polymer or a copolymer formed of one or more kinds of compounds selected from the group consisting of an acrylic acid ester and a methacrylic acid ester. Examples of the acrylic resin film include a polymethyl methacrylate resin (PMMA) film.

In view of increasing the tensile modulus, the weight-average molecular weight of the resin is preferably 10,000 to 1,000,000, and more preferably 100,000 to 1,000,000.

(Constitution of Resin Film)

Further, the configuration of a resin film is not limited, the resin film may be a single layer or a laminated film including two or more layers, and is preferably a laminated film including two or more layers. The number of layers laminated to constitute the laminated film is preferably 2 to 10, more preferably 2 to 5, and even more preferably 2 or 3. In a case where the resin film includes three or more layers, it is preferable that outer layers and layers (core layers and the like) other than the outer layers are films of different compositions. Furthermore, it is preferable that the outer layers are films of the same composition.

Specifically, examples thereof include films having laminated structures of TAC-a/TAC-b/TAC-a, acryl-a/PC/acryl-a, and PET-a/PET-b/PET-a, and a film constituted with one polycarbonate resin layer. Herein, the films (for example, TAC-a) marked with the same reference (a or b) are films of the same composition.

(Additives)

A resin film may contain additives in addition to the resin described above. Examples of the additives include inorganic particles, matt particles, an ultraviolet absorber, a fluorine-containing compound, a surface conditioner, a leveling agent, and the like described later regarding the hard coat layer which will be described later.

In a melt film-forming method which will be described later, a molten resin obtained by mixing and melting the aforementioned additives and resin together can be used for forming the resin film. In a solution film-forming method which will be described later, a dope solution obtained by mixing a solvent (description regarding a hard coat which will be described later can be adopted), the resin, and the above additives together can be used for forming the resin film.

(Tensile Modulus)

The tensile modulus of a resin film can be changed, for example, according to the type of resin constituting the resin film. Generally, in a case where either or both of the molecular weight and degree of crystallinity of the resin are increased, the tensile modulus tends to be increased. Furthermore, by stretching the resin film, the tensile modulus of the resin film in the stretching direction can be increased. In a case where the resin film is constituted with multiple layers, the tensile modulus means the tensile modulus as the resin film.

In view of further improving the keystroke durability, each of the tensile modulus EA of the first resin film (A) and the tensile modulus EC of the second resin film (C) is preferably equal to or higher than 2.0 GPa, more preferably equal to or higher than 2.5 GPa, even more preferably equal to or higher than 3.0 GPa, particularly preferably equal to or higher than 3.5 GPa, and most preferably equal to or higher than 4.0 GPa. The upper limit thereof is not particularly limited, but is substantially equal to or lower than 12.0 GPa.

In a case where the resin film is anisotropic, the tensile modulus thereof is calculated by the method explained in Examples which will be described later.

(Refractive Index)

The refractive index of a resin film can be changed, for example, according to the type of resin constituting the resin film. Generally, in a case where either or both of the molecular weight and degree of crystallinity of the resin are increased, the refractive index tends to be increased. Furthermore, by stretching the resin film, the refractive index of the resin film in the stretching direction can be increased. Even in a case where the resin film is constituted with multiple layers, the refractive index means the refractive index as the resin film.

In viewpoint of further suppressing interference unevenness, each of the refractive index nA of the first resin film (A) and the refractive index nC of the second resin film (C) is preferably 1.45 to 1.62, more preferably 1.47 to 1.60, and still more preferably 1.48 to 1.59. In a case where the resin film is anisotropic, the refractive index is calculated by the method described in examples which will be described later.

(Thickness)

In view of the keystroke durability and the manufacturing suitability, the thickness of each of the resin films is preferably 50 to 160 µm, more preferably 60 to 160 µm, even more preferably 80 to 160 µm, and particularly preferably 100 to 160 µm.

In view of the keystroke durability, the total thickness of the first resin film and the second resin film is preferably 100 to 320 µm, more preferably 160 to 320 µm, and even more preferably 200 to 320 µm.

The thickness of the resin film substantially does not change before and after the preparation of the optical film of the embodiment of the present invention.

(Easily Adhesive Layer)

The resin film used in the embodiment of the present invention may have an easily adhesive layer. For the easily adhesive layer, the details of an easily adhesive layer on a polarizer side and a manufacturing method of the easily adhesive layer on a polarizer side described in paragraphs 0098 to 0133 in JP2015-224267A can be combined with the embodiment of the present invention and incorporated into the present specification.

In this case, the easily adhesive layer is a layer constituting the resin film (A) or the resin film (C) in the optical film of the embodiment of the present invention, and the refractive index and the tensile modulus of the resin film (A) or the resin film (C) means the refractive index and the tensile modulus of the resin film (A) or the resin film (C) including the easily adhesive layer.

(Method for Forming Resin Film)

The resin film may be formed by any method. For example, a melt film-forming method and a solution film-forming method can be used.

<Melt Film-Forming Method and Smoothing>

In a case where the resin film is formed by a melt film-forming method, the method preferably includes a melting step of melting a resin by using an extruder, a step of extruding the molten resin in the form of a sheet from a die, and a step of forming the resin into a film. Depending on the material of the resin, a step of filtering the molten resin may be performed after the melting step, or the molten resin may be cooled at the time of being extruded in the form of a sheet.

Hereinafter, although a specific solution film forming method will be described, the embodiment of the present invention is not limited thereto.

[Method for Forming Resin Film]

The method for manufacturing the resin film includes a melting step of melting a resin by using an extruder, a filtering step of filtering the molten resin through a filtering apparatus equipped with a filter, a film forming step of forming a non-stretched resin film by extruding the filtered resin in the form of a sheet from a die and then bringing the resin into close contact with the surface of a cooling drum so as to cool and solidify the resin, and a stretching step of uniaxially or biaxially stretching the non-stretched resin film.

The resin film can be manufactured by the above constitution. It is preferable that the pore size of the filter used in the filtering step of the molten resin is equal to or smaller than 1 µm, because then foreign substances can be thoroughly removed. As a result, the surface roughness of the obtained resin film in the film width direction can be controlled.

Specifically, the method for forming the resin film can include the following steps.

<Melting Step>

The method for manufacturing the resin film includes a melting step of melting a resin by using an extruder.

It is preferable that a resin or a mixture of a resin and additives is dried until the moisture content becomes equal to or lower than 200 ppm and then melted by being introduced into a single screw (one screw) or double screw extruder. At this time, in order to inhibit the decomposition of the resin, it is also preferable to melt the resin or the mixture in nitrogen or a vacuum. Specifically, the melting can be performed according to JP4962661B by adopting the conditions described in paragraphs <0051> and <0052> in the same publication (paragraphs <0085> and <0086> in US2013/0100378). The details described in the publication are incorporated into the present specification.

As the extruder, a single screw kneading extruder is preferable.

Furthermore, in order to improve transport accuracy of the molten resin (melt), it is preferable to use a gear pump.

<Filtering Step>

The method for manufacturing the resin film includes a filtering step of filtering the molten resin through a filtering apparatus equipped with a filter. The pore size of the filter used in the filtering step is preferably equal to or smaller than 1 μm.

As the filtering apparatus used in the filtering step that includes a filter having a pore size within the above range, one set of filtering apparatus or two or more sets of filtering apparatuses may be provided.

<Film Forming Step>

The method for manufacturing the resin film includes a film forming step of forming a non-stretched resin film by extruding the filtered resin in the form of a sheet from a die and bringing the resin into close contact with the surface of a cooling drum so as to cool and solidify the resin.

In a case where the resin (melt containing the resin), which has been melted (and kneaded) and filtered, is extruded in the form of a sheet from a die, the resin may be extruded as a single layer or multiple layers. In a case where the resin is extruded as multiple layers, for example, a layer containing an ultraviolet absorber and a layer free of an ultraviolet absorber may be laminated. It is more preferable to adopt a three-layer constitution in which a layer containing an ultraviolet absorber becomes an inner layer, because such a constitution can inhibit a polarizer from deteriorating due to ultraviolet rays and can inhibit the bleed out of the ultraviolet absorber.

In a case where the resin film is manufactured by being extruded as multiple layers, the thickness of the inner layer of the resin film obtained with respect to the thickness of all layers is preferably equal to or higher than 50% and equal to or lower than 99%, more preferably equal to or higher than 60% and equal to or lower than 970%, and even more preferably equal to or higher than 70% and equal to or lower than 95%. These layers can be laminated by using a feed block die or a multi-manifold die.

The non-stretched resin film (original film) is preferably obtained by extruding the resin (melt containing the resin), which has been extruded in the form of a sheet from a die, on a cooling drum (casting drum) and cooling and solidifying the resin according to paragraph <0059> in JP2009-269301A.

In the method for manufacturing the resin film, the temperature of the resin extruded from a die is preferably equal to or higher than 280° C. and equal to or lower than 320° C., and more preferably equal to or higher than 285° C. and equal to or lower than 310° C. It is preferable that the temperature of the resin extruded from a die in the melting step is equal to or higher than 280° C., because then the occurrence of foreign substances is inhibited by the reduction of melting residues of the raw material resin. Furthermore, it is preferable that the temperature of the resin extruded from a die in the melting step is equal to or lower than 320° C., because then the occurrence of foreign substances is inhibited by suppressing the decomposition of the resin.

The temperature of the resin extruded from a die can be measured on the surface of the resin in a non-contact manner by using a radiation thermometer (manufactured by Hayashi Denko co ltd., model number: RT61-2, used at a radiation factor of 0.95).

In a case where the resin is brought into close contact with the surface of the cooling drum in the film forming step of the method for manufacturing the resin film, it is preferable to use a static electricity applying electrode. In a case where such an electrode is used, the resin can be strongly brought into close contact with the surface of the cooling drum such that the surface shape of the film is not destroyed.

In the method for manufacturing the resin film, at the time of bringing the resin into close contact with the surface of the cooling drum (at a point in time when the molten resin having extruded from a die contacts the cooling drum for the first time), the temperature of the resin is preferably equal to or higher than 280° C. In a case where the temperature of the resin is as described above, the electrical conductivity of the resin is improved, the resin can be strongly brought into close contact with the cooling drum by applying static electricity, and the destruction of the surface shape of the film can be inhibited.

The temperature of the resin at the time of bringing the resin into close contact with the surface of the cooling drum can be measured on the surface of the resin in a non-contact manner by using a radiation thermometer (manufactured by Hayashi Denko co ltd., model number: RT61-2, used at a radiation factor of 0.95).

<Stretching Step>

The method for manufacturing the resin film includes a stretching step of uniaxially or biaxially stretching the non-stretched resin film.

In a vertical stretching step (step of stretching the resin film in the same direction as the transport direction of the film), the resin film is preheated, and then in a state where the resin film stays hot, the resin film is stretched in the transport direction by a group of rollers having different circumferential speeds (that is, rollers having different transport speeds).

In the vertical stretching step, the preheating temperature is preferably equal to or higher than Tg−40° C. and equal to or lower than Tg+60° C., more preferably equal to or higher than Tg−20° C. and equal to or lower than Tg+40° C., and even more preferably equal to or higher than Tg and equal to or lower than Tg+30° C. with respect to the glass transition temperature (Tg) of the resin film. Furthermore, in the vertical stretching step, the stretching temperature is preferably equal to or higher than Tg and equal to or lower than Tg+60° C., more preferably Tg+2° C. and equal to or lower than Tg+40° C., and even more preferably equal to or higher than Tg+5° C. and equal to or lower than Tg+30° C. The stretching ratio in the vertical direction is preferably equal to or higher than 100% and equal to or lower than 250%, and more preferably equal to or higher than 110% and equal to or lower than 200%.

By the cross-direction stretching step (step of stretching the resin film in a direction perpendicular to the transport direction of the film) performed in addition to or instead of the vertical stretching step, the film is horizontally stretched in the width direction. In the cross-direction stretching step, for example, a tenter can be suitably used. By using the tenter, both ends of the resin film in the width direction are held by grips, and the resin film is stretched in the cross direction. By the cross-direction stretching, the tensile modulus of the resin film in the optical film can be increased.

The cross-direction stretching is preferably performed using a tenter. The stretching temperature is preferably equal to or higher than Tg and equal to or lower than Tg+60° C. temperature is preferably equal to or higher than Tg and equal to or lower than Tg+60° C., more preferably equal to or higher than Tg+2° C. and equal to or lower than Tg+40° C. and even more preferably equal to or higher than Tg+4° C. and equal to or lower than Tg+30° C. with respect to the glass transition temperature (Tg) of the resin film. The stretching ratio is preferably equal to or higher than 100% and equal to or lower than 500%, and more preferably equal to or higher than 110% and equal to or lower than 400%. It is also preferable to allow the resin film to relax in either or both of the vertical direction and the cross direction after the cross-direction stretching.

Moreover, it is preferable to make all the change according to the place of a width direction and a longitudinal direction of a thickness equal to or smaller than 10%, it is more preferable to make all the change equal to or smaller than 8%, it is still more preferable to make all the change equal to or smaller than 6%, it is particularly preferable to make all the change equal to or smaller than 4%, and it is most preferable to make all the change equal to or smaller than 2%.

The change in the thickness can be determined as below.

A 10 m (meter) sample is taken from the stretched resin film. Except for 20% of both ends of the resin film in the film width direction, from the central portion of the film, 50 spots are sampled at equal intervals in the width direction and the longitudinal direction respectively, and thicknesses thereof are measured.

An average thickness $Th_{TD-av}$, a maximum thickness $Th_{TD-max}$, and a minimum thickness $Th_{TD-min}$ in the width direction are determined, and the change in the thickness in the width direction is calculated by $(Th_{TD-max}-Th_{TD-min})/Th_{TD-av}\times 100$ [%].

Furthermore, an average thickness $Th_{MD-av}$, a maximum thickness $Th_{MD-max}$, and a minimum thickness $Th_{MD-min}$ in the longitudinal direction are determined, and the change in the thickness in the longitudinal direction is calculated by $(Th_{MD-max}-Th_{MD-min})/Th_{MD-av}\times 100$ [%].

By the aforementioned stretching step, the thickness accuracy of the resin film can be improved.

The resin film having undergone stretching can be wound up in the form of a roll by a winding step. At this time, the winding tension of the resin film is preferably set to be equal to or lower than 0.02 kg/mm².

Regarding the details of other conditions, for the melt film-forming method, the contents described in paragraphs <0134> to <0148> in JP2015-224267A can be combined with the embodiment of the present invention and incorporated into the present specification, and for the stretching step, the contents described in JP2007-137028A can be combined with the embodiment of the present invention and incorporated into the present specification.

<Solution Film-Forming Method and Smoothing>

In a case where the resin film is formed by a solution film-forming method, it is preferable that the method includes a step of forming a casting film by casting a dope solution on a casting band, a step of drying the casting film, and a step of stretching the casting film. Specifically, it is preferable to form the resin film by the method described in JP4889335B. In the embodiment of the present invention, it is preferable to adopt the following method.

For example, it is possible to adopt the method described in JP1999-123732A (JP-H11-123732A) in which a drying rate of the casting film is set to be equal to or lower than 300% by mass/min (=5% by mass/s) in terms of the content of a solvent based on the dry measure such that the film is gradually dried. Furthermore, for example, it is possible to adopt the method described in JP2003-276037A in which in a co-casting method of a casting film having a multilayer structure including a skin layer (outer layer) on both surfaces of a core layer as an interlayer, the viscosity of a dope solution for forming the core layer is increased such that the hardness of the casting film is secured while the viscosity of a dope for forming the outer layer is reduced. In addition, for examples, a method of forming a film on the surface of a casting film by rapidly drying the casting film and smoothing the surface shape by the leveling effect of the formed film, a method of stretching a casting film, and the like are also preferable.

In view of making it difficult for the optical film to bend and making the optical film exhibit further improved keystroke durability, it is preferable that the first resin film (A) and the second resin film (C) in the optical film according to the embodiment of the present invention are the same films.

"The same films" means that the resin films are constituted with the same resin material (for example, both the resin films are TAC films). Particularly, the first resin film (A) and the second resin film (C) are preferably constituted with resins having the same molecular weight, more preferably constituted with resins having the same molecular weight and the same degree of crystallinity, and even more preferably constituted with resins having the same molecular weight, the same degree of crystallinity, and the same stretching rate. Furthermore, it is more preferable that the first resin film (A) and the second resin film (C) have the same thickness in addition to the above.

"The same" does not mean "completely the same", and "substantially the same" is also included in the meaning of "the same". Specifically, "the same" films are films prepared under the same manufacturing conditions (conditions under which the films have the same film thickness, the same stretching rate, and the like), and errors occurring under these conditions are also included in the films.

That is, the difference between the tensile modulus EA of the first resin film (A) and the tensile modulus EC of the second resin film (C) is preferably small, and specifically, the difference is preferably equal to or lower than 4.0 GPa, more preferably equal to or lower than 3.0 GPa, even more preferably equal to or lower than 2.0 GPa, particularly preferably equal to or lower than 1.0 GPa.

In addition, the difference between the refractive index nA of the first resin film (A) and the refractive index nC of the second resin film (C) is preferably small, and specifically, the difference is preferably equal to or lower than 0.03, more preferably equal to or lower than 0.02, and even more preferably equal to or lower than 0.01. The lower limit is not particularly limited, and is equal to or higher than 0.00.

[Adhesive Layer]

(Components that can Constitute Adhesive Layer)

The adhesive layer is a layer that plays a role of bonding the resin films to each other. In the present invention, the adhesive layer bonds the first resin film and the second resin film to each other.

In the present invention, the adhesive layer contains a polysaccharide. The polysaccharide is a generic term of sugars which generate a plurality of monosaccharides (preferably 20 molecules or more) by hydrolysis, and, for example, starch (amylose, amylopectin), glycogen, cellulose, pullulan, dextrin, glucan, fructan, chitin, agarose, carrageenan, heparin, hyaluronic acid, pectin, xyloglucan, chitosan, chondroitin, xylan, lignin, glucomannan, galacturon, alginic acid, laminaran, dextran, curdlan, lentinan and xanthan gum are included, and but are not limited thereto. In addition, the above compounds include a derivative.

In the present invention, the polysaccharide is preferably at least any selected from glycogen, amylose, cellulose and pullulan, and more preferably cellulose.

In the present specification, in a case where it is simply referred to as "cellulose", it is meant to include, in addition to the cellulose itself, a cellulose derivative such as a cellulose ether compound and the cellulose ester compound, unless otherwise specified.

The cellulose ether compound is a compound in which at least a part of hydroxy groups contained in cellulose is etherified, and the cellulose ester compound is a compound in which at least a part of hydroxy groups contained in cellulose is esterified.

In the present invention, cellulose is preferably a cellulose ether compound in view of having a modulus of elasticity suitable for realizing excellent keystroke durability and exhibiting a preferable water solubility in the manufacturing process, and is more preferably cellulose ether compound represented by Molecular formula (1). The preferable water solubility in the manufacturing process means that in a case where the adhesive layer is formed by coating with an organic solvent, the resin film which is the base material is swollen at the time of drying, and the influence such as deterioration of smoothness is reduced.

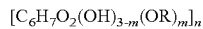

$[C_6H_7O_2(OH)_{3-m}(OR)_m]_n$      Molecular formula (1)

In the above formula. R represents a hydrocarbon group, m is 0.8 to 3, and n is 20 to 2,000.

The hydrocarbon group in R is preferably a saturated or unsaturated alkyl group or an aralkyl group.

The alkyl group and the aralkyl group may have a substituent at the terminal of the carbon chain, may have one or more —O-'s in the carbon chain, or may have both of them. As a substituent which may be at the terminal of the carbon chain, a carboxy group, a hydroxy group or an acyl group is preferable.

The unsubstituted alkyl group in R preferably has 1 to 15 carbon atoms, and more preferably 1 to 8 carbon atoms. Examples of the saturated alkyl group include methyl, ethyl, propyl, isopropyl, butyl, hexyl and the like, and examples of the unsaturated alkyl group include ethenyl, propenyl and the like.

The unsubstituted aralkyl group in R preferably has 7 to 21 carbon atoms, and more preferably has 7 to 14 carbon atoms. For example, benzyl and 2-phenylethyl can be mentioned.

The alkyl group having a carboxy group at the terminal of the carbon chain in R preferably has 1 to 15 carbon atoms, and more preferably has 1 to 8 carbon atoms. For example, carboxymethyl and carboxyethyl can be mentioned.

The alkyl group having a hydroxy group at the terminal of the carbon chain in R is preferably a group represented by $*-(R^1O)_{p1}H$.

Here, $R^1$ represents a hydrocarbon group, and the unsubstituted alkyl group in R is preferable. Since the chain length of the alkyl group affects the modulus of elasticity of the adhesive layer and the modulus of elasticity may decrease in a case where the chain length of the alkyl group is too long, the above preferable range of the number of carbon atoms of the alkyl group is preferable from the viewpoint of achieving excellent keystroke durability and particularly 1 to 5 carbon atoms are preferable.

p1 is an integer of 1 to 15, preferably an integer of 1 to 10, and more preferably an integer of 1 to 5 in view of the synthesis of the cellulose ether compound.

* indicates a binding site.

The alkyl group having an acyl group at the end of the carbon chain in R, is preferably a group represented by $*-(R^1O)_{p2}C(=O)R^2$.

Here, $R^1$ has the same meaning as $R^1$ in the alkyl group having a hydroxy group at the terminal of the above carbon chain. $R^2$ represents a hydrocarbon group, and is preferably an unsubstituted alkyl group or an unsubstituted aralkyl group in R.

p2 is an integer of 1 to 15, preferably 1 to 5.

* indicates a binding site.

m is the degree of substitution (DS), preferably 1.0 to 2.8, and more preferably 1.3 to 2.5. In the above preferred range, even in a case where boric acid is used as the additive, a cross-linked structure is formed by the non-substituted hydroxyl group (the group represented by $(OH)_{3-m}$ in Molecular formula (1)) and boric acid and thus, adhesion can be improved.

n is the degree of polymerization, 20 to 2.000, preferably 50 to 1,000, and more preferably 100 to 500.

The cellulose ether compound represented by Molecular formula (1) has a hydroxy group in the substituent R from the viewpoint of further improving adhesiveness between the resin film and the adhesive layer. That is, R is preferably $*-(R^1O)_{p1}H$.

The weight average molecular weight of cellulose is preferably 10,000 to 1,000,000, and more preferably 50,000 to 1,000,000.

The following compounds may be mentioned as specific cellulose derivatives.

[Cellulose Ester Compound]

Monoacetyl cellulose, and diacetyl cellulose

[Cellulose Ether Compound]

Methyl cellulose, ethyl cellulose, and carboxymethyl cellulose (Cellulose Ether Compound Having a Hydroxy Group)

Hydroxyethyl cellulose, hydroxypropyl cellulose, hydroxybutyl cellulose, hydroxyethyl methyl cellulose, hydroxyethyl ethyl cellulose, hydroxyethyl propyl cellulose, methyl ethyl hydroxyethyl cellulose, hydroxyethyl allyl cellulose, hydroxyethyl benzyl cellulose, hydroxypropyl methyl cellulose, hydroxypropyl ethyl cellulose, hydroxypropyl propyl cellulose, hydroxypropyl allyl cellulose, hydroxypropyl benzyl cellulose, hydroxybutyl methyl cellulose, hydroxybutyl ethyl cellulose, hydroxybutyl propyl cellulose, methyl ethyl hydroxybutyl cellulose, hydroxybutyl allyl cellulose, and hydroxyethyl benzyl cellulose (Cellulose Ether Compound Having Acyl Group)

Acetoxy ethyl methyl ethyl cellulose, acetoxy ethyl methyl propyl cellulose, acetoxy ethyl methyl isopropyl cellulose, acetoxy ethyl methyl hexyl cellulose, acetoxy ethyl methyl benzyl cellulose, propionyl oxy ethyl methyl ethyl cellulose, propionyl oxy ethyl methyl propyl cellulose, propionyl oxy ethyl methyl isopropyl cellulose, propionyl oxy ethyl methyl hexyl cellulose, propionyl oxy ethyl methyl benzyl cellulose, butyryl oxy ethyl methyl ethyl cellulose, butyryl oxy ethyl methyl propyl cellulose, butyryl oxy ethyl methyl isopropyl cellulose, butyryl oxy ethyl methyl hexyl cellulose, butyryl oxy ethyl methyl benzyl cellulose, hexanoyl oxy ethyl methyl ethyl cellulose, hexanoyl oxy ethyl methyl propyl cellulose, hexanoyl oxy ethyl methyl isopropyl cellulose, hexanoyl oxy ethyl methyl hexyl cellulose, hexanoyl oxy ethyl methyl benzyl cellulose, benzoyl oxy ethyl methyl ethyl cellulose, benzoyl oxy ethyl methyl propyl cellulose, benzoyl oxy ethyl methyl isopropyl cellulose, benzoyl oxy ethyl methyl hexyl cellulose, benzoyl oxy ethyl methyl benzyl cellulose, acetoxy propyl methyl ethyl cellulose, acetoxy propyl methyl propyl cellulose, acetoxy propyl methyl isopropyl cellulose, acetoxy propyl methyl hexyl cellulose, acetoxy propyl methyl benzyl cellulose, propionyl oxy propyl methyl ethyl cellulose, propionyl oxy propyl methyl propyl cellulose, propionyl oxy propyl methyl isopropyl cellulose, propionyl oxy propyl methyl hexyl cellulose, propionyl oxy propyl methyl benzyl cellulose, butyryl oxy propyl methyl ethyl cellulose, butyryl oxy propyl methyl propyl cellulose, butyryl oxy propyl methyl isopropyl cellulose, butyryl oxy propyl methyl hexyl cellulose, butyryl oxy propyl methyl benzyl cellulose, hexanoyl oxy propyl methyl ethyl cellulose, hexanoyl oxy propyl methyl propyl cellulose, hexanoyl oxy propyl methyl isopropyl cellulose, hexanoyl oxy propyl methyl hexyl cellulose, hexanoyl oxy propyl methyl benzyl cellulose, benzoyl oxy propyl methyl ethyl cellulose, benzoyl oxy propyl methyl propyl cellulose, benzoyl oxy propyl methyl isopropyl cellulose, benzoyl oxy propyl methyl hexyl cellulose, benzoyl oxy propyl methyl benzyl cellulose acetoxy butyl methyl ethyl cellulose, acetoxy butyl methyl propyl cellulose, acetoxy butyl methyl isopropyl cellulose, acetoxy butyl methyl hexyl cellulose, acetoxy butyl methyl benzyl cellulose, propionyl oxy butyl methyl ethyl cellulose, propionyl oxy butyl methyl propyl cellulose, propionyl oxy butyl methyl isopropyl cellulose, propionyl oxy butyl methyl hexyl cellulose, propionyl oxy butyl methyl benzyl cellulose, butyryl oxy butyl methyl ethyl cellulose, butyryl oxy butyl methyl propyl cellulose, butyryl oxy butyl methyl isopropyl cellulose, butyryl oxy butyl methyl hexyl cellulose, butyryl oxy butyl methyl benzyl cellulose, hexanoyl oxy butyl methyl ethyl cellulose, hexanoyl oxy butyl methyl propyl cellulose, hexanoyl oxy butyl methyl isopropyl cellulose, hexanoyl oxy butyl methyl hexyl cellulose, hexanoyl oxy butyl methyl benzyl cellulose, benzoyl oxy butyl methyl ethyl cellulose, benzoyl oxy butyl methyl propyl cellulose, benzoyl oxy butyl methyl isopropyl cellulose, benzoyl oxy butyl methyl hexyl cellulose, and benzoyl oxy butyl methyl benzyl cellulose (Method of Synthesizing Cellulose Derivative)

The above-mentioned cellulose derivative can be synthesized by the reaction of the hydroxy group of cellulose with a compound capable of reacting with the hydroxy group with reference to the description in JP1984-075902A (JP-S59-075902A) and JP2003-171401A.

For example, a cellulose ether derivative can be synthesized by extending side chains by a polymerization reaction to produce polyether from cellulose. In a case of hydroxy ethyl cellulose, as shown below, it can be synthesized by the reaction of cellulose and ethylene oxide. In this case, the hydroxy group of the side chain of cellulose may have a repeating unit.

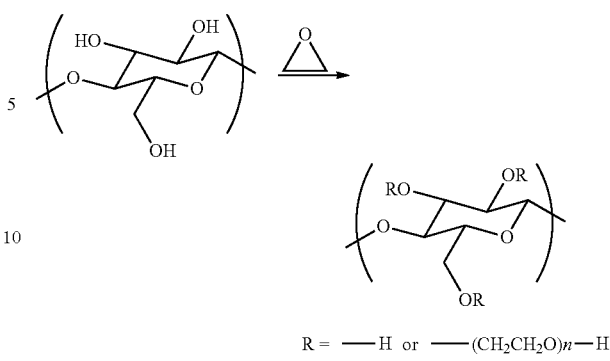

$R = $ ——H or ——$(CH_2CH_2O)n$—H

The content of the above-described polysaccharide in a total solid content which constitutes an adhesive layer, is preferably equal to or higher than 50% by mass, more preferably equal to or higher than 70% by mass, even more preferably equal to or higher than 80% by mass.

It is preferable that the adhesive layer is formed by using a composition that contains the above-mentioned polysaccharide, or a composition (hereinafter, referred to as "composition for forming adhesive layer") that contains a component (hereinafter, referred to as "adhesive") which exhibits adhesiveness by drying or reaction in addition to the above-mentioned polysaccharide. For example, an adhesive layer formed by using a composition containing a component expressing adhesiveness through a curing reaction (hereinafter, referred to as "curable composition") is a cured layer formed by curing the curable composition.

As the above-described adhesive, a resin can be used. In an aspect, the adhesive layer can be a layer in which a proportion of the polysaccharide and the resin is equal to or higher than 50% by mass and preferably equal to or higher than 70% by mass. As the resin, a single resin or a mixture of a plurality of resins may be used. In a case where the resin mixture is used, the above-mentioned proportion of the resin refers to the proportion of the resin mixture. Examples of the resin mixture include a mixture of a certain resin and a resin having a structure established by partially modifying the certain resin, a resin mixture obtained by reacting different polymerizable compounds, and the like.

As the adhesive, it is possible to use any adhesive having appropriate properties, form, and adhesion mechanism. Specifically, examples of the adhesive include a water-soluble adhesive, an ultraviolet curable type adhesive, an emulsion-type adhesive, a latex-type adhesive, a mastic adhesive, a multi-layered adhesive, a paste-like adhesive, a foaming adhesive, a supported film adhesive, a thermoplastic adhesive, a hot-melt adhesive, a thermally solidified adhesive, a thermally activated adhesive, a heat-seal adhesive, a thermosetting adhesive, a contact-type adhesive, a pressure-sensitive adhesive, a polymerizable adhesive, a solvent-type adhesive, a solvent-activated adhesive, and the like. As the adhesive, a water-soluble adhesive and an ultraviolet curable type adhesive are preferable. Among these, a water-soluble adhesive is preferably used, because this adhesive is excellent in transparency, adhesiveness, workability, product quality, and economic feasibility.

The water-soluble adhesive can contain a natural or synthetic water-soluble component such as a protein, or a synthetic resin. Examples of the synthetic resin include a resol resin, a urea resin, a melamine resin, a polyethylene oxide resin, a polyacrylamide resin, a polyvinyl pyrrolidone resin, a polyacrylic acid ester resin, a polymethacrylic acid ester resin, a polyvinyl alcohol resin, and a polyacrylic resin. Among these, a water-soluble adhesive containing a polyvinyl alcohol resin is preferable, because this adhesive exhibits excellent adhesiveness at the time of bonding the resin films to each other. That is, it is preferable that the adhesive layer in the embodiment of the present invention contains a polyvinyl alcohol resin.

In view of increasing the tensile modulus, the weight-average molecular weight of the resin is preferably equal to or greater than 1,000, and more preferably equal to or greater than 10,000. The upper limit thereof is not particularly limited, but is substantially equal to or lower than 1,000,000.

Examples of the components that can be optionally incorporated into the composition containing the above-mentioned polysaccharide and the like, include a crosslinking agent (boric acid, Safelink SPM-01 (trade name, manufactured by Nippon Kasei Chemical Co., Ltd), and the like), and a durability improving agent (calcium iodide or the like).

(Tensile Modulus)

The tensile modulus of the adhesive layer (B) can be changed, for example, according to the type of resin constituting the adhesive layer. Generally, in a case where the molecular weight or the degree of crystallinity of the resin is increased, the tensile modulus tends to be increased. Furthermore, in a case where the adhesive layer has a crosslinking group, a degree of crosslinking of the adhesive layer can be improved by the addition of a crosslinking agent or the like, and hence the tensile modulus can be increased. In addition, in a case where the adhesive layer contains a polymerizable composition, by the reduction of a polymerizable group equivalent of a compound having a polymerizable group (a value obtained by dividing molecular weight of compound by total number of polymerizable groups contained in compound), the improvement of a polymerization rate of the adhesive layer, the addition of a highly elastic substance (for example, inorganic particles and the like) to the adhesive layer, the addition of a compound having a rigid molecular structure (for example, an adamantane skeleton), and the like, the tensile modulus of the adhesive layer tends to be increased.

In view of further improving the keystroke durability, the tensile modulus EB of the adhesive layer (B) is preferably equal to or higher than 2.0 GPa, more preferably equal to or higher than 2.5 GPa, even more preferably equal to or higher than 3.0 GPa, still more preferably equal to or higher than 3.5 GPa, even more preferably equal to or higher than 4.0 GPa, particularly preferably equal to or higher than 4.5 GPa, and most preferably equal to or higher than 5.0 GPa. The upper limit thereof is not particularly limited, but is substantially equal to or lower than 12.0 GPa.

In addition, the modulus of an adhesive layer can be tested and calculated by the method similar to the tensile modulus of the above-described resin film using the sample of the adhesive layer produced using the solution for forming an adhesive layer.

(Refractive Index)

The refractive index of the adhesive layer (B) can be changed, for example, according to the type of resin constituting the adhesive layer. Generally, in a case where the molecular weight or the degree of crystallinity of the resin is increased, the refractive index tends to be increased. In addition, the refractive index can be adjusted by adding fine particles as a component of the adhesive layer.

The refractive index nB of the adhesive layer (B) is preferably 1.45 to 1.62, independently of each other, from the viewpoint of further suppressing interference unevenness, more preferably 1.47 to 1.60, and still more preferably 1.48 to 1.59.

In addition, the refractive index of an adhesive layer can be measured by the method similar to the refractive index of the above-described resin film using the sample of the adhesive layer of the 300 nm thickness produced using the solution for forming an adhesive layer.

(Thickness)

In view of bonding the first resin film and the second resin film to each other, the thickness of the adhesive layer is preferably equal to or greater than 10 nm. Furthermore, from the viewpoint of reducing the interference unevenness, the thickness of the adhesive layer is preferably 10 nm to 10 μm, more preferably 10 nm to 5 μm, and even more preferably 10 nm to 1 μm.

The adhesive layer can be formed by, for example, coating at least one surface of the resin film with a coating solution containing the polysaccharide and then drying the coating solution. As the method for preparing the coating solution, any of appropriate methods can be adopted. As the coating solution, for example, a commercial solution or dispersion liquid, a coating solution obtained by adding a solvent to a commercial solution or dispersion liquid, or a coating solution obtained by dissolving or dispersing solid contents such as the polysaccharide in various solvents may be used.

In an aspect, the adhesive layer can also be a cured layer obtained by curing an active energy ray-curable composition. It is preferable that the active energy ray-curable composition for forming the adhesive layer contains, as an active energy-curable component, a cationically polymerizable compound such as an epoxy-based compound, more specifically, an epoxy-based compound which does not have an aromatic ring in a molecule as described in JP2004-245925A. Examples of such an epoxy-based compound include a hydrogenated epoxy-based compound, which is obtained by performing nuclear hydrogenation of an aromatic polyhydroxy compound as a raw material of an aromatic epoxy-based compound that is represented by diglycidyl ether of bisphenol A and then performing glycidyl etherification of the nuclear-hydrogenated compound, an alicyclic epoxy-based compound having at least one epoxy group bonded to an alicyclic ring in a molecule, an aliphatic epoxy-based compound represented by glycidyl ether of an aliphatic polyhydroxy compound, and the like. The active energy ray-curable composition for forming the adhesive layer can also contain a cationically polymerizable compound represented by an epoxy-based compound, a polymerization initiator such as a photocation polymerization initiator which generates a cation species or a Lewis acid by being irradiated with active energy rays so as to initiate the polymerization of a cationically polymerizable compound, and a photobase generator which generates a base through light irradiation. The active energy ray-curable composition may further contain a thermal cationic polymerization initiator which initiates polymerization by heating and various additives such as a photosensitizer.

The optical film according to the embodiment of the present invention has at least two sheets of resin films and an adhesive layer for bonding the two sheets of resin films to each other and but, the resin films may additionally have an adhesive layer on a surface (the other surface) opposite to the surface provided with the adhesive layer. For example, on the other surface, a known polarizing plate protective film may be provided through the adhesive layer. In a case where both surfaces of the resin films are provided with the adhesive layer, the compositions for forming the adhesive layers may be the same as or different from each other. However, from the viewpoint of productivity, it is preferable that both surfaces are provided with the adhesive layers formed of the same composition. The surface to be provided with the adhesive layer may be subjected to a surface treatment such as a saponification treatment, a corona discharge treatment, or a plasma treatment before the adhesive layer is provided.

(Difference in tensile modulus between resin film and adhesive layer) The difference between the tensile modulus of the two resin films to be bonded and the tensile modulus of the adhesive layer is preferably equal to or lower than 4.0 GPa, more preferably equal to or lower than 3.5 GPa, even more preferably equal to or lower than 3.0 GPa, still more preferably equal to or lower than 2.5 GPa, even more preferably equal to or lower than 2.0 GPa, particularly preferably equal to or lower than 1.5 GPa, and the most preferably equal to or lower than 1.0 GPa independently from the viewpoint of further enhancing the keystroke durability.

(Difference in refractive index between resin film and adhesive layer) The difference between the refractive index of the two resin films to be bonded and the refractive index of the adhesive layer is preferably equal to or lower than 0.03, more preferably equal to or lower than 0.02, and further preferably equal to or lower than 0.01 independently from the viewpoint of further suppressing interference unevenness. The lower limit is not particularly limited, and is equal to or higher than 0.00.

For example, by performing an alkali saponification treatment as a saponification treatment on a cellulose ester resin film, the adhesiveness between the resin film and a polarizer material such as polyvinyl alcohol can be improved.

As the saponification method, it is possible to use the method described in paragraphs <0211> and <0212> in JP2007-086748A.

For example, the alkali saponification treatment for the cellulose ester resin film is preferably performed in a cycle in which the film surface is immersed in an alkaline solution, then neutralized using an acidic solution, rinsed with water, and dried. Examples of the alkaline solution include a potassium hydroxide solution and a sodium hydroxide solution. The concentration of hydroxide ions is preferably within a range of 0.1 to 5.0 mol/L, and more preferably within a range of 0.5 to 4.0 mol/L. The temperature of the alkaline solution is preferably within a range of room temperature to 90° C., and more preferably within a range of 40° C. to 70° C.

Instead of the alkali saponification treatment, the easy adhesive processing described in JP1994-094915A (JP-H06-094915A) or JP1994-118232A (JP-H06-118232A) may be performed.

As the method for bonding the resin films to each other by using the composition for forming the adhesive layer, known methods can be used.

For example, by allowing a belt-like long resin film (C) or (A), which moves in a horizontal or vertical direction, to approach one surface of the resin film (A) or (C) at the same movement speed, coating between the resin film (A) and the resin film (C) with a composition for forming the adhesive layer, which will become an adhesive layer (B), and pressing the resin films together by using pinch rolls, the resin film (A) and the resin film (C) can be bonded to each other. The composition for forming the adhesive layer used for coating may be diluted with a solvent such that the material constituting the adhesive layer (B) can coat the resin films. In this case, by drying the solvent in the adhesive layer (B), bonding of the resin film (A) and the resin film (C) is finished. At this time, the drying temperature depends on the type of solvent in the adhesive layer (B), the type of resin in the resin film (A) and the resin film (C), and the thickness of the resin film (A) and the resin film (C). For example, in a case where the solvent in the adhesive layer (B) is water, the drying temperature is preferably 30° C. to 85° C., and more preferably 45° C. to 80° C.

Furthermore, by coating either or both of the resin films (A) and (C) with a composition for forming the adhesive layer which will become the adhesive layer (B), performing a drying treatment so as to remove the solvent contained in the adhesive layer (B) and to form the adhesive layer (B) on the resin film, allowing the resin film (C) or (A) to approach to the surface, on which the adhesive layer (B) is formed, of the resin film (A) or (C), which moves in a horizontal or vertical direction and has the belt-like long adhesive layer (B) formed thereon, at the same movement speed, coating the portion between the resin film (A) and the resin film (C), on which the adhesive layer (B) is formed, with a solvent for swelling the adhesive layer (B), and pressing the resin film (A) and the resin film (C) together by using pinch rolls, the resin film (A) and the resin film (C) can be bonded to each other. In this case, by drying the solvent, bonding of the resin film (A) and the resin film (C) is finished. At this time, the drying temperature depends on the type of solvent, the type of resin in the resin film (A) and the resin film (C), and the thickness of the resin film (A) and the resin film (C). For example, in a case where the solvent is water, the drying temperature is preferably 30° C. to 85° C., and more preferably 45° C. to 80° C.

(3) Hard Coat Layer (HC Layer)

In the present invention, in view of surface hardness, it is preferable that at least one of the first resin film (A) or the second resin film (C) has a hard coat layer on a surface opposite to the surface provided with the adhesive layer (B). It is more preferable that either of the resin films has the hard coat layer. In this case, the hard coat layer is not regarded as a layer constituting the resin film (A) or (C) in the optical film according to the embodiment of the present invention, and the tensile modulus of the resin film (A) or (C) means a tensile modulus of the resin film (A) or (C) which does not include a hard coat layer. Examples of an aspect of the optical film having the HC layer include an optical film 4B according to the embodiment of the present invention shown in FIG. 2 in which a first resin film 1A, an adhesive layer 2A, and a second resin film 1B are laminated in this order, and a hard coat layer 3A is provided on a surface, which is opposite to the surface having the adhesive layer 2A, of the first resin film 1A. The HC layer may be constituted with any material as long as desired pencil hardness can be imparted to the optical film.

Even though the optical film according to the embodiment of the present invention has the HC layer on at least the first resin film (A) or the second resin film (C), the optical film brings about the effects of the embodiment of the present invention.

Hereinafter, a specific aspect of the HC layer will be described, but the present invention is not limited to the following aspect.

(HC Layer Obtained by Curing a Curable Composition for Forming Hard Coat Layer (HC Layer))

The HC layer used in the embodiment of the present invention can be obtained by curing a curable composition for forming an HC layer by irradiating the composition with active energy rays. In the present invention and in the present specification, "active energy rays" refer to ionizing radiation, and include X-rays, ultraviolet rays, visible light, infrared rays, electron beams, α rays, β rays. γ rays, and the like.

The curable composition for forming an HC layer used for forming the HC layer contains at least one kind of component (hereinafter, described as "active energy ray-curable component" as well) having a property of being cured by the irradiation of active energy rays. As the active energy ray-curable component, at least one kind of polymerizable compound is preferable which is selected from the group consisting of a radically polymerizable compound and a cationically polymerizable compound. In the present invention and in the present specification, "polymerizable compound" is a compound containing one or more polymerizable groups in one molecule. The polymerizable group is a group which can take a part in a polymerization reaction, and specific examples thereof include groups contained in various polymerizable compounds which will be described later. Examples of the polymerization reaction include various polymerization reactions such as radical polymerization, cationic polymerization, and anionic polymerization.

The HC layer used in the embodiment of the present invention may have a single layer structure or a laminated structure including two or more layers, and is preferably an HC layer having a single layer structure or a laminated structure including two or more layers that will be specifically described below.

1) Single Layer Structure

Examples of the preferred aspect of the curable composition for forming an HC layer having a single layer structure include, as a first aspect, a curable composition for forming an HC layer containing at least one kind of polymerizable compound having two or more ethyl enically unsaturated groups in one molecule. The ethyl enically unsaturated group refers to a functional group containing an ethyl enically unsaturated double bond. Furthermore, as a second aspect, a curable composition for forming an HC layer can be exemplified which contains at least one kind of radically polymerizable compound and at least one kind of cationically polymerizable compound.

Hereinafter, the curable composition for forming an HC layer of the first aspect will be described.

Examples of the polymerizable compound having two or more ethylenically unsaturated groups in one molecule that is contained in the curable composition for forming an HC layer of the first aspect include esters of a polyhydric alcohol and (meth)acrylic acid [for example, ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetra methacrylate, polyurethane polyacrylate, and polyester polyacrylate], ethylene oxide-modified products, polyethylene oxide-modified products, and caprolactone-modified products of the above esters, vinyl benzene and derivatives thereof [for example, 1,4-divinylbenzene, 4-vinyl benzoic acid-2-acryloyl ethyl ester, and 1,4-divinyl cyclohexanone], vinyl sulfone (for example, divinyl sulfone], acrylamide (for example, methylene bis acrylamide), and meth acrylamide.

The polymerizable compound having an ethylenically unsaturated group can be polymerized by the irradiation of active energy rays in the presence of a radical photopolymerization initiator. As a radical photopolymerization initiator, the radical photopolymerization initiator which will be described later is preferably applied. Further, in the content ratio of the radical photopolymerization initiator with respect to the polymerizable compound having an ethylenically unsaturated group in the curable composition for forming an HC layer, the description of the content ratio of the radical photopolymerization initiator with respect to the radically polymerizable compound which will be described later is preferably applied.

Next, the curable composition for forming an HC layer of the second aspect will be described.

The curable composition for forming an HC layer of the second aspect contains at least one kind of radically polymerizable compound and at least one kind of cationically polymerizable compound. As a preferred aspect, a curable composition for forming an HC layer can be exemplified which contains a radically polymerizable compound containing two or more radically polymerizable groups selected from the group consisting of an acryloyl group and a methacryloyl group in one molecule; and a cationically polymerizable compound.

It is preferable that the curable composition for forming an HC layer contains a radical photopolymerization initiator and a cationic photopolymerization initiator. As a preferred aspect of the second aspect, a curable composition for forming an HC layer can be exemplified which contains a radically polymerizable compound containing two or more radically polymerizable groups selected from the group consisting of an acryloyl group and a methacryloyl group in one molecule; a cationically polymerizable compound; a radical photopolymerization initiator; and a cationic photopolymerization initiator. Hereinafter, this aspect will be described as second aspect (1).

In the second aspect (1), it is preferable that the radically polymerizable compound contains two or more radically polymerizable groups in one molecule and one or more urethane bonds in one molecule.

As another preferred aspect of the second aspect, a curable composition for forming an HC layer can be exemplified which contains a) cationically polymerizable compound containing an alicyclic epoxy group and an ethylenically unsaturated group and having a molecular weight equal to or smaller than 300, in which the number of alicyclic epoxy groups contained in one molecule is 1 and the number of ethylenically unsaturated groups contained in one molecule is 1; b) radically polymerizable compound containing three or more ethylenically unsaturated groups in one molecule; c) radical polymerization initiator; and d) cationic polymerization initiator. Hereinafter, this aspect will be described as second aspect (2). Regarding the HC layer obtained by curing the curable composition for forming an HC layer of the second aspect (2), provided that the total solid content of the HC layer is equal to or greater than 100% by mass, the HC layer can contain a structure derived from a) in an amount of 15% to 70% by mass, a structure derived from b) in an amount of 25% to 80% by mass, c) in an amount of 0.1% to 10% by mass, and d) in an amount of 0.1% to 10% by mass. In an aspect, provided that the total solid content of the curable composition for forming an HC layer is 100% by mass, it is preferable that the curable composition for forming an HC layer of the second aspect (2) contains a) in an amount of 15% to 70% by mass. "Alicyclic epoxy group" refers to a monovalent functional group having a cyclic structure in which an epoxy ring and a saturated hydrocarbon-based ring are fused.

Hereinafter, each of the components which can be contained in the curable composition for forming an HC layer of the second aspect and preferably the second aspect (1) or the second aspect (2) will be more specifically described.

—Radically Polymerizable Compound—

The curable composition for forming an HC layer of the second aspect contains at least one kind of radically polymerizable compound and at least one kind of cationically polymerizable compound. The radically polymerizable compound in the second aspect (1) contains two or more radically polymerizable groups selected from the group consisting of an acryloyl group and a methacryloyl group in one molecule. The number of radically polymerizable groups selected from the group consisting of an acryloyl group and a methacryloyl group that can be contained in one molecule of the radically polymerizable compound is preferably 2 to 10 for example, and more preferably 2 to 6.

As the radically polymerizable compound, a radically polymerizable compound having a molecular weight equal to or greater than 200 and less than 1,000 is preferable. In the present invention and the present specification, for a multimer, "molecular weight" refers to a weight-average molecular weight which is measured by Gel Permeation Chromatography (GPC) and expressed in terms of polystyrene. As an example of specific measurement conditions of the weight-average molecular weight, the following measurement conditions can be exemplified.

GPC apparatus: HLC-8120 (manufactured by Tosoh Corporation)
Column: TSK gel Multipore HXL-M (manufactured by Tosoh Corporation, inner diameter of 7.8 mm×column length of 30.0 cm)
Eluent: tetrahydrofuran As described above, the radically polymerizable compound preferably contains one or more urethane bonds in one molecule. The number of urethane bonds contained in one molecule of the radically polymerizable compound is preferably equal to or greater than 1, more preferably equal to or greater than 2, and even more preferably 2 to 5. For example, the radically polymerizable compound can contain two urethane bonds in one molecule. In the radically polymerizable compound containing two urethane bonds in one molecule, the radically polymerizable group selected from the group consisting of an acryloyl group and a methacryloyl group may be bonded to one of the urethane bonds directly or through a linking group or may be bonded to each of the two urethane bonds directly or through a linking group. In an aspect, it is preferable that one or more radically polymerizable groups selected from the group consisting of an acryloyl group and a methacryloyl group are bonded to each of two urethane bonds bonded to each other through a linking group.

More specifically, in the radically polymerizable compound, a urethane bond and a radically polymerizable group selected from the group consisting of an acryloyl group and a methacryloyl group may be directly bonded to each other, or a linking group may be present between a urethane bond and a radically polymerizable group selected from the group consisting of an acryloyl group and a methacryloyl group. The linking group is not particularly limited, and examples thereof include a linear or branched saturated or unsaturated hydrocarbon group, a cyclic group, a group obtained by combining two or more of these groups, and the like. The number of carbon atoms on the hydrocarbon group is about 2 to 20 for example but is not particularly limited. As an example of a cyclic structure contained in the cyclic group, an aliphatic ring (such as a cyclohexane ring), an aromatic ring (such as a benzene ring or a naphthalene ring), or the like can be exemplified. These groups may be unsubstituted or may have a substituent. Unless otherwise specified, a group described in the present invention and in the present specification may have a substituent or may be unsubstituted. In a case where a certain group has a substituent, examples of the substituent include an alkyl group (such as an alkyl group having 1 to 6 carbon atoms), a hydroxyl group, an alkoxy group (such as an alkoxy group having 1 to 6 carbon atoms), a halogen atom (such as a fluorine atom, a chlorine atom, or a bromine atom), a cyano group, an amino group, a nitro group, an acyl group, a carboxy group, and the like.

The radically polymerizable compound described above can be synthesized by a known method. Moreover, it is also possible to obtain the radically polymerizable compound as a commercial product. As an example of the synthesis method, a method can be exemplified in which an alcohol, a polyol, and/or a hydroxyl group-containing compound such as hydroxyl group-containing (meth)acrylate are reacted with an isocyanate, and then, if necessary, a urethane compound obtained by the reaction is esterified using (meth) acrylic acid. Herein, "(meth) acrylic acid" means either or both of acrylic acid and methacrylic acid.

Examples of commercial products of the radically polymerizable compound containing one or more urethane bonds in one molecule include, but are not limited to, UA-306H, UA-3061, UA-306T, UA-510H, UF-8001G UA-101I, UA-101T, AT-600, AH-600, AI-600, BPZA-66, and BPZA-100 manufactured by KYOEISHA CHEMICAL Co., LTD., U-4HA, U-6HA, U-6LPA, UA-32P, U-15HA, and UA-1100H manufactured by SHIN-NAKAMURA CHEMICAL CO., LTD., SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B. SHIKOH UV-7461TE, SHIKOH UV-3000B, SHIKOH UV-3200B, SHIKOH UV-3210EA. SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA. In addition, SHIKOH UV-2750B manufactured by NIPPON GOHSEI, UL-503LN manufactured by KYOEISHA CHEMICAL Co. LTD., UNIDIC 17-806, UNIDIC 17-813, UNIDIC V-4030, and UNIDIC V-4000BA manufactured by DIC Corporation, EB-1290K manufactured by Daicel-UCB Company, Ltd., HI-COAP AU-2010 and HI-COAP AU-2020 manufactured by TOKUSHIKI Co., LTD., and the like.

As specific examples of the radically polymerizable compound containing one or more urethane bond in one molecule, example compounds A-1 to A-8 will be shown below, but the present invention is not limited to the following specific examples.

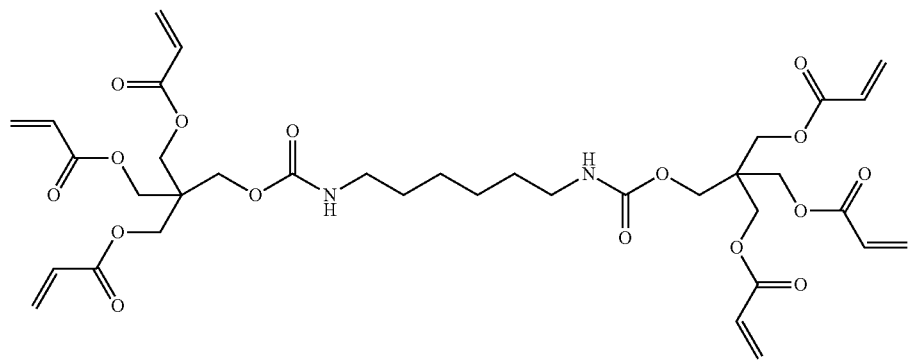
A-1
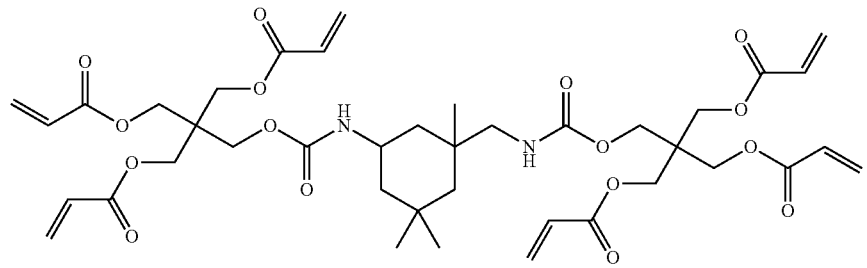
A-2
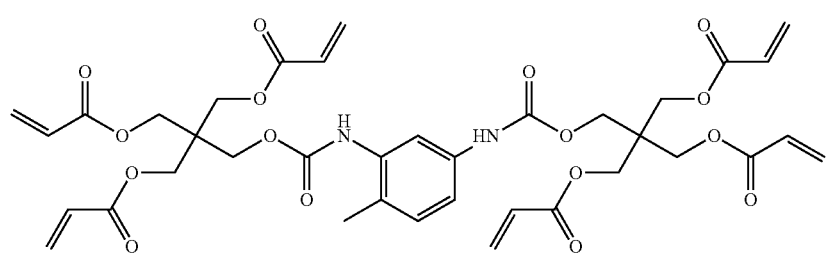
A-3
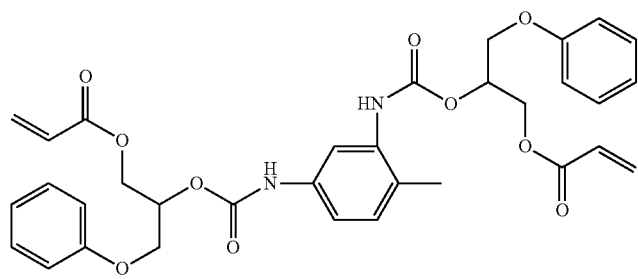
A-4
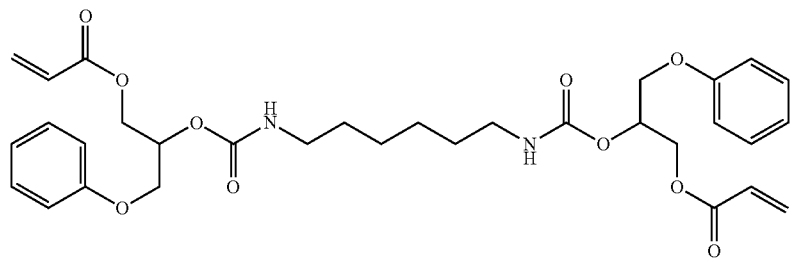
A-5

-continued

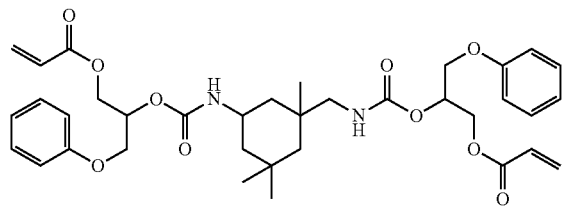
A-6

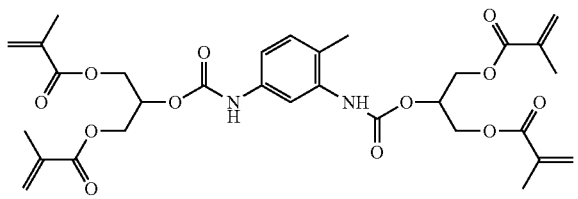
A-7

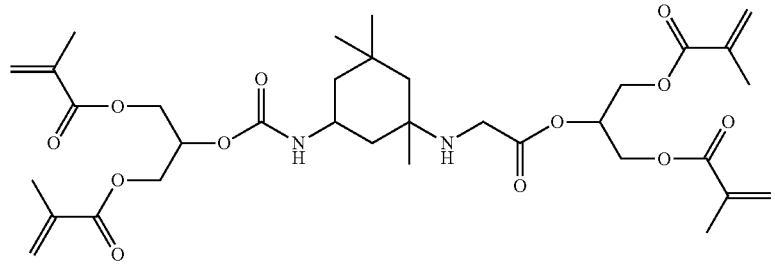
A-8

Hitherto, the radically polymerizable compound containing one or more urethane bonds in one molecule has been described. The radically polymerizable compound containing two or more radically polymerizable groups selected from the group consisting of an acryloyl group and a methacryloyl group in one molecule may not have a urethane bond. Furthermore, the curable composition for forming an HC layer of the second aspect (1) may contain, in addition to the radically polymerizable compound containing two or more radically polymerizable groups selected from the group consisting of an acryloyl group and a methacryloyl group in one molecule, one or more kinds of radically polymerizable compounds other than the above radically polymerizable compound.

Hereinafter, the radically polymerizable compound which contains two or more radically polymerizable groups selected from the group consisting of an acryloyl group and a methacryloyl group in one molecule and contains one or more urethane bonds in one molecule will be described as first radically polymerizable compound, and a radically polymerizable compound which does not correspond to the first radically polymerizable compound will be described as "second radically polymerizable compound" regardless of whether or not the radically polymerizable compound contains two or more radically polymerizable groups selected from the group consisting of an acryloyl group and a methacryloyl group in one molecule. The second radically polymerizable compound may have one or more urethane bonds in one molecule or may not have a urethane bond. In a case where the first radically polymerizable compound and the second radically polymerizable compound are used in combination, the mass ratio of first radically polymerizable compound/second radically polymerizable compound is preferably 3/1 to 1/30, more preferably 2/1 to 1/20, and even more preferably 1/1 to 1/10.

In the curable composition for forming an HC layer of the second aspect (1), the content of the radically polymerizable compound (it does not matter whether or not this compound contains a urethane bond) containing two or more radically polymerizable groups selected from the group consisting of an acryloyl group and a methacryloyl group in one molecule is preferably equal to or greater than 30% by mass, more preferably equal to or greater than 50% by mass, and even more preferably equal to or greater than 70% by mass, with respect to the total amount, 100% by mass, of the composition. Furthermore, in the curable composition for forming an HC layer of the second aspect (1), the content of the radically polymerizable compound (it does not matter whether or not this compound contains a urethane bond) containing two or more radically polymerizable groups selected from the group consisting of an acryloyl group and a methacryloyl group in one molecule is preferably equal to or smaller than 98% by mass, more preferably equal to or smaller than 95% by mass, and even more preferably equal to or smaller than 90% by mass, with respect to the total amount, 100% by mass, of the composition.

The content of the first radically polymerizable compound in the curable composition for forming an HC layer of the second aspect (1) with respect to the total amount, 100% by mass, of the composition is preferably equal to or greater than 30% by mass, more preferably equal to or greater than 50% by mass, and even more preferably equal to or greater than 70% by mass. Meanwhile, the content of the first radically polymerizable compound with respect to the total amount, 100% by mass, of the composition is preferably equal to or smaller than 98% by mass, more preferably equal to or smaller than 95% by mass, and even more preferably equal to or smaller than 90% by mass.

In an aspect, the second radically polymerizable compound is preferably a radically polymerizable compound which contains two or more radically polymerizable groups in one molecule and does not have a urethane bond. The radically polymerizable group contained in the second radically polymerizable compound is preferably an ethylenically unsaturated group. In an aspect, the radically polymerizable group is preferably a vinyl group. In another aspect, the ethylenically unsaturated group is preferably a radically polymerizable group selected from the group consisting of an acryloyl group and a methacryloyl group. That is, it is preferable that the second radically polymerizable compound has one or more radically polymerizable groups selected from the group consisting of an acryloyl group and a methacryloyl group in one molecule and does not have a urethane bond. Furthermore, as a radically polymerizable compound, the second radically polymerizable compound can contain one or more radically polymerizable groups selected from the group consisting of an acryloyl group and a methacryloyl group and one or more radically polymerizable groups other than this in one molecule.

The number of radically polymerizable groups contained in one molecule of the second radically polymerizable compound is preferably at least 2, more preferably equal to or greater than 3, and even more preferably equal to or greater than 4. In an aspect, the number of radically polymerizable groups contained in one molecule of the second radically polymerizable compound is equal to or less than 10 for example, but may be greater than 10. As the second radically polymerizable compound, a radically polymerizable compound having a molecular weight equal to or greater than 200 and less than 1,000 is preferable.

The following compounds can be exemplified as the second radically polymerizable compound. However, the present invention is not limited to the following example compounds.

Examples of the second radically polymerizable compound include bifunctional (meth)acrylate compounds such as polyethylene glycol 200 di(meth)acrylate, polyethylene glycol 300 di(meth)acrylate, polyethylene glycol 400 di(meth)acrylate, polyethylene glycol 600 di(meth)acrylate, triethylene glycol di(meth)acrylate, epichlorohydrin-modified ethylene glycol di(meth)acrylate (as a commercial product, for example, DENACOL DA-811 manufactured by NAGASE & CO., LTD.), polypropylene glycol 200 di(meth)acrylate, polypropylene glycol 400 di(meth)acrylate, polypropylene glycol 700 di(meth)acrylate, Ethylene Oxide (hereinafter, abbreviated to "EO" as well)×Propylene Oxide (hereinafter, abbreviated to "PO" as well) block polyether di(meth)acrylate (as a commercial product, for example, a BLEMMER PET series manufactured by NOF CORPORATION), dipropylene glycol di(meth)acrylate, bisphenol A EO addition-type di(meth)acrylate (as a commercial product, for example, M-210 manufactured by TOAGOSEI CO., LTD. or NK ESTER A-BPE-20 manufactured by SHIN-NAKAMURA CHEMICAL CO., LTD.), hydrogenated bisphenol A EO addition-type di(meth)acrylate (such as NK ESTER A-HPE-4 manufactured by SHIN-NAKAMURA CHEMICAL CO., LTD.), bisphenol A PO-addition type di(meth)acrylate (as a commercial product, for example, LIGHT ACRYLATE BP-4PA manufactured by KYOEISHA CHEMICAL Co., LTD.), bisphenol A epichlorohydrin addition-type di(meth)acrylate (as a commercial product, for example, EBECRYL 150 manufactured by Daicel-UCB Company, Ltd.), bisphenol A EO×PO addition-type di(meth)acrylate (as a commercial product, for example. BP-023-PE manufactured by TOHO Chemical Industry Co., Ltd.), bisphenol F EO addition-type di(meth)acrylate (as a commercial product, for example, ARONIX M-208 manufactured by TOAGOSEI CO., LTD.), 1,6-hexanediol di(meth)acrylate, 1,6-hexanediol di(meth)acrylate modified with epichlorohydrin, neopentyl glycol di(meth)acrylate, hydroxypivalic acid neopentyl glycol di(meth)acrylate, hydroxypivalic acid neopentyl glycol di(meth)acrylate modified with caprolactone, 1,4-butanediol di(meth)acrylate, 1,9-nonanediol di(meth)acrylate, trimethylolpropane di(meth)acrylate, tricyclodecane dimethanol di(meth)acrylate, pentaerythritol di(meth)acrylate monostearate, trimethylolpropane acrylic acid× benzoic acid ester, and isocyanuric acid EO-modified di(meth)acrylate (as a commercial product, for example, ARONIX M-215 manufactured by TOAGOSEI CO., LTD.).

Examples of the second radically polymerizable compound also include trifunctional (meth)acrylate compounds such as trimethylolpropane tri(meth)acrylate, trimethylolpropane tri(meth)acrylate modified with EO, PO, or epichlorohydrin, pentaerythritol tri(meth)acrylate, glycerol tri(meth)acrylate, glycerol tri(meth)acrylate modified with EO, PO, or epichlorohydrin, isocyanuric acid EO-modified tri(meth)acrylate (as a commercial product, for example, ARONIX M-315 manufactured by TOAGOSEI CO., LTD.), tris(meth)acryloyloxyethyl phosphate, (2,2,2-tri-(meth) acryloyloxymethyl)ethyl hydrogen phthalate, glycerol tri(meth)acrylate, and glycerol tri(meth)acrylate modified with EO, PO, or epichlorohydrin; tetrafunctional (meth)acrylate compounds such as pentaerythritol tetra(meth)acrylate, pentaerythritol tetra(meth)acrylate modified with EO, PO, or epichlorohydrin, and ditrimethylolpropane tetra(meth)acrylate; pentafunctional (meth)acrylate compounds such as dipentaerythritol penta(meth)acrylate and dipentaerythritol penta(meth)acrylate modified with EO, PO, epichlorohydrin, fatty acid, or alkyl; and hexafunctional (meth)acrylate compounds such as dipentaerythritol hexa(meth)acrylate, dipentaerythritol hexa(meth)acrylate modified with EO, PO, epichlorohydrin, fatty acid, or alkyl, sorbitol hexa(meth) acrylate, and sorbitol hexa(meth)acrylate modified with EO, PO, epichlorohydrin, fatty acid, or alkyl.

Two or more kinds of second radically polymerizable compounds may be used in combination. In this case, a mixture "DPHA" (manufactured by Nippon Kayaku Co., Ltd) of dipentaerythritol pentaacrylate and dipentaerythritol hexaacrylate and the like can be preferably used.

As the second radically polymerizable compound, polyester (meth) acrylate and epoxy (meth)acrylate having a weight-average molecular weight equal to or greater than 200 and less than 1,000 are also preferable. Examples thereof include commercial polyester (meth)acrylate products such as a BEAMSET (trade name) 700 series, for example, BEAMSET 700 (hexafunctional), BEAMSET 710 (tetrafunctional), and BEAMSET 720 (trifunctional)) manufactured by Arakawa Chemical Industries, Ltd. Examples of the epoxy (meth)acrylate include an SP series such as SP-1506, 500, SP-1507, and 480 (trade names) as well as a VR series such as VR-77 manufactured by Showa Highpolymer Co., Ltd., EA-1010/ECA, EA-11020, EA-1025, EA-6310/ECA (trade names) manufactured by SHIN-NAKAMURA CHEMICAL CO., LTD., and the like.

Specific examples of the second radically polymerizable compound also include the following example compounds A-9 to A-11.

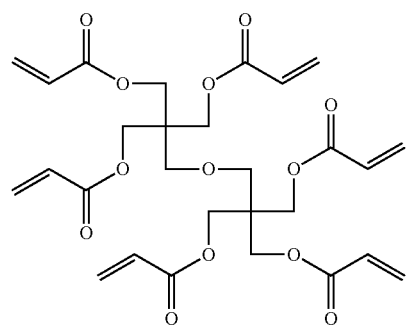

A-9

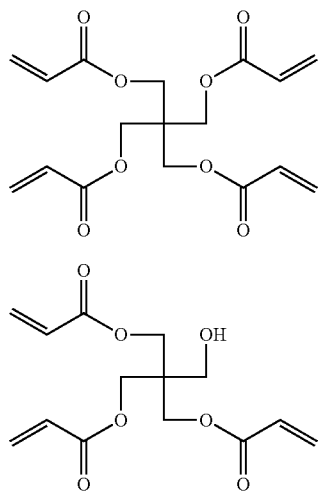

The curable composition for forming an HC layer of the second aspect (2), which is a preferred aspect of the second aspect, contains b) radically polymerizable compound containing three or more ethylenically unsaturated groups in one molecule. Hereinafter, b) compound containing three or more ethylenically unsaturated groups in one molecule will be described as "b) component" as well.

Examples of b) component include an ester of a polyhydric alcohol and (meth) acrylic acid, vinyl benzene and a derivative thereof, vinyl sulfone, (meth) acrylamide, and the like. Among these, a radically polymerizable compound containing three or more radically polymerizable groups selected from the group consisting of an acryloyl group and a methacryloyl group in one molecule is preferable. Specifically, examples thereof include a compound which is an ester of a polyhydric alcohol and (meth) acrylic acid and contains three or more ethylenically unsaturated groups in one molecule. More specifically, examples thereof include (di)pentaerythritol tetra(meth)acrylate, (di)pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, (di)pentaerythritol penta(meth)acrylate, dipentaerythritol hexa(meth)acrylate, pentaerythritol hexa(meth)acrylate, 1,2,3-cyclohexanetetramethacrylate, polyurethane polyacrylate, polyester polyacrylate, caprolactone-modified tris(acryloxyethyl)isocyanurate, tripentaerythritol triacrylate, tripentaerythritol hexatriacrylate, 1,2,4-cyclohexanetetra(meth)acrylate, pentaglycerol triacrylate, and the like. "(Di)pentaerythritol" described above means either or both of pentaerythritol and dipentaerythritol.

Furthermore, a resin is also preferable which contains three or more radically polymerizable groups selected from the group consisting of an acryloyl group and a methacryloyl group in one molecule.

Examples of the resin containing three or more radically polymerizable groups selected from the group consisting of an acryloyl group and a methacryloyl group in one molecule include a polyester-based resin, a polyether-based resin, an acrylic resin, an epoxy-based resin, a urethane-based resin, an alkyd-based resin, a spiroacetal-based resin, a polybutadiene-based resin, a polythiol polyene-based resin, a polymer of a polyfunctional compound such as a polyhydric alcohol, and the like.

Specific examples of the radically polymerizable compound containing three or more radically polymerizable groups selected from the group consisting of an acryloyl group and a methacryloyl group in one molecule include example compounds described in paragraph 0096 in JP2007-256844A, and the like.

Specific examples of the radically polymerizable compound containing three or more radically polymerizable groups selected from the group consisting of an acryloyl group and a methacryloyl group in one molecule include esterified substances of a polyol and (meth)acrylic acid such as KAYARAD DPHA, KAYARAD DPHA-2C. KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 manufactured by Nippon Kayaku Co., Ltd., and V #400 and V #36095D manufactured by OSAKA ORGANIC CHEMICAL INDUSTRY LTD. Furthermore, it is also possible to suitably use urethane acrylate compounds having three or more functional groups such as SHIKOH UV-1400B. SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by NIPPON GOHSEI), UL-503LN (manufactured by KYOEISHA CHEMICAL Co., LTD). UNIDIC 17-806, UNIDIC 17-813, UNIDIC V-4030, and UNIDIC V-4000BA (manufactured by DIC Corporation). EB-1290K, EB-220, EB-5129, EB-1830, and EB-4358 (manufactured by Daicel-UCB Company, Ltd.), HI-COAP AU-2010 and HI-COAP AU-2020 (manufactured by TOKUSHIKI Co., Ltd.), ARONIX M-1960 (manufactured by TOAGOSEI CO., LTD.), and ART RESIN UN-3320HA, UN-3320HC. UN-3320HS, UN-904, and HDP-4T, polyester compounds having three or more functional groups such as ARONIX M-8100, M-8030, and M-9050 (manufactured by TOAGOSEI CO., LTD.) and KBM-8307 (manufactured by Daicel SciTech), and the like.

As b) component, one kind of component may be used singly, or two or more kinds of components having different structures may be used in combination.

As described above, regarding the HC layer obtained by curing the curable composition for forming an HC layer of the second aspect (2), provided that the total solid content of the HC layer is 100% by mass, the HC layer can contain a structure derived from a) in an amount of 15% to 70% by mass, a structure derived from b) in an amount of 25% to 80% by mass, c) in an amount of 0.1% to 10% by mass, and d) in an amount of 0.1% to 10% by mass. Provided that the total solid content of the HC layer is 100% by mass, the content of the structure derived from b) in the HC layer is preferably 40% to 75% by mass, and more preferably 60% to 75% by mass. Furthermore, provided that the total solid content of the curable composition for forming an HC layer of the second aspect (2) is 100% by mass, the content of b)

component in the composition is preferably 40% to 75% by mass, and more preferably 60% to 75% by mass.

—Cationically Polymerizable Compound—

The curable composition for forming an HC layer of the second aspect contains at least one kind of radically polymerizable compound and at least one kind of cationically polymerizable compound. Any of cationically polymerizable compounds can be used without limitation as long as the compounds have a polymerizable group which can be cationically polymerized (cationically polymerizable group). The number of cationically polymerizable groups contained in one molecule is at least 1. The cationically polymerizable compound may be a monofunctional compound containing one cationically polymerizable group or a polyfunctional compound containing two or more cationically polymerizable groups in one molecule. The number of cationically polymerizable groups contained in the polyfunctional compound is not particularly limited, and is, for example, 2 to 6 in one molecule. In addition, two or more cationically polymerizable groups contained in one molecule of the polyfunctional compound may be the same or two or more different in structure.

In addition, in an aspect, it is preferable that the cationically polymerizable compound has one or more radically polymerizable groups in one molecule together with the cationically polymerizable groups. Regarding the radically polymerizable group that the cationically polymerizable compound has, the above description for the radically polymerizable compound can be referred to. The radically polymerizable group is preferably an ethylenically unsaturated group, and the ethylenically unsaturated group is more preferably a radically polymerizable group selected from the group consisting of a vinyl group, an acryloyl group, and a methacryloyl group. The number of radically polymerizable groups in one molecule of the cationically polymerizable compound having a radically polymerizable group is at least 1, preferably 1 to 3, and more preferably 1.

As the cationically polymerizable group, an oxygen-containing heterocyclic group and a vinyl ether group can be preferably exemplified. The cationically polymerizable compound may contain one or more oxygen-containing heterocyclic groups and one or more vinyl ether groups in one molecule.

The oxygen-containing heterocyclic ring may be a monocyclic ring or a condensed ring. Furthermore, it is also preferable that the oxygen-containing heterocyclic ring has a bicyclo skeleton. The oxygen-containing heterocyclic ring may be a non-aromatic ring or an aromatic ring, and is preferably a non-aromatic ring. Specific examples of the monocyclic ring include an epoxy ring, a tetrahydrofuran ring, and an oxetane ring. Examples of the oxygen-containing heterocyclic ring having a bicyclo skeleton include an oxabicyclo ring. The cationically polymerizable group containing the oxygen-containing heterocyclic ring is contained in the cationically polymerizable compound as a monovalent substituent or a polyvalent substituent with a valency of 2 or higher. The aforementioned condensed ring may be a ring formed by the condensation of two or more oxygen-containing heterocyclic rings or a ring formed by the condensation of one or more oxygen-containing heterocyclic rings and one or more ring structures other than the oxygen-containing heterocyclic ring. The ring structure other than the oxygen-containing heterocyclic ring is not limited to the above, and examples thereof include a cycloalkane ring such as a cyclohexane ring.

Hereinafter, the specific example of the oxygen-containing heterocyclic ring is shown. However, the present invention is not limited to the following specific examples.

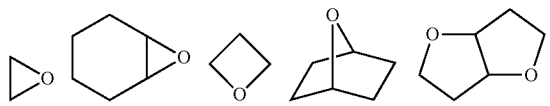

The cationically polymerizable compound may have a partial structure other than the cationically polymerizable group. Such a partial structure is not particularly limited, and may be a linear structure, a branched structure or a cyclic structure. The partial structure may contain one or more heteroatoms such as oxygen atoms or nitrogen atoms.

As a preferred aspect of the cationically polymerizable compound, a compound (cyclic structure-containing compound) can be exemplified which has a cyclic structure as the cationically polymerizable group or as a partial structure other than the cationically polymerizable group. The cyclic structure-containing compound may have one cyclic structure in one molecule for example. The cyclic structure-containing compound may have two or more cyclic structures in one molecule. The number of cyclic structures contained in the cyclic structure-containing compound is, for example, 1 to 5 in one molecule, but is not particularly limited. In a case where the compound contains two or more cyclic structures in one molecule, the cyclic structures may be the same as each other. Alternatively, the compound may contain two or more kinds of cyclic structures having different structures.

As an example of the cyclic structure contained in the cyclic structure-containing compound, an oxygen-containing heterocyclic ring can be exemplified. The details of the oxygen-containing heterocyclic ring are as described above.

A cationically polymerizable group equivalent determined by dividing the molecular weight (hereinafter, described as "B") by the number of cationically polymerizable groups (hereinafter, described as "C") contained in one molecule of the cationically polymerizable compound (=B/C) is equal to or smaller than 300, for example. From the viewpoint of improving the adhesiveness between the HC layer obtained by curing the curable composition for forming an HC layer and the resin film, the cationically polymerizable group equivalent is preferably less than 150. In contrast, from the viewpoint of the hygroscopicity of the HC layer obtained by curing the curable composition for forming an HC layer, the cationically polymerizable group equivalent is preferably equal to or greater than 50. Furthermore, in an aspect, the cationically polymerizable group contained in the cationically polymerizable compound for which the cationically polymerizable group equivalent is determined can be an epoxy group (epoxy ring). That is, in an aspect, the cationically polymerizable compound is an epoxy ring-containing compound. For the epoxy ring-containing compound, from the viewpoint of improving the adhesiveness between the HC layer obtained by curing the curable composition for forming an HC layer and the resin film, an epoxy group equivalent, which is determined by dividing the molecular weight by the number of epoxy rings contained in one molecule, is preferably less than 150. The epoxy group equivalent of the epoxy ring-containing compound is equal to or greater than 50, for example.

The molecular weight of the cationically polymerizable compound is preferably equal to or smaller than 500, and more preferably equal to or smaller than 300. Presumably, the cationically polymerizable compound whose molecular weight is within the above range tends to easily permeate the resin film and can make a contribution to the improvement of the adhesiveness between the HC layer obtained by curing the curable composition for forming an HC layer and the resin film.

The curable composition for forming an HC layer of the second aspect (2) contains a) cationically polymerizable compound containing an alicyclic epoxy group and an ethylenically unsaturated group and having molecular weight equal to or smaller than 300, in which the number of alicyclic epoxy groups contained in one molecule is 1, and the number of ethylenically unsaturated groups contained in one molecule is 1. Hereinafter, a) will be described as "a) component".

Examples of the ethylenically unsaturated group include a radically polymerizable group including an acryloyl group, a methacryloyl group, a vinyl group, a styryl group, an allyl group, and the like. Among these, an acryloyl group, a methacryloyl group, and $C(O)OCH=CH_2$ are preferable, and an acryloyl group and a methacryloyl group are more preferable. Each of the number of alicyclic epoxy groups in one molecule and the number of ethylenically unsaturated groups in one molecule is preferably 1.

The molecular weight of a) component is equal to or smaller than 300, preferably equal to or smaller than 210, and more preferably equal to or smaller than 200.

As a preferred aspect of a) component, a compound represented by General Formula (1) can be exemplified.

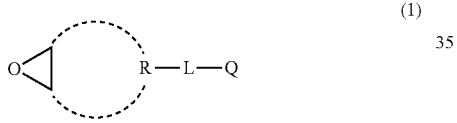
(1)

In General Formula (1), R represents monocyclic hydrocarbon or crosslinked hydrocarbon, L represents a single bond or a divalent linking group, and Q represents an ethylenically unsaturated group.

In a case where R in General Formula (1) is monocyclic hydrocarbon, the monocyclic hydrocarbon is preferably alicyclic hydrocarbon, more preferably an alicyclic group having 4 to 10 carbon atoms, even more preferably an alicyclic group having 5 to 7 carbon atoms, and particularly preferably an alicyclic group having 6 carbon atoms. Preferable specific examples thereof include a cyclobutyl group, a cyclopentyl group, a cyclohexyl group, a cycloheptyl group, and the like.

In a case where R in General Formula (1) is crosslinked hydrocarbon, the crosslinked hydrocarbon is preferably a bicyclic crosslinked hydrocarbon (bicyclo ring) or a tricyclic crosslinked hydrocarbon (tricyclo ring). Specific examples thereof include crosslinked hydrocarbon having 5 to 20 carbon atoms such as a norbornyl group, a bornyl group, an isobornyl group, a tricyclodecyl group, a dicyclopentenyl group, a dicyclopentanyl group, a tricyclopentenyl group, a tricyclopentanyl group, an adamantyl group, or a lower alkyl group (having 1 to 6 carbon atoms for example)-substituted adamantyl group.

In a case where L represents a divalent linking group, the divalent linking group is preferably a divalent aliphatic hydrocarbon group. The number of carbon atoms in the divalent aliphatic hydrocarbon group is preferably within a range of 1 to 6, more preferably within a range of 1 to 3, and even more preferably 1. As the divalent aliphatic hydrocarbon group, a linear, branched, or cyclic alkylene group is preferable, a linear or branched alkylene group is more preferable, and a linear alkylene group is even more preferable.

Examples of Q include the ethylenically unsaturated group including an acryloyl group, a methacryloyl group, a vinyl group, a styryl group, an allyl group, and the like. Among these, an acryloyl group, a methacryloyl group, and $C(O)OCH=CH_2$ are preferable, and an acryloyl group and a methacryloyl group are more preferable.

Specific examples of a) component include various compounds exemplified in paragraph 0015 in JP1998-017614A (JP-H10-017614A), a compound represented by General Formula (1A) or (1B), 1,2-epoxy-4-vinylcyclohexane, and the like. Among these, the compound represented by General Formula (1A) or (1B) is more preferable. As the compound represented by General Formula (1A), an isomer thereof is also preferable.

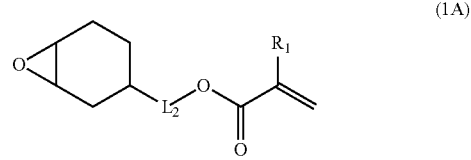
(1A)

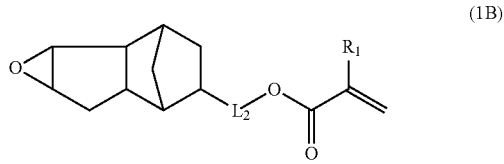
(1B)

In General Formulae (1A) and (1B), $R_1$ represents a hydrogen atom or a methyl group, and $L_2$ represents a divalent aliphatic hydrocarbon group having 1 to 6 carbon atoms.

The number of carbon atoms in the divalent aliphatic hydrocarbon group represented by $L_2$ in General Formulae (1A) and (1B) is within a range of 1 to 6, more preferably in a range of 1 to 3, and even more preferably 1. As the divalent aliphatic hydrocarbon group, a linear, branched, or cyclic alkylene group is preferable, a linear or branched alkylene group is more preferable, and a linear alkylene group is even more preferable.

Regarding the HC layer obtained by curing the curable composition for forming an HC layer of the second aspect (2), provided that the total solid content of the HC layer is 100% by mass, the HC layer contains a structure derived from a) preferably in an amount of 15% to 70% by mass, more preferably in an amount of 18% to 50% by mass, and even more preferably in an amount of 22% to 40% by mass. Furthermore, provided that the total solid content of the curable composition for forming an HC layer of the second aspect (2) is 100% by mass, the composition contains a) component preferably in an amount of 15% to 70% by mass, more preferably in an amount of 18% to 50% by mass, and even more preferably in an amount of 22% to 40% by mass.

As another example of the cyclic structure contained in the cyclic structure-containing compound, a nitrogen-containing heterocyclic ring can be exemplified. The nitrogen-containing heterocyclic ring-containing compound is the cationically polymerizable compound which is preferable from the viewpoint of improving the adhesiveness between the HC layer obtained by curing the curable composition for forming an HC layer and the resin film. As the nitrogen-containing heterocyclic ring-containing compound, a compound is preferable which has one or more nitrogen-containing heterocyclic rings selected from the group consisting of an isocyanurate ring (nitrogen-containing heterocyclic ring contained in example compounds B-1 to B-3 which will be described later) and a glycoluril ring (nitrogen-containing heterocyclic ring contained in an example compound B-10 which will be described later) in one molecule. Among these, from the viewpoint improving the adhesiveness between the HC layer obtained by curing the curable composition for forming an HC layer and the resin film, the compound containing an isocyanurate ring (isocyanurate ring-containing compound) is more preferably a cationically polymerizable compound. The inventors of the present invention assume that this is because the isocyanurate ring has excellent affinity with the resin constituting the resin film. In this respect, a resin film including an acrylic resin film is more preferable, and a resin film is more preferable which includes an acrylic resin film as a surface directly contacting the HC layer obtained by curing the curable composition for forming an HC layer.

As another example of the cyclic structure contained in the cyclic structure-containing compound, an alicyclic structure can be exemplified. As an alicyclic structure, for example, a cyclo ring structure, a dicyclo ring structure, a tricyclo ring structure can be mentioned. As a specific example, a dicyclopentanyl ring, a cyclohexane ring and the like can be mentioned.

The cationically polymerizable compound described above can be synthesized by a known method. Moreover, it is also possible to obtain the cationically polymerizable compound as a commercial product.

Specific examples of the cationically polymerizable compound containing an oxygen-containing heterocyclic ring as a cationically polymerizable group include 3,4-epoxycyclohexylmethyl methacrylate (commercial products such as CYCLOMER M100 manufactured by Daicel Corporation), 3,4-epoxycyclohexylmethyl-3',4'-epoxycyclohexane carboxylate (for example, commercial products such as UVR 6105 and UVR 6110 manufactured by Union Carbide Corporation and CELLOXIDE 2021 manufactured by Daicel Corporation), bis(3,4-epoxvcyclohexylmethyl)adipate (such as UVR 6128 manufactured by Union Carbide Corporation), vinylcyclohexene monoepoxide (such as CELLOXIDE 2000 manufactured by Daicel Corporation), e-caprolactam-modified 3,4-epoxycyclohexylmethyl 3',4'-epoxycyclohexane carboxylate (such as CELLOXIDE 2081 manufactured by Daicel Corporation), 1-methyl-4-(2-methyloxiranyl)-7-oxabicyclo[4,1,0]heptane (such as CELLOXIDE 3000 manufactured by Daicel Corporation), 7,7'-dioxa-3,3'-bi[bicyclo[4.1.0]heptane] (such as CELLOXIDE 8000 manufactured by Daicel Corporation), 3-ethyl-3-hydroxymethyloxetane, 1,4 bis{[(3-ethyl-3-oxetanyl)methoxy]methyl}benzene, 3-ethyl-3-(phenoxymethyl)oxetane, 3-ethyl-3-(2-ethylhexyloxymethyl)oxetane, di[1-ethyl(3-oxetanyl)]methyl ether, and the like.

Specific examples of the cationically polymerizable compound containing a vinyl ether group as a cationically polymerizable group include 1,4-butanediol divinyl ether, 1,6-hexanediol divinyl ether, nonanediol divinyl ether, cyclohexanediol divinyl ether, cyclohexane dimethanol divinyl ether, triethylene glycol divinyl ether, trimethylolpropane trivinyl ether, pentaerythritol tetravinyl ether, and the like. As the cationically polymerizable compound containing a vinyl ether group, those having an alicyclic structure are also preferable.

Furthermore, as the cationically polymerizable compound, it is possible to use the compounds exemplified in JP1996-143806A (JP-H08-143806A), JP1996-283320A (JP-H08-283320A), JP2000-186079A, JP2000-327672A, JP2004-315778A. JP2005-029632A, and the like.

As specific examples of the cationically polymerizable compound, example compounds B-1 to B-14 will be shown below, but the present invention is not limited to the following specific examples.

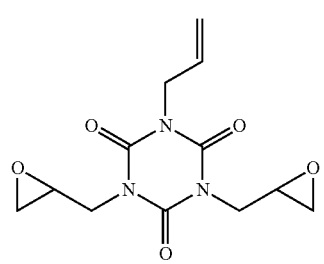

-continued

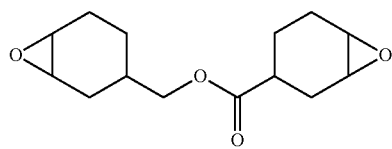
B-5

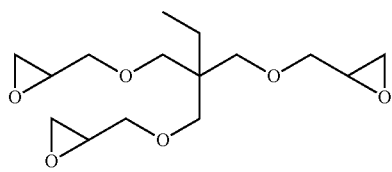
B-6

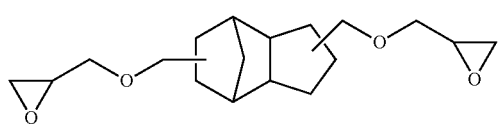
B-7

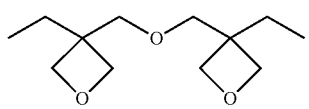
B-8

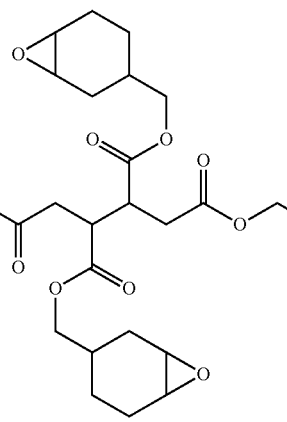
B-9

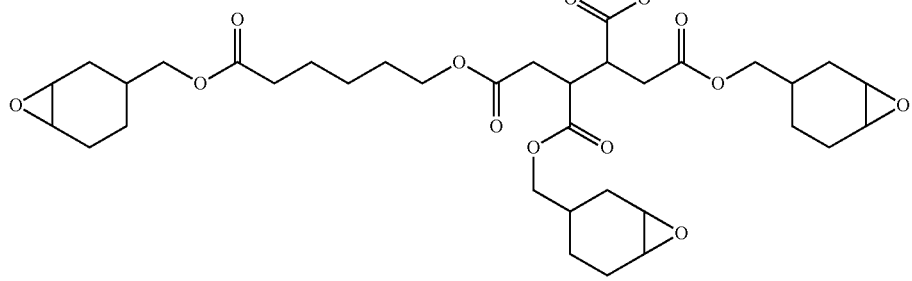
B-10

B-11

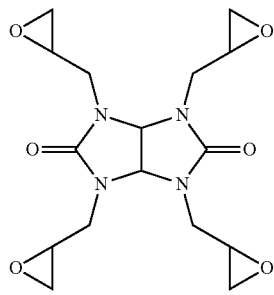
B-12

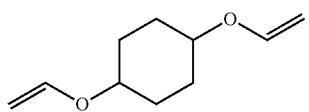
B-13

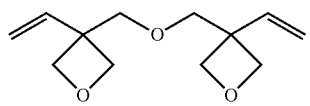

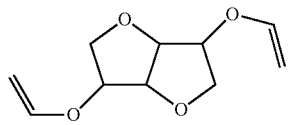
B-14

From the viewpoint of improving the adhesiveness between the HC layer obtained by curing the curable composition for forming an HC layer and the resin film, as preferred aspects of the curable composition for forming an HC layer, the following aspects can be exemplified. The curable composition for forming an HC layer more preferably satisfies one or more aspects among the following aspects, even more preferably satisfies two or more aspects, still more preferably satisfies three or more aspects, and yet more preferably satisfies all of the following aspects. It is preferable that one cationically polymerizable compound satisfies a plurality of aspects. For example, an aspect is preferable in which the cationically polymerizable group equivalent of the nitrogen-containing heterocyclic ring-containing compound is less than 150.

(1) The curable composition for forming an HC layer contains a nitrogen-containing heterocyclic ring-containing compound as a cationically polymerizable compound. The nitrogen-containing heterocyclic ring contained in the nitrogen-containing heterocyclic ring-containing compound is preferably selected from the group consisting of an isocyanurate ring and a glycoluril ring. The nitrogen-containing heterocyclic ring-containing compound is more preferably an isocyanurate ring-containing compound. The isocyanurate ring-containing compound is even more preferably an epoxy ring-containing compound containing one or more epoxy rings in one molecule.

(2) The curable composition for forming an HC layer contains a cationically polymerizable compound having a cationically polymerizable group equivalent less than 150 as a cationically polymerizable compound. The curable composition for forming an HC layer preferably contains an epoxy group-containing compound having an epoxy group equivalent less than 150.

(3) The cationically polymerizable compound contains an ethylenically unsaturated group.

(4) The curable composition for forming an HC layer contains, as cationically polymerizable compounds, an oxetane ring-containing compound containing one or more oxetane rings in one molecule in addition to another cationically polymerizable compound. The oxetane ring-containing compound is preferably a compound which does not contain a nitrogen-containing heterocyclic ring.

The content of the cationically polymerizable compound in the curable composition for forming an HC layer with respect to the total content, 100 parts by mass, of the radically polymerizable compound and the cationically polymerizable compound is preferably equal to or greater than 10 parts by mass, more preferably equal to or greater than 15 parts by mass, and even more preferably equal to or greater than 20 parts by mass. The content of the cationically polymerizable compound in the curable composition for forming an HC layer with respect to the total content, 100 parts by mass, of the radically polymerizable compound and the cationically polymerizable compound is preferably equal to or smaller than 50 parts by mass.

The content of the cationically polymerizable compound in the curable composition for forming an HC layer with respect to the total content, 100 parts by mass, of the first radically polymerizable compound and the cationically polymerizable compound is preferably equal to or greater than 0.05 parts by mass, more preferably equal to or greater than 0.1 parts by mass, and even more preferably equal to or greater than 1 part by mass. Meanwhile, the content of the cationically polymerizable compound with respect to the total content, 100 parts by mass, of the first radically polymerizable compound and the cationically polymerizable compound is preferably equal to or smaller than 50 parts by mass, and more preferably equal to or smaller than 40 parts by mass.

In the present invention and the present specification, a compound having both the cationically polymerizable group and the radically polymerizable group is classified as a cationically polymerizable compound so as to specify content thereof in the curable composition for forming an HC layer.

—Polymerization Initiator—

The curable composition for forming an HC layer preferably contains a polymerization initiator, and more preferably contains a photopolymerization initiator. The curable composition for forming an HC layer containing the radically polymerizable compound preferably contains a radical photopolymerization initiator, and the curable composition for forming an HC layer containing the cationically polymerizable compound preferably contains a cationic photopolymerization initiator. Only one kind of radical photopolymerization initiator may be used, or two or more kinds of radical photopolymerization initiators having different structures may be used in combination. The same shall be applied for the cationic photopolymerization initiator.

Hereinafter, each of the photopolymerization initiators will be sequentially described.

(i) Radical Photopolymerization Initiator

The radical photopolymerization initiator may be a compound that generates a radical as an active species by light irradiation, and known radical photopolymerization initiators can be used without limitation. Specific examples thereof include acetophenones such as diethoxyacetophenone, 2-hydroxy-2-methyl-1-phenylpropan-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propan-1-one, 2-benzyl-2-dimethylamino-1-(4-morpholinophenyl)-1-butanone, a 2-hydroxy-2-methyl-1-[4-(1-methylvinyl)phenyl] propane oligomer, and 2-hydroxy-1-{4-[4-(2-hydroxy-2-methyl-propionyl)-benzyl]phenyl}-2-methyl-propan-1-one; oxime esters such as 1,2-octanedione, 1-[4-(phenylthio)-,2-(O-benzoyloxime)], ethanone, 1-[9-ethyl-6-(2-methylbenzoyl)-9H-carbazol-3-yl]-,1-(O-acetyloxime); benzoins such as benzoin, benzoin methyl ether, benzoin ethyl ether, benzoin isopropyl ether, and benzoin isobutyl ether; benzophenones such as benzophenone, methyl o-benzoyl benzoate, 4-phenylbenzophenone, 4-benzoyl-4'-methyl-diphenyl sulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, and (4-benzoylbenzyl)trimethyl ammonium chloride; thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one methochloride; acylphosphine oxides such as 2,4,6-trimethylbenzoyl-diphenylphosphine oxide, bis(2,6-dimethoxybenzoyl)-2,4,4-trimethyl-pentylphosphine oxide, and bis(2,4,6-trimethylbenzoyl)-phenylphosphine oxide; and the like. Furthermore, as an aid for the radical photopolymerization initiator, triethanolamine, triisopropanolamine, 4,4'-dimethylaminobenzophenone (Michler's ketone), 4,4'-diethylaminobenzophenone, 2-dimethylaminoethyl benzoate, ethyl 4-dimethylaminobenzoate, (n-butoxy) ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone, and the like may be used in combination.

The aforementioned radical photopolymerization initiators and aids can be synthesized by a known method or can be obtained as commercial products. Examples of preferable commercial radical photopolymerization initiators include IRGACURE (127, 651, 184, 819, 907, 1870 (CGI-403/Irg184=7/3 mixed initiator, 500, 369, 1173, 2959, 4265, 4263, or the like), and OXE01) manufactured by BASF SE, KAYACURE (DETX-S, BP-100, BDMK, CTX, BMS, 2-EAQ, ABQ, CPTX, EPD, ITX. QTX, BTC, MCA, and the like) manufactured by Nippon Kayaku Co., Ltd., Esacure (KIP100F, KB1, EB3, BP, X33, KT046, KT37, KIPI50, TZT, and the like) manufactured by Sartomer, and the like.

The content of the radical photopolymerization initiator in the curable composition for forming an HC layer may be appropriately adjusted within a range in which the polymerization reaction (radical polymerization) of the radically polymerizable compound is excellently carried out, and is not particularly limited. The content of the radical photopolymerization initiator with respect to 100 parts by mass of the radically polymerizable compound contained in the curable composition for forming an HC layer is within a range of 0.1 to 20 parts by mass for example, preferably within a range of 0.5 to 10 parts by mass, and even more preferably within a range of 1 to 10 parts by mass.

(ii) Cationic Photopolymerization Initiator

As the cationic photopolymerization initiator, a compound which can generate a cation as an active species by light irradiation is preferable, and known cationic photopolymerization initiators can be used without limitation. Specific examples thereof include a sulfonium salt, an ammonium salt, an iodonium salt (such as a diaryl iodonium salt), a triaryl sulfonium salt, a diazonium salt, an iminium salt, and the like that are known. More specifically, examples thereof include the cationic photopolymerization initiators represented by Formulae (25) to (28) shown in paragraphs 0050 to 0053 in JP1996-143806A (JP-H08-143806A), the compounds exemplified as cationic polymerization catalysts in paragraph 0020 in JP1996-283320A (JP-H08-283320A), and the like. The cationic photopolymerization initiator can be synthesized by a known method, or can be obtained as a commercial product. For example, as the commercial product, it is possible to use CI-1370, CI-2064, CI-2397, CI-2624, CI-2639, CI-2734, CI-2758, CI-2823. CI-2855. CI-5102, and the like manufactured by NIPPON SODA CO., LTD., PHOTOINITIATOR 2047 and the like manufactured by Rhodia, UVI-6974 and UVI-6990 manufactured by Union Carbide Corporation, CPI-10P manufactured by San-Apro Ltd., and the like.

In view of the sensitivity of the photopolymerization initiator with respect to light, the compound stability, and the like, a diazonium salt, an iodonium salt, a sulfonium salt, and an iminium salt are preferable as the cationic photopolymerization initiator. In view of weather fastness, an iodonium salt is most preferable.

Specific examples of commercial products of the iodonium salt-based cationic photopolymerization initiator include B2380 manufactured by TOKYO CHEMICAL INDUSTRY CO., LTD., BBI-102 manufactured by Midori Kagaku Co., Ltd., WPI-113, WPI-124, WPI-169, WPI-170 manufactured by Wako Pure Chemical Industries, Ltd., and DTBPI-PFBS manufactured by Toyo Gosei Co., Ltd.

Specific examples of iodonium salt compounds which can be used as the cationic photopolymerization initiator include the following compounds PAG-1 and PAG-2.

Cationic Photopolymerization Initiator (Iodonium Salt Compound) PAG-1

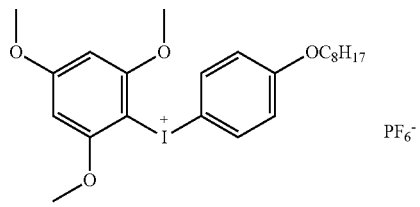

Cationic Photopolymerization Initiator (Iodonium Salt Compound) PAG-2

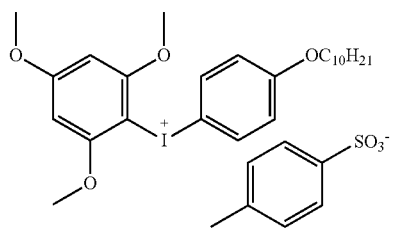

The content of the cationic photopolymerization initiator in the curable composition for forming an HC layer may be appropriately adjusted within a range in which the polymerization reaction (cationic polymerization) of the cationically polymerizable compound is excellently carried out, and is not particularly limited. The content of the cationic photopolymerization initiator with respect to 100 parts by mass of the cationically polymerizable compound is within a range of 0.1 to 200 parts by mass for example, preferably within a range of 1 to 150 parts by mass, and more preferably within a range of 2 to 100 parts by mass.

As other photopolymerization initiators, the photopolymerization initiators described in paragraphs 0052 to 0055 in JP2009-204725A can be exemplified, and the content of the publication is incorporated into the present invention.

—Components which can be Optionally Incorporated into Curable Composition for Forming HC Layer—

The curable composition for forming an HC layer contains at least one kind of component having a property of being cured by being irradiated with active energy rays, and can optionally contain at least one kind of polymerization initiator. It is preferable that the composition contains the polymerization initiator. The details of the polymerization initiator are as described above.

Next, each of the components that can be optionally incorporated into the curable composition for forming an HC layer will be described.

(i) Inorganic Particles

The curable composition for forming an HC layer can contain inorganic particles having an average primary particle diameter less than 2 μm. From the viewpoint of improving the hardness of the front panel having the HC layer obtained by curing the curable composition for forming an HC layer (and improving the hardness of a liquid crystal panel having the front panel), it is preferable that the curable composition for forming an HC layer and the HC layer obtained by curing the composition contain inorganic particles having an average primary particle diameter less than 2 μm. The average primary particle diameter of the inorganic particles is preferably within a range of 10 nm to 1 μm, more preferably within a range of 10 nm to 100 nm, and even more preferably within a range of 10 nm to 50 nm.

For determining the average primary particle diameter of the inorganic particles and matt particles which will be described later, the particles are observed using a transmission electron microscope (500,000× to 2,000,000× magnification), randomly selected 100 particles (primary particles) are observed, and the average of the particle diameters thereof is taken as the average primary particle diameter.

Examples of the inorganic particles include silica particles, titanium dioxide particles, zirconium oxide particles, aluminum oxide particles, and the like. Among these, silica particles are preferable.

In order to improve the affinity of the inorganic particles with organic components contained in the curable composition for forming an HC layer, it is preferable that the surface of the inorganic particles is treated with a surface modifier including an organic segment. It is preferable that the surface modifier has a functional group, which can form a bond with the inorganic particles or can be adsorbed onto the inorganic particles, and a functional group, which has high affinity with an organic component, in the same molecule. As the surface modifier having a functional group which can form a bond with the inorganic particles or can be adsorbed onto the inorganic particles, a silane-based surface modifier, a metal alkoxide surface modifier such as aluminum, titanium, and zirconium, or a surface modifier having an anionic group such as a phosphoric acid group, a sulfuric acid group, a sulfonic acid group, or a carboxylic acid group is preferable. Examples of the functional group having high affinity with an organic component include a functional group having the same hydrophilicity and hydrophobicity as those of the organic component, a functional group which can be chemically bonded to the organic component, and the like. Among these, the functional group which can be chemically bonded to the organic component and the like are preferable, and an ethylenically unsaturated group or a ring-opening polymerizable group is more preferable.

As the surface modifier for the inorganic particles, a metal alkoxide surface modifier or a polymerizable compound, which has an anionic group and an ethylenically unsaturated group or a ring-opening polymerizable group in the same molecule, is preferable. By chemically bonding the inorganic particles and the organic components to each other by using these surface modifiers, and crosslinking density of the HC layer can be increased. As a result, the hardness of the front panel (and the hardness of a liquid crystal panel including the front panel) can be improved.

Specific examples of the surface modifier include the following example compounds S-1 to S-8.

| | |
|---|---|
| $H_2C=C(X)COOC_3H_6Si(OCH_3)_3$ | S-1 |
| $H_2C=C(X)COOC_2H_4OTi(OC_2H)_3$ | S-2 |
| $H_2C=C(X)COOC_2H_4OCOC_5H_{10}OPO(OH)_2$ | S-3 |
| $(H_2C=C(X)COOC_2H_4OCOC_5H_{10}O)_2POOH$ | S-4 |
| $H_2C=C(X)COOC_2H_4OSO_3H$ | S-5 |
| $H_2C=C(X)COO(C_5H_{10}COO)_2H$ | S-6 |
| $H_2C=C(X)COOC_5H_{10}COOH$ | S-7 |
| $CH_2CH(O)CH_2OCH_6Si(OCH_3)_3$ | S-8 |

(X represents a hydrogen atom or a methyl group.)

It is preferable that the surface modification for the inorganic particles by the surface modifier is performed in a solution. The surface modification may be performed by a method in which a surface modifier is allowed to coexist at the time of mechanically dispersing the inorganic particles, a method in which the inorganic particles are mechanically dispersed and then a surface modifier is added thereto and stirred, or a method in which the surface modification is performed before the inorganic particles are mechanically dispersed (if necessary, the inorganic particles are warmed and dried and then subjected to heating or changing of pH (power of hydrogen)) and then the inorganic particles are dispersed. As a solvent for dissolving the surface modifier, an organic solvent having high polarity is preferable. Specific examples thereof include known solvents such as an alcohol, a ketone, and an ester.

Provided that the total solid content in the curable composition for forming an HC layer is 100% by mass, the content of the inorganic particles is preferably 5% to 40% by mass, and more preferably 10% to 30% by mass. It does not matter whether the primary particles of the inorganic particles have a spherical shape or a non-spherical shape. However, it is preferable that the primary particles of the inorganic particles have a spherical shape. From the viewpoint of further improving the hardness, it is more preferable that in the HC layer obtained by curing the curable composition for forming an HC layer, the inorganic particles are present as non-spherical high-order particles of the order equal to or higher than that of secondary particles in which two to ten spherical inorganic particles (primary particles) are linked to each other.

Specific examples of the inorganic particles include ELCOM V-8802 (spherical silica particles having an average primary particle diameter of 15 nm manufactured by JGC CORPORATION), ELCOM V-8803 (silica particles of irregular shapes manufactured by JGC CORPORATION), MiBK-SD (spherical silica particles having an average primary particle diameter of 10 to 20 nm manufactured by NISSAN CHEMICAL INDUSTRIES, LTD.), MEK-AC-2140Z (spherical silica particles having an average primary particle diameter of 10 to 20 nm manufactured by NISSAN CHEMICAL INDUSTRIES, LTD.), MEK-AC-4130 (spherical silica particles having an average primary particle diameter of 45 nm manufactured by NISSAN CHEMICAL INDUSTRIES, LTD.), MiBK-SD-L (spherical silica particles having an average primary particle diameter of 40 to 50 nm manufactured by NISSAN CHEMICAL INDUSTRIES, LTD.), MEK-AC-5140Z (silica particles having an average primary particle diameter of 85 nm manufactured by NISSAN CHEMICAL INDUSTRIES, LTD.), and the like. Among these, from the viewpoint of further improving hardness, ELCOM V-8802 manufactured by JGC CORPORATION is preferable.

(ii) Matt Particles

The curable composition for forming an HC layer can also contain matt particles. The matt particles mean particles having an average primary particle diameter equal to or greater than 2 µm. The matt particles may be inorganic particles or organic particles, or may be particles of an inorganic×organic composite material. It does not matter whether the matt particles have a spherical shape or a non-spherical shape. The average primary particle diameter of the matt particles is preferably within a range of 2 to 20 µm, more preferably within a range of 4 to 14 µm, and even more preferably within a range of 6 to 10 min.

Specific examples of the matt particles preferably include inorganic particles such as silica particles and $TiO_2$ particles and organic particles such as crosslinked acryl particles, crosslinked acryl-styrene particles, crosslinked styrene particles, melamine resin particles, and benzoguanamine resin particles. Among these, organic particles are preferable as the matt particles, and crosslinked acryl particles, crosslinked acryl-styrene particles, or crosslinked styrene particles are more preferable.

The content of the matt particles per unit volume of the HC layer obtained by curing the curable composition for forming an HC layer is preferably equal to or greater than 0.10 $g/cm^3$, more preferably 0.10 $g/cm^3$ to 0.40 $g/cm^3$, and even more preferably 0.10 $g/cm^3$ to 0.30 $g/cm^3$.

(iii) Ultraviolet Absorber

It is also preferable that the curable composition for forming an HC layer contains an ultraviolet absorber. Examples of the ultraviolet absorber include a benzotriazole compound and a triazine compound. The benzotriazole compound mentioned herein is a compound having a benzotriazole ring, and specific examples thereof include various benzotriazole-based ultraviolet absorbers described in paragraph 0033 in JP2013-111835A. The triazine compound is a compound having a triazine ring, and specific examples thereof include various triazine-based ultraviolet absorbers described in paragraph 0033 in JP2013-111835A. The content of the ultraviolet absorber in the resin film is, for example, about 0.1 to 10 parts by mass with respect to 100 parts by mass of the resin contained in the film, but is not particularly limited. Regarding the ultraviolet absorber, paragraph 0032 in JP2013-111835A can also be referred to. In the present invention and the present specification, the ultraviolet rays mean the light having a central emission wavelength in a wavelength range of 200 to 380 nm.

(iv) Fluorine-Containing Compound

It is also preferable that the curable composition for forming an HC layer contains a fluorine-containing compound such as a leveling agent and an antifoulant.

As the leveling agent, a fluorine-containing polymer is preferably used. Examples thereof include the fluoroaliphatic group-containing polymer described in JP5175831B. Furthermore, a fluoroaliphatic group-containing polymer, in which the content of a fluoroaliphatic group-containing monomer represented by General Formula (1) constituting the fluoroaliphatic group-containing polymer is equal to or smaller than 50% by mass with respect to all polymerization units, can also be used as a leveling agent.

In a case where the HC layer contains an antifoulant, the adhesion of finger print or contaminant is suppressed, the contaminant that has adhered can be easily wiped off. Rub resistance can be further improved by enhancing sliding properties of the surface of the HC layer.

It is preferable that the antifoulant contains a fluorine-containing compound. The fluorine-containing compound preferably has a perfluoropolyether group and a polymerizable group (preferably a radically polymerizable group), and more preferably has a perfluoropolyether group and a plurality of polymerizable groups in one molecule. In a case where the above constitution is adopted, the rub resistance improving effect can be more effectively exerted.

In the present specification, even in a case where the antifoulant has a polymerizable group, the antifoulant is regarded as not corresponding to the polymerizable compounds 1 to 3 described above and other polymerizable compounds.

The fluorine-containing compound may be any of a monomer, an oligomer, and a polymer, but is preferably an oligomer (fluorine-containing oligomer).

The curable composition for forming an HC layer can also contain the leveling agent and the antifoulant described in (vi) Other components, which will be described later, in addition to the above components.

As the antifoulant which can be used in the embodiment of the present invention, in addition to the above antifoulant, it is possible to use the materials described in paragraphs 0012 to 0101 in JP2012-088699A, and the content of the publication is incorporated into the present specification.

As the antifoulant described so far, those synthesized by known methods or commercial products may be used. As the commercial products, RS-90 and RS-78 manufactured by DIC Corporation and the like can be preferably used.

In a case where the curable composition for forming an HC layer contains an antifoulant, the content of the antifoulant with respect to the solid content of the curable composition for forming an HC layer is preferably 0.01% to 7% by mass, more preferably 0.05% to 5% by mass, and even more preferably 0.1% to 2% by mass.

The curable composition for forming an HC layer may contain only one kind of antifoulant or two or more kinds of antifoulants. In a case where the composition contains two or more kinds of antifoulants, it is preferable that the total content thereof is within the above range.

In addition, the curable composition for forming an HC layer can have a constitution which substantially does not contain an antifoulant.

(v) Solvent

It is also preferable that the curable composition for forming an HC layer contains a solvent. As the solvent, an organic solvent is preferable. One kind of organic solvent can be used, or two or more kinds of organic solvents can be used by being mixed together at any ratio. Specific examples of the organic solvent include alcohols such as methanol, ethanol, propanol, n-butanol, and i-butanol; ketones such as acetone, methyl isobutyl ketone, methyl ethyl ketone, and cyclohexanone; cellosolves such as ethyl cellosolve; aromatic solvents such as toluene and xylene; glycol ethers such as propylene glycol monomethyl ether; acetic acid esters such as methyl acetate, ethyl acetate, and butyl acetate; diacetone alcohol, and the like. Among these, cyclohexanone, methyl ethyl ketone, methyl isobutyl ketone, and methyl acetate are preferable, and a mixture of cyclohexanone, methyl ethyl ketone, methyl isobutyl ketone, and methyl acetate which are mixed at any ratio is more preferably used. In a case where the above constitution is adopted, an optical film having better rub resistance, punching properties, and adhesiveness is obtained.

The amount of the solvent in the curable composition for forming an HC layer can be appropriately adjusted within a range in which coating suitability of the composition can be secured. For example, the content of the solvent with respect to the total amount, 100 parts by mass, of the polymerizable compound and the photopolymerization initiator can be 50 to 500 parts by mass, and preferably 80 to 200 parts by mass.

The solid content in the curable composition for forming an HC layer is preferably 10% to 90% by mass, more preferably 50% to 80% by mass, and particularly preferably 65% to 75% by mass.

(vi) Other Components

The curable composition for forming an HC layer can contain one or more kinds of known additives in any amount, in addition to the above components. Examples of the additives include a surface conditioner, a leveling agent, a polymerization inhibitor, polyrotaxane, and the like. For the details of these, paragraphs 0032 to 0034 in JP2012-229412A can be referred to. Furthermore, the curable composition for forming an HC layer can also contain a commercial antifoulant or an antifoulant which can be prepared by a known method. However, the additives are not limited to these, and various additives generally added to the curable composition for forming an HC layer can be used. Furthermore, the curable composition for forming an HC layer can contain a known solvent in any amount.

The curable composition for forming an HC layer can be prepared by simultaneously mixing together the various components described above or by sequentially mixing them together in an arbitrary order. The preparation method is not particularly limited, and a known stirrer or the like can be used for the preparation.

2) Laminated Structure Including Two or More Layers

Figure 2:
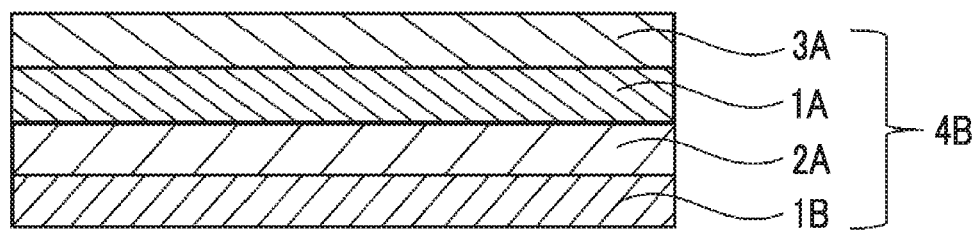
FIG. 2 is a vertical cross-sectional view showing an embodiment of the constitution of an optical film according to the embodiment of the present invention having a hard coat layer.

For the optical film of the embodiment of the present invention, an aspect is also preferable in which the HC layer 3A shown in FIG. 2 has at least a first HC layer and a second HC layer in this order from the resin film 1A side.

The first HC layer may be positioned on the surface of the resin film 1A, or there may be another layer between the resin film 1A and the first HC layer. Likewise, the second HC layer may be positioned on the surface of the first HC layer, or there may be another layer between the first HC layer and the second HC layer. From the viewpoint of improving the adhesiveness between the first HC layer and the second HC layer, it is preferable that the second HC layer is positioned on the surface of the first HC layer, that is, the first and second HC layers contact each other in at least a portion within the film surface.

Each of the first HC layer and the second HC layer may be constituted with one layer or two or more layers, and is preferably constituted with one layer.

In a case where the optical film of the embodiment of the present invention is used in a touch panel as will be specifically described later, it is preferable that the optical film is disposed such that the second HC layer becomes the front surface side of the image display device. In order to improve the rub resistance and the punching properties of the surface of the optical film, it is preferable that the second HC layer is disposed on the surface side, particularly, on the uppermost surface of the optical film.

<First HC Layer and Curable Composition for Forming First HC Layer>

A first HC layer used in the embodiment of the present invention is formed of a first curable composition for forming an HC layer.

The curable composition for forming the first HC layer contains a polymerizable compound 1 having a radically polymerizable group and a polymerizable compound 2 which has a cationically polymerizable group and a radically polymerizable group in the same molecule and is different from the polymerizable compound 1. The content of the polymerizable compound 2 between the polymerizable compounds contained in the curable composition for forming a first HC layer is equal to or greater than 51% by mass.

(Polymerizable Compound)

As the polymerizable compound 1, the description of the aforementioned radically polymerizable compound is preferably adopted, and as the polymerizable compound 2, the description of a) component in the aforementioned cationically polymerizable compound is preferably adopted.

The curable composition for forming a first HC layer may have another polymerizable compound different from the polymerizable compound 1 and the polymerizable compound 2.

Another polymerizable compound described above is preferably a polymerizable compound having a cationically polymerizable group. The cationically polymerizable group has the same definition as the cationically polymerizable group described above regarding the polymerizable compound 2, and the preferable range thereof is also the same. Particularly, in the present invention, as another polymerizable compound described above, a nitrogen-containing heterocyclic ring-containing compound containing a cationically polymerizable group is preferable. In a case where such a compound is used, the adhesiveness between the resin film and the first HC layer can be more effectively improved. Examples of the nitrogen-containing heterocyclic ring include a nitrogen-containing heterocyclic ring selected from the group consisting of isocyanurate rings (nitrogen-containing heterocyclic rings contained in the example compounds B-1 to B-3 which will be described later) and glycoluril rings (nitrogen-containing heterocyclic rings contained in the example compound B-10 which will be described later). As the nitrogen-containing heterocyclic ring, an isocyanurate ring is more preferable. The number of cationic groups contained in another polymerizable compound described above is preferably 1 to 10, and more preferably 2 to 5. In a case where a polymerizable compound having a cationically polymerizable group and a nitrogen-containing heterocyclic ring structure is used as another polymerizable compound described above, as the resin film, a resin film including an acrylic resin film is preferable. In a case where this constitution is adopted, the adhesiveness between the resin film and the first HC layer tends to be further improved.

Specific examples of another polymerizable compound described above include example compounds B-1 to B-14 described above, but the present invention is not limited to the specific examples.

(Others)

In addition, the description of the polymerization initiator, the inorganic particles, the matt particles, the ultraviolet absorber, the fluorine-containing compound, the solvent, and other components can also be preferably adopted.

Particularly, the curable composition for forming a first HC layer preferably contains a solvent, and a curable composition for forming a second HC layer preferably contains an antifoulant.

(Thickness of HC Layer)

The thickness of the HC layer is preferably equal to or greater than 3 μm and equal to or smaller than 100 μm, more preferably equal to or greater than 5 μm and equal to or smaller than 70 μm, and even more preferably equal to or greater than 10 μm and equal to or smaller than 50 μm.

(Pencil Hardness of HC Layer)

The higher the pencil hardness of the HC layer, the better. Specifically, the pencil hardness of the HC layer is preferably equal to or higher than 3H, more preferably equal to or higher than 5H, and even more preferably equal to or higher than 7H.

—Method for Forming HC Layer—

By coating the resin film with the curable composition for forming an HC layer directly or through another layer such as an easily adhesive layer and irradiating the composition with active energy rays, the HC layer can be formed. The coating can be performed by known coating methods such as a dip coating method, an air knife coating method, a curtain coating method, a roller coating method, a die-coating method, a wire bar coating method, and a gravure coating method. By simultaneously or sequentially coating the resin film with two or more kinds of compositions having different makeups, an HC layer having a laminated structure including two or more layers (for example, about two to five layers) can also be formed.

By irradiating the curable composition for forming an HC layer, with which the resin film is coated, with active energy rays, the HC layer can be formed. For example, in a case where the curable composition for forming an HC layer contains a radically polymerizable compound, a cationically polymerizable compound, a radical photopolymerization initiator, and a cationic photopolymerization initiator, a polymerization reaction between the radically polymerizable compound and the cationically polymerizable compound can be initiated and proceed by the action of a radical photopolymerization initiator and a cationic photopolymerization initiator respectively. The wavelength of radiated light may be determined according to the type of the polymerizable compound and the polymerization initiator used. Examples of light sources for light irradiation include a high-pressure mercury lamp, an ultrahigh-pressure mercury lamp, a carbon arc lamp, a metal halide lamp, a xenon lamp, a chemical lamp, an electrodeless discharge lamp, a Light Emitting Diode (LED), and the like that emit light in a wavelength range of 150 to 450 nm. The light irradiation amount is generally within a range of 30 to 3,000 $mJ/cm^3$, and preferably within a range of 100 to 1,500 $mJ/cm^2$. If necessary, a drying treatment may be performed before or after the light irradiation or before and after the light irradiation. The drying treatment can be performed by hot air blowing, disposing the resin film with the composition in a heating furnace, or transporting the resin film with the composition in a heating furnace, and the like. In a case where the curable composition for forming an HC layer contains a solvent, the heating temperature may be set to be a temperature at which the solvent can be dried and removed, but the heating temperature is not particularly limited. Herein, the heating temperature means the temperature of hot air or the internal atmospheric temperature of the heating furnace.

(4) Articles Having Optical Film

Examples of articles including the optical film of the embodiment of the present invention include various articles required to have improved keystroke durability and manufacturing suitability in various industrial fields such as the field of home appliances, the field of electricity and electronics, the field of automobiles, and the field of housing. Specifically, examples of such articles include a touch sensor, a touch panel, an image display apparatus such as a liquid crystal display, window glass of automobiles, window glass for home, and the like. By providing the optical film of the embodiment of the present invention preferably as a surface protect film in these articles, it is possible to provide articles exhibiting excellent keystroke durability with excellent manufacturing suitability. The optical film of the embodiment of the present invention is an optical film used in a front panel of an image display apparatus, and more preferably an optical film used in a front panel of an image display device of a touch panel.

The touch panel in which the optical film of the embodiment of the present invention can be used is not particularly limited, and can be appropriately selected according to the purpose. Examples of the touch panel include a surface capacitance-type touch panel, a projected capacitance-type touch panel, a resistive film-type touch panel, and the like. The details of the touch panel will be specifically described later.

The touch panel includes a so-called touch sensor. In the touch panel, the layer constitution of a touch panel sensor-electrode portion may be established by any of a bonding method in which two sheets of transparent electrodes are bonded to each other, a method of providing a transparent electrode on both surfaces of one sheet of substrate, a method using a single-face jumper or a through hole, or a single-face lamination method.

<<Image Display Apparatus>>

The image display apparatus having the optical film of the embodiment of the present invention is an image display apparatus including a front panel having the optical film of the embodiment of the present invention and an image display device.

As the image display apparatus, it is possible to use image display apparatuses such as a Liquid Crystal Display (LCD), a plasma display panel, an electroluminescence display, a cathode tube display, and a touch panel.

Examples of the liquid crystal display include a Twisted Nematic (TN) type, a Super-Twisted Nematic (STN) type, a Triple Super Twisted Nematic (TSTN) type, a multi domain type, a Vertical Alignment (VA) type, an In Plane Switching (IPS) type, an Optically Compensated Bend (OCB) type, and the like.

It is preferable that the image display apparatus has ameliorated brittleness and excellent handleability, does not impair display quality by surface smoothness or wrinkles, and can suppress the leakage of light at the time of a moisture-heat test.

That is, the image display apparatus having the optical film of the embodiment of the present invention preferably includes a liquid crystal display as an image display device. Examples of the image display apparatus having a liquid crystal display include Xperia P manufactured by Sony Ericsson Mobile, and the like.

It is also preferable that the image display apparatus having the optical film of the embodiment of the present invention has an organic Electroluminescence (EL) display device as an image display device.

For the organic electroluminescence display device, known techniques can be adopted without any limitation. Examples of the image display apparatus having an organic electroluminescence display device include GALAXY SII manufactured by SAMSUNG ELECTRONICS CO., LTD., and the like.

It is also preferable that the image display apparatus having the optical film of the embodiment of the present invention has an In-Cell touch panel display device as an image display device. The in-cell touch panel display device is a device in which the touch panel function is built in the cell of the image display device.

For the in-cell touch panel display device, for example, known techniques described in JP2011-076602A, JP2011-222009A, and the like can be adopted without any limitation. Examples of the image display apparatus having the in-cell touch panel display device include Xperia P manufactured by Sony Ericsson Mobile, and the like.

It is also preferable that the image display apparatus having the optical film of the embodiment of the present invention has an On-Cell touch panel display device as an image display device. The on-cell touch panel display device is a device in which the touch panel function is built on the outside of the cell of the image display device.

For the on-cell touch panel display device, for example, known techniques described in JP2012-088683A and the like can be adopted without any limitation. Examples of the image display apparatus having the on-cell touch panel display device include GALAXY S11 manufactured by SAMSUNG ELECTRONICS CO., LTD., and the like.

<<Touch Panel>>

The touch panel having the optical film of the embodiment of the present invention is a touch panel including a touch sensor obtained by bonding a touch sensor film to the optical film of the embodiment of the present invention. In a case where the optical film according to the embodiment of the present invention has the HC layer, it is preferable that the touch sensor film is bonded to the resin film surface opposite to the surface on which the HC layer is disposed.

The touch sensor film is not particularly limited, but is preferably a conductive film in which a conductive layer is formed.

The conductive film is preferably a conductive film obtained by forming a conductive layer on any support.

The material of the conductive layer is not particularly limited, and examples thereof include indium×tin composite oxide (Indium Tin Oxide: ITO), tin oxide, tin×titanium composite oxide (Antimony Tin Oxide; ATO), copper, silver, aluminum, nickel, chromium, an alloy of these, and the like.

It is preferable that the conductive layer is an electrode pattern. Furthermore, it is preferable that the conductive layer is a transparent electrode pattern. The electrode pattern may be obtained by patterning a transparent conductive material layer or obtained by forming a layer of non-transparent conductive material by patterning.

As the transparent conductive material, it is possible to use an oxide such as ITO or ATO, silver nanowires, carbon nanotubes, a conductive polymer, and the like.

Examples of the layer of a non-transparent conductive material include a metal layer. As the metal layer, any metal having conductivity can be used, and silver, copper, gold, aluminum, and the like are suitably used. The metal layer may be a simple metal or an alloy, or may be a layer in which metal particles are bonded to each other through a binder. If necessary, the surface of the metal may be subjected to a blackening treatment, a rust-proofing treatment, and the like. In a case where a metal is used, a substantially transparent sensor portion and a peripheral wiring portion can be collectively formed.

It is preferable that the conductive layer contains a plurality of metal thin wires.

The metal thin wires are preferably formed of silver or an alloy containing silver. The conductive layer containing metal thin wires formed of silver or an alloy containing silver is not particularly limited, and known conductive layers can be used. For example, it is preferable to use the conductive layer described in paragraphs 0040 and 0041 in JP2014-168886A, and the content of the publication is incorporated into the present specification.

It is also preferable that the metal thin wires are formed of copper or an alloy containing copper. The alloy is not particularly limited, and known conductive layers can be used. For example, it is preferable to use the conductive layer described in paragraphs 0038 to 0059 in JP2015-049852A, and the content of the publication is incorporated into the present specification.

It is also preferable that the conductive layer is formed of an oxide. In a case where the conductive layer is formed of an oxide, it is more preferable that the oxide is formed of indium oxide containing tin oxide or of tin oxide containing antimony. The conductive layer formed of an oxide is not particularly limited, and known conductive layers can be used. For example, it is preferable to use the conductive layer described in paragraphs 0017 to 0037 in JP2010-027293A, and the content of the publication is incorporated into the present specification.

Among these conductive layers constituted as above, a conductive layer is preferable which includes a plurality of metal thin wires that are disposed in a mesh shape or a random shape, and a conductive layer is more preferable in which the metal thin wires are disposed in a mesh shape. Particularly, a conductive layer is preferable in which the metal thin wires are disposed in a mesh shape and formed of a silver or an alloy containing silver.

It is also preferable that the touch sensor film has a conductive layer on both surfaces thereof.

Paragraphs 0016 to 0042 in JP2012-206307A describe preferred aspects of the touch sensor film, and the content of the publication is incorporated into the present specification.

<<Resistive Film-Type Touch Panel>>

The resistive film-type touch panel having the optical film of the embodiment of the present invention is a resistive film-type touch panel which has the front panel having the optical film of the embodiment of the present invention.

Basically, the resistive film-type touch panel has a constitution in which conductive films including a pair of upper and lower substrates each having a conductive film are disposed with a spacer therebetween such that the conductive films face each other. The constitution of the resistive film-type touch panel is known, and in the present invention, known techniques can be applied without any limitation.

<<Capacitance-Type Touch Panel>>

The capacitance-type touch panel having the optical film of the embodiment of the present invention is a capacitance-type touch panel which has the front panel having the optical film of the embodiment of the present invention.

Examples of the capacitance-type touch panel include a surface capacitance-type touch panel and a projected capacitance-type touch panel. The projected capacitance-type touch panel has a basic constitution in which an X-axis electrode and a Y-axis electrode orthogonal to the X-axis electrode are disposed having an insulator therebetween. Specific aspects thereof include an aspect in which the X electrode and the Y electrode are formed on each surface of one substrate, an aspect in which the X electrode, the insulating layer, and the Y electrode are formed in this order on one substrate, an aspect in which the X electrode is formed on one substrate and the Y electrode is formed on the other substrate (in this aspect, a constitution in which two substrates are bonded to each other is the aforementioned basic constitution), and the like. The constitution of the capacitance-type touch panel is known, and in the present invention, known techniques can be adopted without any limitation.

Figure 3:
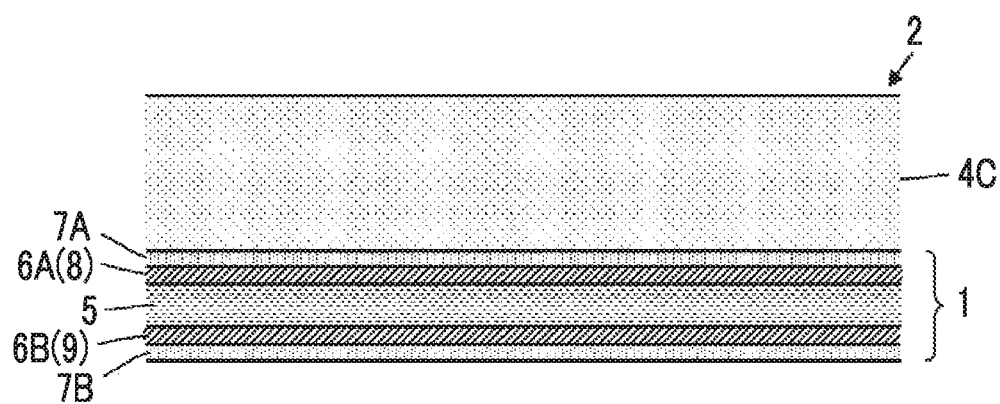
FIG. 3 is a schematic cross-sectional view showing an embodiment of a capacitance-type touch panel.

FIG. 3 shows an example of the constitution of an embodiment of a capacitance-type touch panel. A touch panel 2 is used in combination with a display apparatus. The display apparatus is used by being disposed on a protective layer 7B side in FIG. 3, that is, on a display apparatus side. In FIG. 3, the optical film 4C side of the embodiment of the present invention is a viewing side (that is, a side on which a person operating the touch panel visually recognizes an image displayed on the display apparatus). The optical film 4C of the embodiment of the present invention is used by being bonded to a conductive film 1 for a touch panel. The conductive film 1 for a touch panel includes a conductive member 6A (first conductive layer 8) and a conductive member 6B (second conductive layer 9) on both surfaces of a flexible transparent insulating substrate 5. Each of the conductive member 6A and the conductive member 6B at least constitutes an electrode, peripheral wiring, an external connection terminal, and a connector portion as a touch panel which will be described later.

As shown in FIG. 3, for the purpose of flattening or protecting the conductive members 6A and 6B, transparent protective layers 7A and 7B may be disposed to cover the conductive member 6A and the conductive member 6B.

In the optical film 4C, a decorative layer for shielding a peripheral region S2, which will be described later, from light may be formed.

As the material of the transparent insulating substrate 5, glass, polyethylene terephthalate (PET), polyethylene naphthalate (PEN), a cycloolefin polymer (COP), a cycloolefin copolymer (COC), polycarbonate (PC), and the like can be used. The thickness of the transparent insulating substrate 5 is preferably 20 to 200 mm.

A pressure sensitive adhesive layer (not shown in the drawing) may be disposed between the optical film 4C and the conductive film 1 for a touch panel. As the pressure sensitive adhesive layer, it is possible to use an Optical Clear Adhesive or an Optical Clear Resin. The thickness of the pressure sensitive adhesive layer is preferably 10 to 100 μm. As the optical clear adhesive, for example, an 8146 series manufactured by 3M can be preferably used. The relative permittivity of the pressure sensitive adhesive layer is preferably 4.0 to 6.0, and more preferably 5.0 to 6.0.

As the protective layer 7A and the protective layer 7B, for example, it is possible to use an organic film such as gelatin, an acrylic resin, or a urethane resin and an inorganic film such as silicon dioxide. The thickness thereof is preferably equal to or greater than 10 nm and equal to or smaller than 100 nm. The relative permittivity thereof is preferably 2.5 to 4.5.

The concentration of halogen impurities in the protective layer 7A and the protective layer 7B is preferably equal to or lower than 50 ppm. It is more preferable that the protective layer 7A and the protective layer 7B do not contain halogen impurities. According to this aspect, it is possible to inhibit the corrosion of the conductive member 6A and the conductive member 6B.

Figure 4:
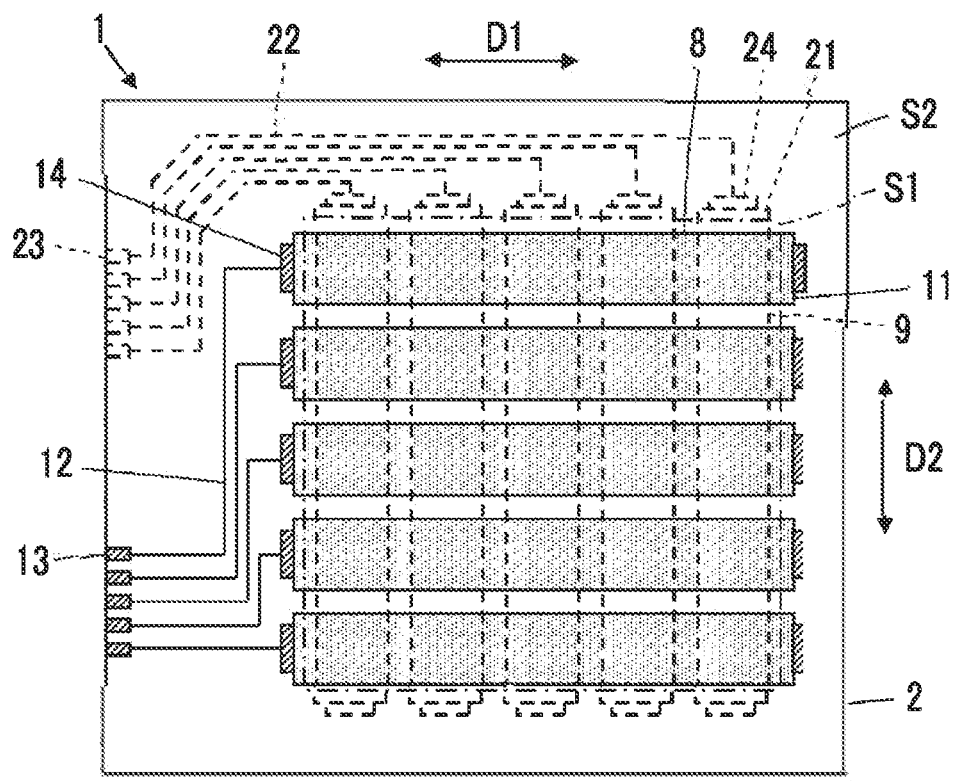
FIG. 4 is a schematic view of a conductive film for a touch panel.

As shown in FIG. 4, the conductive film 1 for a touch panel is divided into a transparent active area S1 and a peripheral region S2 which is on the outside of the active area S.

Within the active area S1, the first conductive layer 8 formed on the front surface (first surface) of the transparent insulating substrate 5 and the second conductive layer 9 formed on the rear surface (second surface) of the transparent insulating substrate 5 are disposed such that they overlap each other. The first conductive layer 8 and the second conductive layer 9 are disposed in a state where they are insulated from each other through the transparent insulating substrate 5.

The first conductive layer 8 on the front surface of the transparent insulating substrate 5 forms a plurality of first electrodes 11 which each extend along a first direction D1 and are disposed in parallel to each other along a second direction D2 orthogonal to the first direction D1. The second conductive layer 9 on the rear surface of the transparent insulating substrate 5 forms a plurality of second electrodes 21 which each extend along the second direction D2 and are disposed in parallel to each other along the first direction D1.

The plurality of first electrodes 11 and the plurality of second electrodes 21 constitute detection electrodes of the touch panel 2. Each of the first electrode 11 and the second electrode 21 preferably has an electrode width of 1 to 5 mm, and an interelectrode pitch thereof is preferably 3 to 6 mm.

On the front surface of the transparent insulating substrate 5 in the peripheral region S2, a plurality of first peripheral wiring 12 connected to the plurality of first electrodes 11 are formed, and a plurality of first external connection terminals 13 are arrayed and formed in the border portion of the transparent insulating substrate 5. Furthermore, at both ends of each of the first electrodes 11, a first connector portion 14 is formed. The first connector portion 14 is connected to one end of the corresponding first peripheral wiring 12, and the other end of the first peripheral wiring 12 is connected to the corresponding first external connection terminal 13.

Likewise, on the rear surface of the transparent insulating substrate 5 in the peripheral region S2, a plurality of second peripheral wiring 22 connected to the plurality of second electrodes 21 are formed, and a plurality of second external connection terminals 23 are arrayed and formed in the border portion of the transparent insulating substrate 5. Furthermore, at both ends of each of the second electrodes 21, a second connector portion 24 is formed. The second connector portion 24 is connected to one end of the corresponding second peripheral wiring 22, and the other end of the second peripheral wiring 22 is connected to the corresponding second external connection terminal 23.

The conductive film 1 for a touch panel has a conductive member 6A which has the first electrode 11, the first peripheral wiring 12, the first external connection terminal 13, and the first connector portion 14 on the front surface of the transparent insulating substrate 5 and the conductive member 6B which has the second electrode 21, the second peripheral wiring 22, the second external connection terminal 23, and the second connector portion 24 on the rear surface of the transparent insulating substrate 5.

In FIG. 4, although the first electrode 11 and the first peripheral wiring 12 are connected to each other through the first connector portion 14, a constitution may also be adopted in which the first connector portion 14 is not provided such that the first electrode 11 and the first peripheral wiring 12 are directly connected to each other. Furthermore, a constitution may also be adopted in which the second connector portion 24 is not provided such that the second electrode 21 and the second peripheral wiring 22 are directly connected to each other.

In a case where the first connector portion 14 and the second connector portion 24 are provided, electricity can be effectively excellently conducted at the site where the electrode and the peripheral wiring are connected to each other. Particularly, in a case where the electrode and the peripheral wiring are formed of different materials, it is preferable to provide the first connector portion 14 and the second connector portion 24. The width of each of the first connector portion 14 and the second connector portion 24 is preferably equal to or greater than 1/3 of the width of the electrode connected to each of the connector portions and equal to or smaller than the width of the electrode. The first connector portion 14 and the second connector portion 24 may have the shape of a solid film, the frame shape shown in WO2013/089085A, or a mesh shape.

The wiring width of the first peripheral wiring 12 and the second peripheral wiring 22 is equal to or greater than 10 μm and equal to or smaller than 200 μm, and the minimum wiring interval (minimum interwiring distance) is preferably equal to or greater than 20 μm and equal to or smaller than 100 μm.

Each of the peripheral wiring may be covered with a protective insulating film formed of a urethane resin, an acrylic resin, an epoxy resin, or the like. In a case where the protective insulating film is provided, it is possible to prevent the migration, rusting, and the like of the peripheral wiring. It is preferable that the insulating film does not contain halogen impurities because the impurities are likely to cause the corrosion of the peripheral wiring. The thickness of the protective insulating film is preferably 1 to 20 μm.

In a case where the conductive film 1 for a touch panel is used as a touch panel, the first external connection terminal 13 and the second external connection terminal 23 are electrically connected to Flexible Printed Circuits through an Anisotropic Conductive Film. The flexible printed circuits are connected to a touch panel control board having a driving function and a position detection function.

For the purpose of improving the electric connectivity with respect to the flexible printed circuits, the first external connection terminal 13 and the second external connection terminal 23 are formed to have a terminal width larger than the wiring width of the first peripheral wiring 12 and the second peripheral wiring 22. Specifically, each of the first external connection terminal 13 and the second external connection terminal 23 preferably has a terminal width equal to or greater than 0.1 mm and equal to or smaller than 0.6 mm and a terminal length equal to or greater than 0.5 mm and equal to or smaller than 2.0 mm.

The transparent insulating substrate 5 corresponds to a substrate having a first surface and a second surface facing the first surface. The first conductive layer 8 is disposed on the first surface (front surface), and the second conductive layer 9 is disposed on the second surface (rear surface).

Although FIG. 3 shows a state where the transparent insulating substrate 5 directly contact the first conductive layer 8 and the second conductive layer 9, one or more functional layers such as an adhesion enhancing layer, an undercoat layer, a hardcoat layer, and an optical adjustment layer can be formed between the transparent insulating substrate 5 and the first conductive layer 8 as well as the second conductive layer 9.

Figure 5:
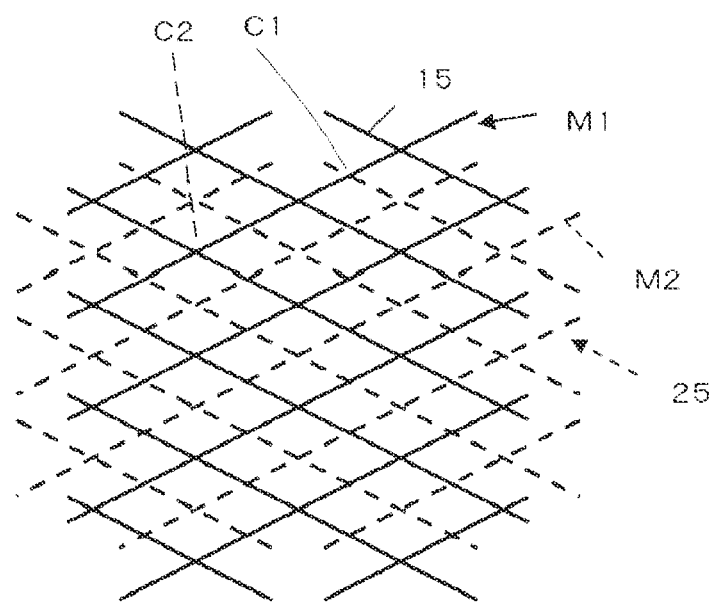
FIG. 5 is a schematic view showing portions in which a first electrode 11 and a second electrode 21 in FIG. 4 cross each other.

FIG. 5 shows portions in which the first electrode 11 and the second electrode 21 cross each other. The first electrode 11 disposed on the front surface of the transparent insulating substrate 5 is formed of a mesh pattern M1 formed of a first metal thin wire 15, and the second electrode 21 disposed on the rear surface of the transparent insulating substrate 5 is formed of a mesh pattern M2 formed of a second metal thin wire 25. In a case where the touch panel is viewed from the viewing side, the first metal thin wire 15 and the second metal thin wire 25 are found to be disposed such that they cross each other in the portions in which the first electrode 11 and the second electrode 21 cross each other. In FIG. 5, in order to make it easy for the first metal thin wire 15 and the second metal thin wire 25 to be differentiated from each other, the second metal thin wire 25 is indicated by a dotted line, but in reality, the second metal thin wire 25 is formed of a connected wire just like the first metal thin wire 15.

It is preferable that the mesh pattern has a pattern shape in which the same mesh (regular cell) as shown in FIG. 5 is repeatedly disposed, and the mesh shape is particularly preferably a diamond shape. The pattern shape may be a quadrangular shape such as a parallelogram, a square, or a rectangle, a regular hexagon shape, or other polygon shapes. In a case where the mesh shape is a diamond shape, from the viewpoint of reducing moire formed between the pattern and the pixels of the display apparatus, an acute angle of the diamond is preferably equal to or greater than 20° and equal to or smaller than 70°. From the viewpoint of visibility, the center-to-center distance between meshes (mesh pitch) is preferably 100 to 600 μm. It is preferable that the mesh pattern M1 formed of the first metal thin wire 15 and the mesh pattern M2 formed of the second metal thin wire 25 have the same shape. Furthermore, from the viewpoint of visibility, it is preferable that the mesh pattern M1 formed of the first metal thin wire 15 and the mesh pattern M2 formed of the second metal thin wire 25 are disposed by being caused to deviate from each other by a distance corresponding to ½ of the mesh pitch as shown in FIG. 5 such that a mesh pattern having a mesh pitch that is ½ of the aforementioned mesh pitch is formed from the viewing side. In another aspect, the mesh shape may be a random pattern or a semi-random shape obtained by imparting a certain degree of randomicity to a regular cell shape as described in JP2013-214545A in which about 10% of randomicity is imparted to the pitch of regular diamond cells.

Furthermore, a dummy mesh pattern, which is insulated from the electrodes formed of the first metal thin wire 15 and the second metal thin wire 25 respectively, may be provided between the first electrodes 11 adjacent to each other and between the second electrodes 21 adjacent to each other. It is preferable that the dummy mesh pattern is formed to have the same mesh shape as that of the mesh pattern forming the electrodes.

The touch panel 2 and the display apparatus may be bonded to each other by a method of directly bonding them to each other by using a transparent pressure sensitive adhesive (direct bonding method) or a method of bonding only the peripheries of the touch panel 2 and the display apparatus to each other by using a double-sided tape (air gap method), and any of these may be used. At the time of bonding the touch panel 2 and the display apparatus to each other, a protective film may be additionally provided on the conductive member 6B or the protective layer 7B. As the protective film, for example, a PET film (thickness: 20 to 150 μm) with a hardcoat is used. It is possible to adopt a constitution in which the protective film is bonded to the surface of the conductive member 6B or the protective layer 7B by using an Optical Clear Adhesive.

As the transparent pressure sensitive adhesive used in the direct bonding method, it is possible to use an Optical Clear Adhesive or an Optical Clear Resin used as the transparent pressure sensitive adhesive layer described above, and the thickness thereof is preferably equal to or greater than 10 μm and equal to or smaller than 100 μm. As the optical clear adhesive, for example, an 8146 series manufactured by 3M can be preferably used as described above. It is preferable that the relative permittivity of the transparent pressure sensitive adhesive used in the direct bonding method is lower than the relative permittivity of the aforementioned transparent pressure sensitive adhesive layer, because then the detection sensitivity of the touch panel 2 is improved. The relative permittivity of the transparent pressure sensitive adhesive used in the direct bonding method is preferably 2.0 to 3.0.

In view of further improving the effects of the present invention, the visible light reflectance of each of the viewing side surface of the first metal thin wire 15 and the viewing side surface of the second metal thin wire 25 is preferably equal to or lower than 5%, and more preferably less than 1%. In a case where the visible light reflectance is within this range, the mesh can be effectively inhibited from being noticed, or haze can be effectively reduced. The visible light reflectance is measured as below, for example. First, by using an ultraviolet-visible spectrophotometer V660 (single reflection measurement unit SLM-721) manufactured by JASCO Corporation, a reflectance spectrum is measured at a measurement wavelength of 350 nm to 800 nm and an incidence angle of 5°. At this time, the regular reflection light from a vapor-deposited aluminum flat mirror is used as a base line. From the obtained reflectance spectrum, the Y value in the XYZ color space (color-matching function JIS Z9701-1999) with a light source of D65 at a 2 degree field of view is calculated using a color computation program manufactured by JASCO Corporation, and the calculated value is taken as the visible light reflectance.

As the materials constituting the first metal thin wire 15 and the second metal thin wire 25, it is possible to use metals such as silver, aluminum, copper, gold, molybdenum, and chromium, and an alloy of these. These materials can be used as a single layer or a laminate. From the viewpoint of inhibiting the mesh of the metal thin wire from being noticed and reducing moire, the line width of each of the first metal thin wire 15 and the second metal thin wire 25 is preferably equal to or greater than 0.5 μm and equal to or smaller than 5 μm. The first metal thin wire 15 and the second metal thin wire 25 may be in the form of a straight line, a folded line, a curved line, or a wavy line. The thickness of each of the first metal thin wire 15 and the second metal thin wire 25 is preferably equal to or greater than 0.1 μm from the viewpoint of the value of resistance, and preferably equal to or smaller than 3 μm from the viewpoint of the visibility in an oblique direction. From the viewpoint of the visibility in an oblique direction and from the viewpoint of the workability of patterning, the thickness is more preferably equal to or smaller than ½ of the line width of the metal thin wire. In addition, in order to reduce the visible light reflectance of the first metal thin wire 15 and the second metal thin wire 25, a blackened layer may be provided on the viewing side of the first metal thin wire 15 and the second metal thin wire 25.

The conductive member 6A including the first electrode 11, the first peripheral wiring 12, the first external connection terminal 13, and the first connector portion 14 can be formed of the material constituting the first metal thin wire 15. Accordingly, all the conductive members 6A each including the first electrode 11, the first peripheral wiring 12, the first external connection terminal 13, and the first connector portion 14 can be simultaneously formed of the same metal at the same thickness.

The same is true for the conductive member 6B including the second electrode 21, the second peripheral wiring 22, the second external connection terminal 23, and the second connector portion 24.

The sheet resistance of the first electrode 11 and the second electrode 21 is preferably equal to or higher than 0.1 W/square and equal to or lower than 200 W/square. Particularly, in a case where the electrodes are used in a projected capacitance-type touch panel, the sheet resistance thereof is preferably equal to or higher than 10 W/square and equal to or lower than 100 W/square.

Figure 6:
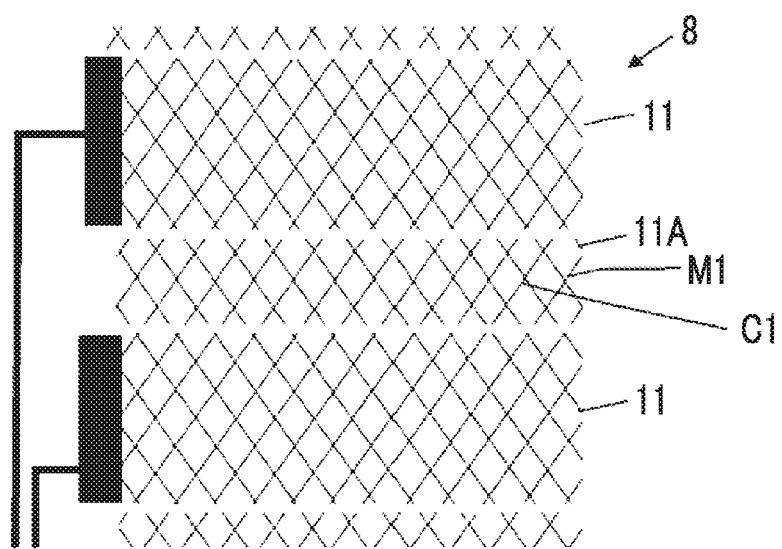
FIG. 6 is a schematic view showing an embodiment of a first dummy electrode 11A that a first conductive layer 8 in an active area S1 in FIG. 4 may have.

As shown in FIG. 6, the first conductive layer 8 disposed on the front surface of the transparent insulating substrate 5 in the active area S may have a plurality of first dummy electrodes 11A each of which is disposed between the plurality of first electrodes 11. These first dummy electrodes 11A are insulated from the plurality of first electrodes 11, and have the first mesh pattern M1 constituted with a number of first cells C1 just like the first electrodes 11.

A disconnection portion having a width equal to or greater than 5 µm and equal to or smaller than 30 µm is provided in the metal thin wire disposed along the continuous first mesh pattern M1, and in this way, the first electrode 11 and the adjacent first dummy electrode 11A are electrically insulated from each other. Although FIG. 6 shows a state where the disconnection portion is formed only in the border line between the first electrode 11 and the adjacent first dummy electrode 11A, the disconnected portion may be formed in all or some of the sides of the first cell C1 in the first dummy electrode 11A.

The second conductive layer 9 disposed on the rear surface of the transparent insulating substrate 5 in the active area S1 may have a plurality of second dummy electrodes each of which is disposed between the plurality of second electrodes 21, although second conductive layer 9 is not shown in the drawing. These second dummy electrodes are insulated from the plurality of second electrodes 21, and have the second mesh pattern M2 constituted with a number of second cells C2 just like the second electrodes 21.

A disconnection portion having a width equal to or greater than 5 µm and equal to or smaller than 30 µm is provided in the metal thin wire disposed along the continuous second mesh pattern M2, and in this way, the second electrode 21 and the adjacent second dummy electrode are electrically insulated from each other. The disconnection portion may be formed only in the border line between the second electrode 21 and the adjacent first dummy electrode, or may be formed in all or some of the sides of the second cell C2 in the second dummy electrode.

As described above, the conductive film 1 for a touch panel is manufactured by forming the conductive member 6A, which includes the first electrode 11, the first peripheral wiring 12, the first external connection terminal 13, and the first connector portion 14, on the front surface of the transparent insulating substrate 5 and forming the conductive member 6B, which includes the second electrode 21, the second peripheral wiring 22, the second external connection terminal 23, and the second connector portion 24, on the rear surface of the transparent insulating substrate 5.

At this time, the first electrode 11 is formed of the first conductive layer 8 in which the first metal thin wire 15 is disposed along the first mesh pattern M1, the second electrode 21 is formed of the second conductive layer 9 in which the second metal thin wire 25 is disposed along the second mesh pattern M2, and the first conductive layer 8 and the second conductive layer 9 are disposed such that the conductive layers overlap each other in the active area S1 as shown in FIG. 4 in a state of interposing the transparent insulating substrate 5 therebetween.

The method of forming the conductive member 6A and the conductive member 6B is not particularly limited. For example, as described in paragraphs <0067> to <0083> in JP2012-185813A, paragraphs <0115> to <0126> in JP2014-209332A, or paragraphs <0216> and <0233> in JP2015-005495A, by exposing a photosensitive material, which has an emulsion layer containing a photosensitive silver halide salt, to light and performing a development treatment, the conductive members 6A and 6B can be formed.

The conductive members can also be formed by forming a metal thin film on each of the front surface and the rear surface of the transparent insulating substrate 5 and patternwise printing a resist on each of the metal thin film or by performing exposure and development on a resist, with which the entire surface of the substrate is coated, such that a pattern is formed and etching the metal in the opening portion. In addition, it is possible to use a method in which a paste containing the fine particles of a material constituting the conductive member is printed on the front surface and the rear surface of the transparent insulating substrate 5 and plated with a metal, a method of using an ink jet method in which an ink containing the fine particles of a material constituting the conductive member is used, a method of forming the conductive member through screen printing by using an ink containing the fine particles of a material constituting the conductive member, a method of forming grooves in the transparent insulating substrate 5 and coating the grooves with a conductive ink, a patterning method exploiting a microcontact printing, and the like.

In the aspect described above, the conductive member 6A including the first electrode 11, the first peripheral wiring 12, the first external connection terminal 13, and the first connector portion 14 is disposed on the front surface of the transparent insulating substrate 5, and the conductive member 6B including the second electrode 21, the second peripheral wiring 22, the second external connection terminal 23, and the second connector portion 24 is disposed on the rear surface of the transparent insulating substrate 5. However, the present invention is not limited to this aspect.

For example, a constitution may be adopted in which the conductive member 6A and the conductive member 6B are disposed on one surface of the transparent insulating substrate 5 through an interlayer insulating film.

Furthermore, a constitution can be adopted in which two sheets of substrates are used. That is, the conductive member 6A can be disposed on the front surface of a first transparent insulating substrate, the conductive member 6B can be disposed on the front surface of a second transparent insulating substrate, and the first transparent insulating substrate and the second transparent insulating substrate can be used by being bonded to each other by using an Optical Clear Adhesive.

Moreover, a constitution may be adopted in which the conductive member 6A and the conductive member 6B are disposed on a surface of the optical film 4C shown in FIG. 3 through an interlayer insulating film without using the transparent insulating substrate 5.

It goes without saying that the electrode pattern shape of the capacitance-type touch panel can be applied to, in addition to a so-called bar-and-stripe electrode pattern shape shown in FIG. 4, for example, the diamond pattern disclosed in FIG. 16 in WO2010/012179A and the electrode pattern shape disclosed in FIG. 7 or 20 in WO2013/094728A. Furthermore, the electrode pattern shape can be applied to electrode pattern shapes of other capacitance-type touch panels.

In addition, the electrode pattern shape can be applied to a touch panel disclosed in US2012/0262414 that has a constitution in which a detection electrode is provided only on one side of a substrate as in an electrode constitution without a crossing portion.

The touch panel can be used in combination with other functional films such as the functional film for improving image quality disclosed in JP2014-013264A that prevents the occurrence of rainbow-like irregularities by using a substrate having a high retardation value, the circular polarization plate disclosed in JP2014-142462A that is for improving the visibility of a touch panel electrode, and the like.

<<Mirror with Image Display Function>>

The optical film of the embodiment of the present invention may have a reflection layer (linear polarization reflection layer or a circular polarization reflection layer) on a surface, which is opposite to a surface having the adhesive layer, of one of the resin films. By being combined with an image display device, the optical film is preferably used as an optical film used in a front panel of a mirror with an image display function. A pressure sensitive adhesive layer may be disposed between the optical film according to the embodiment of the present invention and the reflection layer. As the pressure sensitive adhesive layer, an Optical Clear Adhesive or an Optical Clear Resin can be used.

In the present specification, the optical film having a linear polarization reflection layer or a circular polarization reflection layer that is used in a front panel of a mirror with an image display function is referred to as "half mirror" in some cases.

It is not specifically limited as an image display device used with the mirror with an image display function, For example, the image display device suitably used in the above-mentioned image display apparatus is mentioned.

The mirror with an image display function has a constitution in which an image display device is disposed on a side, which is provided with a linear polarization reflection layer or a circular polarization reflection layer, of the half mirror. In the mirror with an image display function, the half mirror and the image display device may directly contact each other, or another layer may be interposed between the half mirror and the image display device. For example, an air layer or an adhesive layer may be present between the image display device and the half mirror.

In the present specification, a surface, which is on the half mirror side, of the image display device is referred to as a front surface.

The mirror with an image display function can be used as a rearview mirror (inner mirror), for example. In order to be used as a rearview mirror, the mirror with an image display function may have a frame, a housing, a support arm for mounting the mirror on the body of a vehicle, and the like.

Alternatively, the mirror with an image display function may be formed to be incorporated into a rearview mirror. In the mirror with an image display function having the aforementioned shape, generally, the directions, right and left and top and bottom, at the time of use can be specified.

The mirror with an image display function may be in the form of a plate or film and may have a curved surface. The front surface of the mirror with an image display function may be flat or curved. In a case where the mirror is curved such that the convex surface becomes the front surface side, the mirror can be used as a wide mirror which makes it possible to secure rearward visibility at a wide angle. The curved front surface can be prepared using a curved half mirror.

The mirror may be curved in either or both of a vertical direction and the horizontal direction. Furthermore, the radius of curvature of the curve may be 500 to 3,000 mm, and is preferably 1,000 to 2,500 mm. The radius of curvature is the radius of a hypothetic circumscribed circle of the curved portion in a cross section.

<<Reflection Layer>>

As the reflection layer, a reflection layer which can function as a half-transmission half-reflection layer may be used. That is, at the time of performing image display, the reflection layer may function to transmit the light emitted from a light source included in the image display device such that an image is displayed on the front surface of the mirror with an image display function. While image display is not being performed, the reflection layer may function to reflect at least some of the incoming rays in the front surface direction and transmit the light reflected from the image display device such that the front surface of the mirror with an image display function becomes a mirror.

As the reflection layer, a polarization reflection layer is used. The polarization reflection layer may be a linear polarization reflection layer or a circular polarization reflection layer.

[Linear Polarization Reflection Layer]

Examples of the linear polarization reflection layer include (i) linear polarization reflection plate having a multilayer structure, (ii) polarizer obtained by laminating thin films of different birefringences, (iii) wire grid-type polarizer, (iv) polarizing prism, and (v) scattering anisotropy-type polarizing plate.

Examples of (i) linear polarization reflection plate having a multilayer structure include a multilayer laminated thin film obtained by laminating dielectric materials of different refractive indices on a support by a vacuum vapor deposition method or a sputtering method in an oblique direction. In order to obtain a wavelength selective reflection film, it is preferable to alternately laminate a plurality of dielectric thin films of high refractive index and a plurality of dielectric thin films of low refractive index. However, the number of kinds of the thin films laminated is not limited to 2, and more kinds of thin films may be laminated. The number of thin films laminated is preferably 2 to 20, more preferably 2 to 12, even more preferably 4 to 10, and particularly preferably 6 to 8. In a case where the number of thin films laminated is greater than 20, the production efficiency is reduced, and hence the objects and effects of the present invention cannot be achieved in some cases.

The method for forming the dielectric thin film is not particularly limited, and can be appropriately selected according to the purpose. Examples thereof include a vacuum vapor deposition method such as ion plating and ion beams, a physical vapor deposition method (PVD method) such as sputtering, and a chemical vapor deposition method (CVD method). Among these, a vacuum vapor deposition method or a sputtering method is preferable, and a sputtering method is particularly preferable.

As (ii) polarizer obtained by laminating thin films of different birefringences, for example, it is possible to use the polarizer described in JP1997-506837A (JP-H09-506837A) and the like. Furthermore, by performing processing under the condition selected to obtain a relationship of refractive index, the polarizer can be formed using a wide variety of materials. Generally, it is preferable that one of the first materials have a refractive index different from that of a second material in a selected direction. The difference in a refractive index can be achieved by various methods including stretching performed while a film is being formed or after a film is formed, extrusion molding, or coating. In addition, it is preferable that the two materials have similar rheological characteristics (for example, melt viscosity) such that the materials can be simultaneously extruded.

As the polarizer obtained by laminating thin films of different birefringences, commercial products can be used. Examples of the commercial products include DBEF (registered trademark) (manufactured by 3M).

(iii) Wire grid-type polarizer is a polarizer which transmits one polarization while reflects the other polarization by the birefringence of metal thin wires.

The wire grid polarizer is a periodic array of metal wires. Therefore, this polarizer is mainly used in a terahertz wave band. In order for the wire grid to function as a polarizer, the wire interval is preferably sufficiently smaller than the wavelength of the incoming electromagnetic wave.

In the wire grid polarizer, metal wires are arrayed at equal intervals. A polarization component in a polarization direction parallel to the longitudinal direction of the metal wire is reflected from the wire grid polarizer, and a polarization component in a polarization direction perpendicular to the longitudinal direction of the metal wire is transmitted through the wire grid polarizer.

As the wire grid-type polarizer, commercial products can be used. Examples of the commercial products include a wire grid polarization filter 50×50, NT46-636 (trade name) manufactured by Edmund Optics.

[Circular Polarization Reflection Layer]

In a case where a circular polarization reflection layer is used in the half mirror, the incoming rays from the front surface side can be reflected as circular polarization, and the incoming rays from the image display device can be transmitted as circular polarization. Therefore, with the mirror with an image display function in which the circular polarization reflection layer is used, a display image and an image reflected from the mirror can be observed through polarized sunglasses without relying on the direction of the mirror with an image display function.

Examples of the circular polarization reflection layer include a circular polarization reflection layer including a linear polarization reflection plate and a ¼ wavelength plate and a circular polarization reflection layer including a cholesteric liquid crystal layer (hereinafter, to distinguish between the two circular polarization reflection layers, the former will be referred to as "Pol λ/4 circular polarization reflection layer" in some cases, and the latter will be referred to as "cholesteric circular polarization reflection layer" in some cases).

[[Pol λ/4 Circular Polarization Reflection Layer]]

In the Pol λ/4 circular polarization reflection layer, the linear polarization reflection plate and the ¼ wavelength plate may be disposed such that the slow axis of the λ/4 wavelength plate intersects with the polarization reflection axis of the linear polarization reflection plate at 45°. The ¼ wavelength plate and the linear polarization reflection plate may be bonded to each other through an adhesive layer, for example.

In a case where the Pol λ/4 circular polarization reflection layer is used in which the linear polarization reflection plate is disposed to become a surface close to the image display device, that is, in a case where the Pol λ/4 circular polarization reflection layer is used in which the ¼ wavelength plate and the linear polarization reflection plate are disposed in this order on the optical film, it is possible to efficiently convert the light for image display from the image display device into circular polarization and to cause the circular polarization to be emitted from the front surface of the mirror with an image display function. In a case where the light for image display from the image display device is linear polarization, the polarization reflection axis of the linear polarization reflection plate may be adjusted such that the linear polarization is transmitted.

The thickness of the Pol λ/4 circular polarization reflection layer is preferably within a range of 2.0 µm to 300 µm, and more preferably within a range of 8.0 µm to 200 µm.

As the linear polarization reflection plate, those described above as the linear polarization reflection layer can be used.

As the ¼ wavelength plate, a ¼ wavelength plate which will be described later can be used.

[Cholesteric Circular Polarization Reflection Layer]

The cholesteric circular polarization reflection layer includes at least one cholesteric liquid crystal layer. The cholesteric liquid crystal layer included in the cholesteric circular polarization reflection layer may perform selective reflection in the visible region.

The circular polarization reflection layer may include two or more cholesteric liquid crystal layers, and may include another layer such as an alignment layer. It is preferable that the circular polarization reflection layer includes only a cholesteric liquid crystal layer. In a case where the circular polarization reflection layer includes a plurality of cholesteric liquid crystal layers, it is preferable that the cholesteric liquid crystal layers adjacent to each other directly contact each other. It is preferable that the number of cholesteric liquid crystal layers included in the circular polarization reflection layer is equal to or greater than 3, such as 3 or 4.

The thickness of the cholesteric circular polarization reflection layer is preferably within a range of 2.0 µm to 300 µm, and more preferably within a range of 8.0 to 200 µm.

In the present specification, "cholesteric liquid crystal layer" means a layer obtained by fixing a cholesteric liquid crystalline phase. The cholesteric liquid crystal layer is simply referred to as liquid crystal layer in some cases.

The cholesteric liquid crystalline phase is known to perform selective reflection of circular polarization, in which the circular polarization of one rotational sense of right circular polarization or left circular polarization is selectively reflected in a specific wavelength range while circular polarization of the other rotational sense is selectively transmitted. In the present specification, the selective reflection of circular polarization is simply referred to as selective reflection in some cases.

As films including a layer obtained by fixing a cholesteric liquid crystalline phase performing selective reflection of circular polarization, a number of films formed of a composition containing a polymerizable liquid crystal compound have been known in the related art. Regarding the cholesteric liquid crystal layer, common methods thereof can be referred to.

The cholesteric liquid crystal layer may be a layer in which the alignment of a liquid crystal compound in a state of a cholesteric liquid crystalline phase is maintained. Typically, the cholesteric liquid crystal layer may be a layer obtained by a process in which a polymerizable liquid crystal compound is aligned to be in the state of a cholesteric liquid crystalline phase and then polymerized and cured by ultraviolet irradiation, heating, or the like so as to form a layer without fluidity, and then the state of the layer is changed such that the alignment form does not change by the external field or the external force. The liquid crystal compound in the cholesteric liquid crystal layer does not need to exhibit liquid crystallinity as long as the optical properties of the cholesteric liquid crystalline phase are maintained in the layer. For example, the polymerizable liquid crystal compound may lose the liquid crystallinity by becoming a high-molecular weight compound through a curing reaction.

A central wavelength $\lambda$ of selective reflection of the cholesteric liquid crystal layer depends on a pitch P (=period of helix) of the helical structure in the cholesteric liquid crystalline phase and has a relationship of $\lambda = n \times P$ with an average refractive index n of the cholesteric liquid crystal layer. A half-width of the central wavelength of selective reflection of the cholesteric liquid crystal layer can be determined as below.

In a case where the transmission spectrum (measured in a normal direction of the cholesteric liquid crystal layer) of the reflection layer is measured using a spectrophotometer UV3150 (manufactured by Shimadzu Corporation, trade name), transmittance falling peaks are found in a selective reflection region. Provided that the value of wavelength of a short wavelength side is $\lambda 1$ (nm) and the value of wavelength of a long wavelength side is $\lambda 2$ (nm) between two wavelengths at which the transmittance becomes equal to a height which is ½ of the height of the highest peak, the central wavelength of selective reflection and the half-width can be represented by the following formulae.

Central wavelength of selective reflection=$(\lambda 1+\lambda 2)/2$

Half-width=$(\lambda 2-\lambda 1)$

Generally, the central wavelength $\lambda$ of selective reflection performed by the cholesteric liquid crystal layer that is determined as above coincides with the wavelength at the central position of the reflection peak of the circular polarization reflection spectrum measured in the normal direction of the cholesteric liquid crystal layer. In the present specification, "central wavelength of selective reflection" means the central wavelength at the time of measuring the transmission spectrum in the normal direction of the cholesteric liquid crystal layer.

As is evident from the above formulae, the central wavelength of selective reflection can be adjusted by controlling the pitch of the helical structure. By controlling the values of n and P, it is possible to control the central wavelength $\lambda$ for selectively reflecting any of right-hand circular polarization and left-hand circular polarization for the light of a desired wavelength.

In a case where light obliquely comes into the cholesteric liquid crystal layer, the central wavelength of selective reflection shifts to the short wavelength side. Therefore, it is preferable to adjust the value of n×P such that $\lambda$ calculated by the above formula $\lambda = n \times P$ becomes a long wavelength with respect to the central wavelength of selective reflection required for image display. In a case where a light ray passes through a cholesteric liquid crystal layer having a refractive index of $n_2$ at an angle of $\theta_2$ with respect to the normal direction of the cholesteric liquid crystal layer (direction of the helical axis of the cholesteric liquid crystal layer), provided that the central wavelength of selective reflection is $\lambda_d$, $\lambda_4$ is represented by the following formula.

$$\lambda_d = n_2 \times P \times \cos \theta_2$$

In a case where the central wavelength of selective reflection of the cholesteric liquid crystal layer included in the circular polarization reflection layer is designed in consideration of the relationships described above, it is possible to prevent the reduction of the visibility of an obliquely observed image. Furthermore, it is possible to intentionally reduce the visibility of an obliquely observed image. This thing is useful for preventing peeping in smartphones or personal computers, for example. In addition, due to the selective reflection properties described above, in a case where the mirror with an image display function having the optical film of the embodiment of the present invention is seen in an oblique direction, sometimes tint appears in an image or an image reflected from the mirror. By incorporating the cholesteric liquid crystal layer having the central wavelength of selective reflection in the infrared region into the circular polarization reflection layer, the appearance of the tint can also be prevented. In this case, specifically, the central wavelength of selective reflection of the infrared region may be 780 to 900 nm, and preferably 780 to 850 nm.

In a case where cholesteric liquid crystal layers having the central wavelength of selective reflection in the infrared region are provided, it is preferable that all the cholesteric liquid crystal layers each having the central wavelength of selective reflection in the visible region are on a side which is closest to the image display device side.

The pitch of the cholesteric liquid crystalline phase depends on the type of a chiral agent used together with the polymerizable liquid crystal compound or on the concentration of the chiral agent added. Consequently, by adjusting the type and concentration of the chiral agent, an intended pitch can be obtained. For measuring the sense or pitch of the helix, it is possible to use the methods described in "Introduction to Experiment of Liquid Crystal Chemistry" (edited by The Japanese Liquid Crystal Society, Sigma Publication Ltd, 2007, p. 46) and "Handbook of Liquid Crystal" (Editorial Committee of Handbook of Liquid Crystal, MARUZEN Co., Ltd. p. 196).

In the mirror with an image display function having the optical film of the embodiment of the present invention, the circular polarization reflection layer preferably includes a cholesteric liquid crystal layer having a central wavelength of selective reflection in a wavelength range of red light, a cholesteric liquid crystal layer having a central wavelength of selective reflection in a wavelength range of green light, and a cholesteric liquid crystal layer having a central wavelength of selective reflection in a wavelength range of blue light. The reflection layer preferably includes, for example, a cholesteric liquid crystal layer having a central wavelength of selective reflection in a wavelength range of 400 nm to 500 nm, a cholesteric liquid crystal layer having a central wavelength of selective reflection in a wavelength range of 500 nm to 580 nm, and a cholesteric liquid crystal layer having a central wavelength of selective reflection in a wavelength range of 580 nm to 700 nm.

In a case where the circular polarization reflection layer includes a plurality of cholesteric liquid crystal layers, it is preferable that a cholesteric liquid crystal layer closer to the image display device has a longer central wavelength of selective reflection. By this constitution, the tint that obliquely appears in an image can be inhibited.

Particularly, in the mirror with an image display function in which the cholesteric circular polarization reflection layer without a ¼ wavelength plate is used, it is preferable that there is a difference equal to or greater than 5 nm between the central wavelength of selective reflection of each of the cholesteric liquid crystal layers and the emission peak wavelength of the image display device. The difference is more preferably equal to or greater than 10 nm. By causing a difference between the central wavelength of selective reflection and the emission peak wavelength for image display of the image display device, it is possible to brighten the display image without causing the light for image display from being reflected from the cholesteric liquid crystal layer. The emission peak wavelength of the image display device can be checked in an emission spectrum at the time of white display of the image display device. The peak wavelength may be a peak wavelength in a visible region of the emission spectrum. For example, as the peak wavelength, at least one or more wavelengths selected from the group consisting of an emission peak wavelength λR of red light, an emission peak wavelength λG of green light, and an emission peak wavelength λB of blue light of the image display device may be adopted. The difference between the central wavelength of selective reflection of the cholesteric liquid crystal layer and all of the emission peak wavelength λR of red light, the emission peak wavelength λG of green light, and the emission peak wavelength λB of blue light of the image display device is preferably equal to or greater than 5 nm, and more preferably equal to or greater than 10 nm. In a case where the circular polarization reflection layer includes a plurality of cholesteric liquid crystal layers, the difference between the central wavelength of selective reflection of all the cholesteric liquid crystal layers and the peak wavelength of the light emitted from the image display device is equal to or greater than 5 nm, and preferably equal to or greater than 10 nm. For example, in a case where the image display device is a full color display device showing the emission peak wavelength λR of red light, the emission peak wavelength λG of green light, and the emission peak wavelength λB of blue light in an emission spectrum at the time of white display, the difference between all the central wavelengths of selective reflection of the cholesteric liquid crystal layers and λR, λG, and λB is equal to or greater than 5 nm, and preferably equal to or greater than 10 nm.

By adjusting the central wavelength of selective reflection of the used cholesteric liquid crystal layer according to the emission wavelength range of the image display device and the aspect of using the circular polarization reflection layer, a bright image can be displayed with an excellent light use efficiency. Examples of the aspect of using the circular polarization reflection layer particularly include an incidence angle of light coming into the circular polarization reflection layer, an image observation direction, and the like.

As each of the cholesteric liquid crystal layers, a cholesteric liquid crystal layer in which the helix rotates in any of a right-hand sense or a left-hand sense is used. The sense of the circular polarization reflected from the cholesteric liquid crystal layer coincides with the sense of the helix. The senses of helices of a plurality of cholesteric liquid crystal layers may be the same as each other, or the senses of helices of some of the cholesteric liquid crystal layers may be different. That is, the cholesteric liquid crystal layers may include cholesteric liquid crystal layers of any of the right-hand sense or the left-hand sense or cholesteric liquid crystal layers of both of the right-hand sense and the left-hand sense. Here, in a mirror with an image display function including a ¼ wavelength plate, it is preferable that the senses of the helices of the plurality of cholesteric liquid crystal layers are the same as each other. In this case, the sense of the helix of each of the cholesteric liquid crystal layers may be determined according to the sense of the circular polarization obtained by the emission from the image display device and the transmission through the ¼ wavelength plate. Specifically, a cholesteric liquid crystal layer may be used which has the sense of a helix that transmits the circular polarization of a sense obtained by the emission from the image display device and the transmission through the ¼ wavelength plate.

In a half-width $\Delta\lambda$ (nm) of a selective reflection band indicating a selective reflection, $\Delta\lambda$ depends on a birefringence $\Delta n$ of the liquid crystal compound and the pitch P described above, and satisfies a relationship of $\Delta\lambda = \Delta n \times P$. Therefore, by adjusting $\Delta n$, the width of the selective reflection band can be controlled. $\Delta n$ can be controlled by adjusting the type of the polymerizable liquid crystal compound, adjusting a mixing ratio thereof, or controlling the temperature at the time of fixing the alignment.

In order to form one kind of cholesteric liquid crystal layers having the same central wavelength of selective reflection, a plurality of cholesteric liquid crystal layers having the same period P and the same helical sense may be laminated. By laminating cholesteric liquid crystal layers having the same period P and the same helical sense, the selectivity for circular polarization at a specific wavelength can be improved.

(¼ Wavelength Plate)

In the mirror with an image display function in which the cholesteric circular polarization reflection layer is used, the half mirror may further include a ¼ wavelength plate. It is preferable that the half mirror includes a phase difference film of high Re (in-plane retardation), a cholesteric circular polarization reflection layer, and a ¼ wavelength plate in this order.

In a case where the half mirror includes the ¼ wavelength plate between the image display device and the cholesteric circular polarization reflection layer, particularly, the light from the image display device displaying an image by linear polarization can be converted into circular polarization and come into the cholesteric circular polarization reflection layer. Accordingly, it is possible to significantly reduce the light which is reflected from the circular polarization reflection layer and returns to the image display device side, and a bright image can be displayed. In addition, because the mirror can have a constitution in which the circular polarization of a sense that is reflected to the image display device side in the cholesteric circular polarization reflection layer is not generated by the use of the ¼ wavelength plate, the deterioration of the quality of the displayed image resulting from the multiple reflection between the image display device and the half mirror does not easily occur.

That is, for example, even though the central wavelength of selective reflection of the cholesteric liquid crystal layer included in the cholesteric circular polarization reflection layer is approximately the same as the emission peak wavelength of blue light in the emission spectrum at the time of white display of the image display device (for example, even though the difference is less than 5 nm), it is possible to allow the light emitted from the image display device to be transmitted to the front surface side without generating circular polarization of a sense that is reflected to the image display side in the circular polarization reflection layer.

It is preferable that the angle of the ¼ wavelength plate, which is used by being combined with the cholesteric circular polarization reflection layer, is adjusted such that the image becomes the brightest in a case where the ¼ wavelength plate is bonded to the image display device. That is, particularly, in order that linear polarization is transmitted best for the image display device displaying an image by the linear polarization, it is preferable that the relationship between the polarization direction (transmission axis) of the linear polarization and the slow axis of the ¼ wavelength plate is adjusted. For example, in a case where a single layer-type ¼ wavelength plate is used, it is preferable that an angle of 45° is formed between the transmission axis and the slow axis. The light emitted from the image display device displaying an image by the linear polarization is transmitted through the ¼ wavelength plate and then becomes any of circular polarization of a right-hand sense and circular polarization of a left-hand sense. The circular polarization reflection layer may be constituted with a cholesteric liquid crystal layer having a twisted direction transmitting the circular polarization of the aforementioned sense.

The ¼ wavelength plate may be a phase difference layer which functions as a ¼ wavelength plate in a visible region. Examples of the ¼ wavelength plate include a single layer-type ¼ wavelength plate, a broadband ¼ wavelength plate obtained by laminating a ¼ wavelength plate and a ½ wavelength phase difference plate, and the like.

The frontal phase difference of the former ¼ wavelength plate may be equal to a length that is ¼ of the emission wavelength of the image display device. Therefore, for example, in a case where the emission wavelength of the image display device is 450 nm, 530 nm, and 640 nm, as the ¼ wavelength plate, a phase difference layer having reverse dispersion properties is most preferable which results in a phase difference of 112.5 nm±10 nm, preferably 112.5 nm±5 nm, and more preferably 112.5 nm at a wavelength of 450 nm, a phase difference of 132.5 nm±10 nm, preferably 132.5 nm±5 nm, and more preferably 132.5 nm at a wavelength of 530 nm, and a phase difference of 160 nm±10 nm, preferably 160 nm±5 nm, and more preferably 160 nm at a wavelength of 640 nm. As the ¼ wavelength plate, it is also possible to use a phase difference plate which results in a phase difference having low wavelength dispersion properties or a phase difference plate having forward dispersion properties. "Reverse dispersion properties" mean properties in which the longer the wavelength is, the larger the absolute value of the phase difference becomes. "Forward dispersion properties" means properties in which the shorter the wavelength is, the greater the absolute value of the phase difference becomes.

In the laminate-type ¼ wavelength plate, a ¼ wavelength plate and a ½ wavelength phase difference plate are bonded to each other such that the slow axes thereof intersect at an angle of 60°, and the ½ wavelength phase difference plate is disposed such that it becomes a side into which linear polarization comes. Furthermore, the laminate-type ¼ wavelength plate is used in a state where the slow axis of the ½ wavelength phase difference plate intersects the polarization surface of the incoming linear polarization at an angle of 15° or 75°. Accordingly, the reverse dispersion properties of the phase difference are excellent, and hence the laminate-type ¼ wavelength plate can be suitably used.

A ¼ wavelength plate can be appropriately selected according to the purpose without particular limitation. For example, it is possible to use a quartz plate, a stretched polycarbonate film, a stretched norbornene-based polymer film, a transparent film containing aligned inorganic particles having birefringence such as strontium carbonate, a thin film obtained by obliquely vapor-depositing inorganic dielectric material on a support, and the like.

Examples of the ¼ wavelength plate include (1) phase difference plate described in JP1993-027118A (JP-H05-027118A) and JP1993-027119A (JP-H05-027119A) that is obtained by laminating a birefringent film having a large retardation and a birefringent film having a small retardation such that the optical axes of the films become orthogonal to each other, (2) phase difference plate described in JP1998-068816A (JP-H10-068816A) that is prepared by laminating a polymer film, which results in a ¼ wavelength at a specific wavelength, and a polymer film, which is formed of the same material as that of the aforementioned polymer film and results in a ½ wavelength at the same wavelength, so as to obtain a ¼ wavelength in a wide wavelength range, (3) phase difference plate described in JP1998-090521A (JP-H10-090521A) that can accomplish a ¼ wavelength in a wide wavelength range by the lamination of two sheets of polymer films, (4) phase difference plate described in WO00/026705A that can accomplish a ¼ wavelength in a wide wavelength range by using a modified polycarbonate film, (5) phase difference plate described in WO00/065384A that can accomplish a ¼ wavelength in a wide wavelength range by using a cellulose acetate film, and the like.

As the ¼ wavelength plate, commercial products can also be used.

Examples of the commercial products include PUREACE (registered trademark) WR (polycarbonate film manufactured by TEIJIN LIMITED).

The ¼ wavelength plate may be formed by aligning and fixing a polymerizable liquid crystal compound and a high-molecular weight liquid crystal compound. For example, the ¼ wavelength plate can be formed by coating a temporary support, an alignment film, or a surface of a front panel with a liquid crystal composition, forming a nematic alignment of the polymerizable liquid crystal compound in the liquid crystal composition in a liquid crystal state, and then fixing the alignment state by means of photocrosslinking or thermal crosslinking. The details of the liquid crystal composition and the preparation method thereof will be described later. The ¼ wavelength plate may also be a layer obtained by coating a temporary support, an alignment film, or a surface of a front panel with a composition containing a high-molecular weight liquid crystal compound, forming a nematic alignment in a liquid crystal state, and then fixing the alignment state by cooling.

The ¼ wavelength plate may directly contact the cholesteric circular polarization reflection layer or may be bonded to the cholesteric circular polarization reflection layer through an adhesive layer. It is preferable that the ¼ wavelength plate directly contacts the cholesteric circular polarization reflection layer.

(Methods for preparing cholesteric liquid crystal layer and ¼ wavelength plate formed of liquid crystal composition) Hereinafter, the materials used for preparing the cholesteric liquid crystal layer and the ¼ wavelength plate formed of a liquid crystal composition and the methods for preparing the cholesteric liquid crystal layer and the ¼ wavelength plate will be described.

Examples of the material used for forming the ¼ wavelength plate include a liquid crystal composition containing a polymerizable liquid crystal compound, and the like. Examples of the material used for forming the cholesteric liquid crystal layer include a liquid crystal composition containing a polymerizable liquid crystal compound and a chiral agent (optically active compound), and the like. If necessary, by coating a temporary support, a support, an alignment film, a phase difference film of high Re, a cholesteric liquid crystal layer which will become an underlayer, a ¼ wavelength plate, or the like with the liquid crystal composition mixed with a surfactant, a polymerization initiator, or the like and then dissolved in a solvent, performing alignment and maturing, and then performing fixing by curing the liquid crystal composition, the cholesteric liquid crystal layer and/or the ¼ wavelength plate can be formed.

—Polymerizable Liquid Crystal Compound—

As the polymerizable liquid crystal compound, polymerizable rod-like liquid crystal compound may be used.

Examples of the rod-like polymerizable liquid crystal compound include rod-like nematic liquid crystal compounds. As the rod-like nematic liquid crystal compounds, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexyl benzonitriles are preferably used. Not only low-molecular weight liquid crystal compounds, but also high-molecular weight liquid crystal compounds can be used.

The polymerizable liquid crystal compound can be obtained by introducing a polymerizable group into a liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is particularly preferable. The polymerizable group can be introduced into a molecule of a liquid crystal compound by various methods. The number of polymerizable groups contained in the polymerizable liquid crystal compound is preferably 1 to 6, and more preferably 1 to 3. Examples of the polymerizable liquid crystal compound include the compounds described in Makromol. Chem., vol. 190, p 2255 (1989), Advanced Materials, vol. 5, p. 107 (1993). U.S. Pat. Nos. 4,683,327A, 5,622, 648A, 5,770,107A, WO95/022586A, WO95/024455A, WO97/000600A. WO98/023580A, WO98/052905A, JP1989-272551A (JP-H01-272551 A), JP1994-016616A (JP-H06-016616A), JP1995-110469A (JP-H07-110469A), JP1999-080081A (JP-H11-080081A). JP2001-328973A, and the like. Two or more kinds of polymerizable liquid crystal compounds may be used in combination. In a case where two or more kinds of polymerizable liquid crystal compounds are used in combination, the alignment temperature can be reduced.

The content of the polymerizable liquid crystal compound in the liquid crystal composition is preferably 80% to 99.9% by mass, more preferably 85% to 99.5% by mass, and particularly preferably 90% to 99% by mass with respect to the mass (mass excluding a solvent) of the solid content of the liquid crystal composition.

—Chiral Agent: Optically Active Compound—

It is preferable that the material used for forming the cholesteric liquid crystal layer contains a chiral agent. The chiral agent has a function of inducing the helical structure of the cholesteric liquid crystalline phase. Because the sense or pitch of the induced helix varies with the compound as the chiral agent, the chiral agent may be selected according to the purpose.

The chiral agent is not particularly limited, and it is possible to use generally used compounds (for example, those described in Chapter 3, 4-3. <Chiral agents for TN and STN> in Handbook of Liquid Crystal Device, edited by the 142$^{nd}$ committee of Japan Society for The Promotion of Science, p. 199, 1989), isosorbide, and isomannide derivatives.

Generally, the chiral agent contains asymmetric carbon atoms. However, an axially asymmetric compound and a planarly asymmetric compound not containing asymmetric carbon atoms can also be used as the chiral agent. Examples of the axially asymmetric compound and the planarly asymmetric compound include binaphthyl, helicene, paracyclophane, and derivatives of these. The chiral agent may have a polymerizable group. In a case where both the chiral agent and the liquid crystal compound have a polymerizable group, by a polymerization reaction between the polymerizable chiral agent and the polymerizable liquid crystal compound, it is possible to form a polymer having a repeating unit derived from the polymerizable liquid crystal compound and a repeating unit derived from the chiral agent. In this aspect, the polymerizable group contained in the polymerizable chiral agent is preferably the same type of polymerizable group as the polymerizable group contained in the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

Furthermore, the chiral agent may be a liquid crystal compound.

In the liquid crystal composition, the content of the chiral agent with respect to the amount of the polymerizable liquid crystal compound is preferably 0.01 mol % to 200 mol %, and more preferably 1 mol % to 30 mol %.

—Polymerization Initiator—

It is preferable that the liquid crystal composition used in the present invention contains a polymerization initiator. In an aspect in which a polymerization reaction is caused by ultraviolet irradiation, as the polymerization initiator, it is preferable to use a photopolymerization initiator that can initiate the polymerization reaction by ultraviolet irradiation. Examples of the photopolymerization initiator include an α-carbonyl compound (described in U.S. Pat. Nos. 2,367, 661A and 2,367,670A), an acyloin ether (described in U.S. Pat. No. 2,448,828A), an α-hydrocarbon-substituted aromatic acyloin compound (described in U.S. Pat. No. 2,722, 512A), a polynuclear quinone compound (described in U.S. Pat. Nos. 3,046,127A and 2,951,758A), a combination of triarylimidazole dimer and p-aminophenylketone (described in U.S. Pat. No. 3,549,367A), acrydine and phenazine compounds (described in JP1985-105667A (JP-S60-105667A) and U.S. Pat. No. 4,239,850A), acylphosphine oxide compounds (described in JP1988-040799B (JP-S63-040799B, JP1993-029234B (JP-H05-029234B), JP1998-095788A (JP10-095788A), JP1988-029997A (JP-H10-029997A), oxime compounds (described in JP2000-066385A and JP4454067B) an oxadiazole compound (described in U.S. Pat. No. 4,212,970A), and the like.

The content of the photopolymerization initiator in the liquid crystal composition with respect to the amount of the polymerizable liquid crystal compound is preferably 0.1% to 20% by mass, and more preferably 0.5% to 5% by mass.

—Crosslinking Agent—

For the purpose of improving the film hardness after curing and improving durability, the liquid crystal composition may optionally contain a crosslinking agent. As the crosslinking agent, those cured by ultraviolet rays, heat, moisture, or the like can be suitably used.

The crosslinking agent is not particularly limited and can be appropriately selected according to the purpose. Examples of the crosslinking agent include a polyfunctional acrylate compound such as trimethylolpropane tri(meth)

acrylate and pentaerythritol tri(meth)acrylate; an epoxy compound such as glycidyl (meth)acrylate and ethylene glycol diglycidyl ether; an aziridine compound such as 2,2-bishydroxymethylbutanol-tris[3-(1-aziridinyl)propionate] and 4,4-bis(ethyleneiminocarbonylamino)diphenylmethane; an isocyanate compound such as hexamethylene diisocyanate and biuret-type isocyanate; a polyoxazoline compound having an oxazoline group on a side chain; an alkoxysilane compound such as vinyltrimethoxysilane and N-(2-aminoethyl)3-aminopropyl trimethoxysilane; and the like. Furthermore, depending on the reactivity of the crosslinking agent, a generally used catalyst can be used. In a case where the catalyst is used, it is possible to improve the productivity in addition to the film hardness and durability. One kind of crosslinking agent may be used singly, or two or more kinds of crosslinking agents may be used in combination.

The content of the crosslinking agent in the liquid crystal composition is preferably 3% by mass to 20% by mass, and more preferably 5% by mass to 15% by mass. In a case where the content of the crosslinking agent is equal to or greater than the lower limit described above, a crosslinking density improving effect can be obtained. Furthermore, in a case where the content of the crosslinking agent is equal to or smaller than the upper limit described above, the stability of the formed layer can be maintained.

—Alignment Control Agent—

An alignment control agent, which makes a contribution to stably and rapidly form a planar alignment, may be added to the liquid crystal composition. Examples of the alignment control agent include fluorine (meth)acrylate-based polymers described in paragraphs [0018] to [0043] in JP2007-272185A, the compounds represented by Formulae (I) to (IV) described in paragraphs [0031] to [0034] in JP2012-203237A, and the like.

One kind of alignment control agent may be used singly, or two or more kinds of alignment control agents may be used in combination.

The amount of the alignment control agent added to the liquid crystal composition with respect to the total mass of the polymerizable liquid crystal compound is preferably 0.01% by mass to 10% by mass, more preferably 0.01% by mass to 5% by mass, and particularly preferably 0.02% by mass to 1% by mass.

—Other Additives—

In addition, the liquid crystal composition may contain at least one kind of component selected from various additives such as a surfactant, which is for uniformizing the thickness by adjusting the surface tension of the coating film, and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

—Solvent—

The solvent used for preparing the liquid crystal composition is not particularly limited and can be appropriately selected according to the purpose. However, it is preferable to use an organic solvent.

The organic solvent is not particularly limited and can be appropriately selected according to the purpose. Examples of the organic solvent include ketones, alkyl halides, amides, sulfoxides, heterocyclic compounds, hydrocarbons, esters, ethers, and the like. One kind of crosslinking agent may be used singly, or two or more kinds of crosslinking agents may be used in combination. Among these, considering the load imposed on the environment, ketones are particularly preferable.

—Coating, Alignment, and Polymerization—

The method for coating a temporary support, an alignment film, a phase difference film of high Re, a ¼ wavelength plate, and/or a cholesteric liquid crystal layer which will become an underlayer with the liquid crystal composition is not particularly limited, and can be appropriately selected according to the purpose. Examples of the coating method include a wire bar coating method, a curtain coating method, an extrusion coating method, a direct gravure coating method, a reverse gravure coating method, a die-coating method, a spin coating method, a dip coating method, a spray coating method, a slide coating method, and the like. Furthermore, the coating method can be performed by transferring the liquid crystal composition which has been separately applied onto a support. By heating the liquid crystal composition used for coating, the liquid crystal molecules are aligned. At the time of forming the cholesteric liquid crystal layer, the liquid crystal molecules may be aligned in a cholesteric phase. At the time of forming the ¼ wavelength plate, the liquid crystal molecules are preferably aligned in a nematic phase. At the time of cholesteric alignment, the heating temperature is preferably equal to or lower than 200° C., and more preferably equal to or lower than 130° C. By the alignment treatment, an optical thin film is obtained in which the polymerizable liquid crystal compound is aligned in a twisted state so as to have a helical axis in a direction that is substantially perpendicular to the plane of the film. At the time of nematic alignment, the heating temperature is preferably 25° C. to 120° C., and more preferably 30° C. to 100° C.

The aligned liquid crystal compound can be further polymerized such that the liquid crystal composition is cured. The polymerization may be any of thermal polymerization and photopolymerization performed by light irradiation, but is preferably photopolymerization. It is preferable to use ultraviolet rays for the light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, it is preferable that the polymerization reaction rate is high. The polymerization reaction rate is preferably equal to or higher than 70%, and more preferably equal to or higher than 80%. The polymerization reaction rate can be determined by measuring the consumption rate of polymerizable functional groups by using an IR absorption spectrum.

The thickness of each cholesteric liquid crystal layer is not particularly limited as long as the thickness is within a range in which the aforementioned characteristics are exhibited. The thickness of each cholesteric liquid crystal layer is preferably within a range equal to or greater than 1.0 μm and equal to or smaller than 150 μm, and more preferably within a range equal to or greater than 2.5 μm and equal to or smaller than 100 μm. Furthermore, the thickness of the ¼ wavelength plate formed of the liquid crystal composition is not particularly limited, but may be preferably 0.2 to 10 μm, and more preferably 0.5 to 2 μm.

EXAMPLES

Hereinafter, the present invention will be more specifically described based on examples. However, the present invention is not limited thereto. In the following examples, unless otherwise specified, "part" and "%" showing a composition are based on mass.

EXAMPLE

Example 1

<1. Preparation of Resin Film>

(1) Preparation of Cellulose Acylate Dope Solution for Core Layer

The following composition was put into a mixing tank and stirred, thereby preparing a cellulose acylate dope liquid for a core layer.

| the cellulose acylate dope liquid for a core layer. | |
|---|---|
| Cellulose acetate with acetyl substitution degree 2.88 and weight-average molecular weight 260,000 | 100 parts by mass |
| Phthalic acid ester oligomer A having the following structure | 10 parts by mass |
| Compound (A-1) represented by Formula I | 4 parts by mass |
| Ultraviolet absorber represented by Formula II (manufactured by BASF SE) | 2.7 parts by mass |
| Light stabilizer (manufactured by BASF, trade name: TINUVIN 123) | 0.18 parts by mass |
| N-alkenyl propylene diamine triacetic acid (manufactured by Nagase ChemteX Corporation, trade name: TEKLAN DO) | 0.02 parts by mass |
| Methylene chloride (first solvent) | 430 parts by mass |
| Methanol (second solvent) | 64 parts by mass |

The used compounds will be shown below.

Phthalic Acid Ester Oligomer a (Weight-Average Molecular Weight: 750)

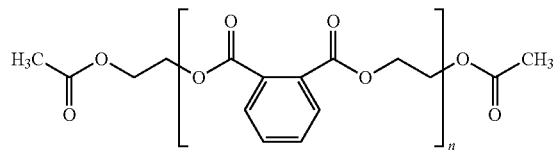

Compound (A-1) Represented by Formula I
Formula I:

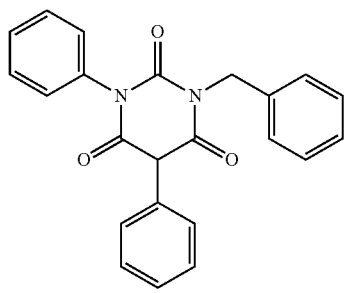 [SMILES: O=C1C(c2ccccc2)C(=O)N(c2ccccc2)C(=O)N1Cc1ccccc1]

Ultraviolet Absorber Represented by Formula II
Formula II:

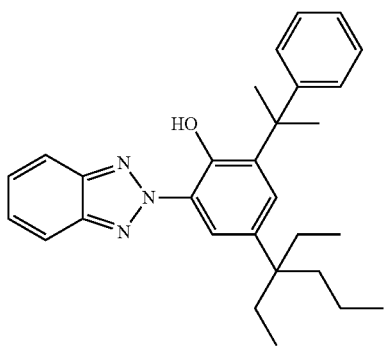 [SMILES: CCCC(CC)(CC)c1cc(-n2nc3ccccc3n2)c(O)c(C(C)(C)c2ccccc2)c1]

(2) Preparation of Cellulose Acylate Dope Solution for Outer Layer

A composition containing inorganic particles shown below (10 parts by mass) was added to 90 parts by mass of the aforementioned cellulose acylate dope solution for a core layer, thereby preparing a cellulose acylate dope solution for an outer layer.

| Composition containing inorganic particles | |
|---|---|
| Silica particles with an average primary particle size of 20 nm (manufactured by Nippon Aerosil, trade name: AEROSIL R972) | 2 parts by mass |
| Methylene chloride (first solvent) | 76 parts by mass |
| Methanol (second solvent) | 11 parts by mass |
| Cellulose acylate dope solution for core layer | 1 part by mass |

(3) Preparation of First Resin Film (A)

In order for the cellulose acylate dope solution for an outer layer to be positioned on both sides of the cellulose acylate dope solution for a core layer, three kinds of solutions including the cellulose acylate dope solution for an outer layer, the cellulose acylate dope solution for a core layer, and the cellulose acylate dope solution for an outer layer were simultaneously cast onto a casting band with a surface temperature of 20° C. from a casting outlet.

As the casting band, an endless band was used which was made of stainless steel and had a width of 2.1 m and a length of 70 m. The casting band was polished such that it had a thickness of 1.5 mm and a surface roughness equal to or lower than 0.05 μm. The material of the casting band was SUS 316 and had sufficient corrosion resistance and hardness. The thickness unevenness of the entirety of the casting band was equal to or lower than 0.5%.

The surface of the obtained casting film was exposed to the air for fast drying with a gas concentration of 16%6 and a temperature of 60° C. at a wind speed of 8 ms, thereby forming an initial film. Then, drying air with a temperature of 140° C. was blown to the film from the upstream side of the upper portion of the casting band. Furthermore, drying air with a temperature of 120° C. and drying air with a temperature of 60° C. were blown to the film from the downstream side.

After the amount of residual solvent became about 33% by mass, the film was peeled off from the band. Then, both ends of the obtained film in the width direction were fixed to tenter clips, and after the amount of residual solvent became 3% to 15% by mass, the film was dried while being stretched 106% in the cross direction. Thereafter, the film was transported between rolls of a heat treatment apparatus and then further dried, thereby preparing a first resin film (A) having a thickness of 100 μm (outer layer/core layer/outer layer=3 μm/94 μm/3 μm).

(4) Preparation of Second Resin Film (C)

By the same method used for preparing the first resin film (A), a second resin film (C) having a thickness of 100 μm was prepared.

<2. Saponification Treatment for Resin Film>

The prepared resin films (A) and (C) were immersed for 2 minutes in a 1.5 mol/L aqueous NaOH solution (saponification solution) kept at a liquid temperature of 55° C., and then rinsed with water. The films were then immersed for 30 seconds in a 0.05 mol/L aqueous sulfuric acid solution kept at a liquid temperature of 25° C. and then rinsed with flowing water for 30 seconds such that the films became neutral. Thereafter, by using an air knife, water was repeatedly blown off from the films three times, and then the films were caused to stay for 15 seconds in a drying zone with an atmospheric temperature of 70° C. such that the films were dried, thereby preparing resin films (A) and (C) having undergone a saponification treatment.

Hereinafter, in the preparation of an optical film, the resin films (A) and (C) having undergone a saponification treatment will be simply referred to as resin films (A) and (C).

<3. Preparation of Solution for Forming Adhesive Layer>

The components were mixed together according to the formulation shown in Table 1 and filtered through a filter made of polypropylene having a pore size of 10 μm, thereby preparing solutions A-1 to A-10 for forming an adhesive layer (B).

<4. Bonding of Resin Film>

A surface in contact with a band side of the resin film (A) prepared above was coated with the solution A-1 for forming an adhesive layer prepared above such that the thickness of the dried adhesive layer (B) became 300 nm. Then, a surface of the resin film (C) that contacted the band side and the adhesive layer (B) were bonded to each other by using a roller under the conditions of a pressure of 3 MPa and a speed of 900 rpm and dried for 10 or more minutes at an atmospheric temperature of 70° C., thereby preparing a laminate in which the resin films (A) and (C) and the adhesive layer (B) were bonded to each other.

<5-1. Preparation of Curable Composition for Forming Hard Coat Layer (HC Layer)>

The components were mixed together according to the formulation shown in Table 2 and filtered through a filter made of polypropylene having a pore size of 10 μm, thereby preparing curable compositions HC-1 and HC-2 for forming a hard coat layer (HC layer).

TABLE 2

| | | | Curable composition for forming HC layer | |
|---|---|---|---|---|
| | | | HC-1 | HC-2 |
| Solid content | Polymerizable compound | DPHA | 44.9% | 95.0% |
| | | CYCLOMER M100 | 50.0% | |
| | Polymerization initiator | Radical photopolymerization initiator Irg 184 | 4.0% | 4.0% |

TABLE 1

| Component | A-1 | A-2 | A-3 | A-4 | A-5 | A-6 | A-7 | A-8 | A-9 | A-10 |
|---|---|---|---|---|---|---|---|---|---|---|
| Amylose | 10 | — | — | — | — | — | — | — | — | — |
| DAC | — | 10 | — | — | — | — | — | — | — | — |
| CMC | — | — | 10 | — | — | — | — | — | — | — |
| HPMC | — | — | — | 10 | — | — | — | — | — | — |
| HEC-1 | — | — | — | — | 10 | — | — | 10 | — | — |
| HPC | — | — | — | — | — | 10 | — | — | — | — |
| HEC-2 | — | — | — | — | — | — | 10 | — | — | — |
| PVA-117H | — | — | — | — | — | — | — | — | 10 | 10 |
| Boric acid | — | — | — | — | — | — | — | 5 | — | 5 |
| Water | 90 | 90 | 90 | 90 | 90 | 90 | 90 | 85 | 90 | 85 |

In Table 1, the amount of each component is described such that the total amount of the components becomes 100% by mass.

The details of each compound described in Table 1 are as below.

<Resin>

Amylose: weight-average molecular weight 50,000, degree of substitution 0

DAC: diacetyl cellulose, weight-average molecular weight 120,000, degree of substitution 1.8

CMC: carboxymethyl cellulose, weight-average molecular weight 110,000, degree of substitution 1.4

HPMC: hydroxypropyl methyl cellulose, weight-average molecular weight 100,000, degree of substitution 1.5

HEC-1: hydroxyethyl cellulose, weight-average molecular weight 108,000, degree of substitution 2.3

HPC: hydroxypropyl cellulose, weight-average molecular weight 110,000, degree of substitution 2.8

HEC-2: hydroxyethyl cellulose, weight-average molecular weight 110,000, degree of substitution 2.7

PVA-117H: KURARAY POVAL PVA-117H (trade name, manufactured by KURARAY CO. LTD.), polyvinyl alcohol TABLE 2-continued

| | | Curable composition for forming HC layer | |
|---|---|---|---|
| | | HC-1 | HC-2 |
| | Cationic photopolymerization initiator PAG-1 | 1.0% | |
| Antifoulant | RS-90 | | 1.0% |
| Leveling agent | P-112 | 0.1% | |
| Solvent | MEK | 1.0% | 40.0% |
| | Cyclohexanone | 99.0% | |
| | MIBK | | 60.0% |
| Concentration of solid content in composition | | 60.0% | 50.0% |

In Table 2, the amount of each component is described such that the total amount of each of the solid content and the solvent becomes 1000% by mass.

The details of each compound described in Table 2 are as below.

<Polymerizable Compound>
DPHA: mixture of dipentaerythritol pentaacrylate and dipentaerythritol hexaacrylate (manufactured by Nippon Kayaku Co., Ltd., trade name: KAYARAD DPHA)
CYCLOMER M100: 3,4-epoxycyclohexylmethyl methacrylate (manufactured by DAICEL CORPORATION, trade name)
<Polymerization Initiator>
Irg 184: 1-hydroxy-cyclohexyl-phenyl-ketone (radical photopolymerization initiator based on α-hydroxyalkylphenone, manufactured by BASF SE, trade name: IRGACURE 184)
PAG-1: cationic photopolymerization initiator as iodonium salt compound shown below
Cationic Photopolymerization Initiator (Iodonium Salt Compound)

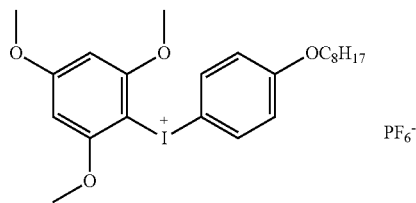

<Antifoulant and Leveling Agent>
RS-90: Antifoulant, trade name (made by DIC), fluorine-containing oligomer having a radically polymerizable group
P-112: leveling agent, compound P-112 described in paragraph 0053 in JP5175831B
<Solvent>
MEK: methyl ethyl ketone
MIBK: methyl isobutyl ketone
<5-2. Preparation of Hard Coat Layer (HC Layer)>
In the above prepared laminate, the surface of the resin film (A) that was opposite to the adhesive layer (B) was coated with the curable composition HC-1 for forming an HC layer, and the curable composition was cured, thereby forming a hard coat layer.
Specifically, coating and curing were performed by the following method. By a die-coating method using a slot die described in Example 1 in JP2006-122889A, coating was performed using the curable composition for forming an HC layer under the condition of a transport speed of 30 m/min, and the curable composition was dried for 150 seconds at an atmospheric temperature of 60° C. Then, with nitrogen purging at an oxygen concentration of about 0.1% by volume, by using an air-cooled metal halide lamp (manufactured by EYE GRAPHICS Co., Ltd.) at 160 W/cm, the curable composition for forming an HC layer used for coating was cured by being irradiated with ultraviolet rays at an illuminance of 20 mW/cm$^2$ and an irradiation amount of 30 mJ/cm$^2$ such that a hard coat layer HC-1 was formed, and the obtained film was wound up.
The surface of the hard coat layer HC-1 formed as above was coated with the curable composition HC-2 for forming an HC layer described in Table 2, and the curable composition was dried and cured under the same conditions as those adopted for forming the hard coat layer HC-1 such that a second HC layer was formed, thereby preparing an optical film of Example 1. In Table 3 below, the cellulose acylate film was described as TAC.

Examples 2 to 4

Optical films of Examples 2 to 4 were prepared in the same manner as in Example 1, except that solutions A-2 to A-4 for forming an adhesive layer were used instead of the solution A-1 for forming an adhesive layer.

Example 5

An acrylic resin film prepared as below was used instead of the resin films (A) and (C), and an optical film of Example 5 was prepared by the same method as that in Example 1 except that the solution for forming an adhesive layer A-5 was used instead of the solution for forming an adhesive layer A-1.
<Preparation of Acrylic Resin Film>
Pellets of an acrylic resin (trade name: SUMIPEX EX) manufactured by Sumitomo Chemical Co., Ltd were put into a single-screw extruder having an extrusion diameter of 65 mm, melted, and integrated by being melted and laminated by a multi-manifold method. Then, the extruder was controlled such that the film thickness of each layer became 5 μm/90 μm/5 μm after drying, and the resin was extruded through T-shaped dies at a set temperature of 260° C. The obtained film-shaped substance was molded by being sandwiched between a pair of metal rolls, thereby preparing an acrylic resin film which had a thickness of 100 μm. In the following Table 3, the acrylic resin film is described as PMMA.

Examples 6 and 7

Optical films of Examples 6 and 7 were prepared in the same manner as in Example 1, except that solutions A-6 and A-7 for forming an adhesive layer were used instead of the solution A-1 for forming an adhesive layer.

Example 8

Optical films of Example 8 were prepared in the same manner as in Example 1, except that solutions A-5 for forming an adhesive layer were used instead of the solution A-1 for forming an adhesive layer.

Example 9

Optical films of Example 9 were prepared in the same manner as in Example 1, except that solutions A-8 for forming an adhesive layer were used instead of the solution A-1 for forming an adhesive layer.

COMPARATIVE EXAMPLES

Comparative Examples 1 and 2

Optical films of Comparative Examples 1 and 2 were prepared in the same manner as in Example 1, except that solutions A-9 and A-10 for forming an adhesive layer were used instead of the solution A-1 for forming an adhesive layer.
<Test>
The optical films prepared as above were tested as below. The test results are summarized in the following Table 3. In Table 3, tensile modulus is simply described as "Modulus of elasticity".

[Test Example 1] Keystroke Durability

A glass plate (manufactured by Corning Incorporated, trade name: EAGLE XG, thickness: 1 mm) and each of the optical films (laminates with an HC layer) prepared as above were bonded to each other through a pressure sensitive adhesive having a thickness of 20 μm (manufactured by Soken Chemical & Engineering Co., Ltd., trade name: SK-2057) by using a rubber roller under a load of 2 kg applied thereto such that the glass plate and the resin film (C) faced each other, and the resulting film was humidified for 2 hours at a temperature of 25° C. and a relative humidity of 60%. By using a keystroke tester (manufactured by YSC), an input stylus (material of the stylus tip: polyacetal, radius R=0.8 mm, manufactured by Wacom) was pressed on the film from above the HC layer (keystroke speed: 2 times/min, load: 250 g). In a state where the optical film was being irradiated with a three-wave fluorescent lamp (NATIONAL PALOOK FLUORESCENT LAMP FL20SS-EX-D/18) from the front surface thereof, the produced test piece was visually observed and "Keystroke durability" was evaluated based on the following standards.

<Evaluation Standards>

A: No recess was made even though keystroke was performed 50,000 times.

B: While the keystroke was being performed 10,001 to 50,000 times, recesses were made.

C: While the keystroke was being performed 1,001 to 10,000 times, recesses were made.

D: While the keystroke was being performed 101 to 1,000 times, recesses were made.

[Test Example 2] Adhesiveness

The "adhesiveness" between the resin film and the adhesive layer was measured by a crosscut test (cross cut method) in accordance with JIS K5400. The specific procedure is described below.

In each of the laminates produced above (laminate before HC layer application), 100 grids were made by making 11 cuts in the vertical and horizontal direction, which reach the adhesive layer at intervals of 1 mm on the surface of resin film side by using a cutter knife and a cutter guide. After cellophane tape (registered trademark) was strongly pressed on the grid, the end of the tape was instantaneously peeled off at a 45° angle with respect to the surface. Pasting and peeling operation of the cellophane tape (registered trademark) were continuously performed five times with respect to the same 100 grids. A new cellophane tape (registered trademark) was used every time.

After that, the state of the grid was observed, and the ratio of a mesh of the peeled lattice among the 100 grids (mash of lattice) was calculated. The observation results were applied to the following evaluation standards to evaluate "adhesiveness".

<Evaluation Standards>

AA: There was no peeling of the mash of the lattice.

A: Peeling of the mash of the lattice was less than 5%.

B: Peeling of the mash of the lattice was equal to or greater than 5% and less than 15%.

[Test Example 3] Interference Unevenness

Interference unevenness was observed and evaluated according to the following standards by placing the laminate prepared above (laminate before HC layer application) on a black board with the first resin film (A) on top, and irradiating the sample with a three-wavelength fluorescent lamp (Panasonic Corporation, NATIONAL PALOOK FLUORESCENT LAMP FL20SS-EX-D/18) above 50 cm of the front surface of the laminate.

<Evaluation Standards>

A: Interference unevenness is hardly seen.

B: There are places where the interference unevenness is slightly seen.

C: The interference unevenness is slightly seen in total, but it is not a level to cause a problem.

D: The interference unevenness is strongly seen in total, and it is a level to cause a problem.

[Test Example 4] Refractive Index

The "refractive index" of each resin film was measured using an Abbe refractometer (manufactured by Atago Co. Ltd.), and using a sodium D line (589 nm) to a light source under a temperature condition of 25° C. according to the method described in JIS K7142. In a case where the resin film was anisotropic, the average of refractive index of an alignment direction, along which a degree of alignment became the highest and the refractive index in the direction orthogonal to the alignment direction, in a surface perpendicular to the thickness direction of the resin film, is adopted as refractive index of the resin film.

Regarding the "refractive index" of an adhesive layer, the solution for forming an adhesive layer was applied on resin film (A), the solvent was removed by performing the drying process, and the adhesive layer having thickness of 300 nm was formed. The surface refractive index of the obtained adhesive layer was measured by the same method as the refractive index of the resin film.

[Test Example 5] Tensile Modulus

"Tensile modulus" of each resin film was tested and calculated by the following method according to the method described in JIS K7127.

Each of the resin films prepared as above was cut in a length of 15 cm in a measurement direction and a width of 1 cm, thereby obtaining a sample for measurement. The cut sample for measurement was installed in a tensile tester (manufactured by Toyo Seiki Seisaku-sho. Ltd., trade name "STROGRAPH-R2") such that a chuck interval in the measurement direction became 10 cm. Under the condition of a measurement temperature of 25° C., the resin film was stretched at a stretching speed of 10 mm/min such that the chuck interval increased, thereby obtaining a stress-strain curve. From the linear regression of a curve between two specified points at strains $\varepsilon_1=0.0005$ and $\varepsilon_2=0.0025$, a tensile modulus at 25° C. was calculated.

In a case where the resin film was anisotropic, the average of a tensile modulus of a sample for measurement whose long side extended in an alignment direction, along which a degree of alignment became the highest, within a surface perpendicular to the thickness direction of the resin film and a tensile modulus of a sample for measurement whose long side extended in a direction connected to the alignment direction was adopted as a tensile modulus of the resin film.

For obtaining "modulus of elasticity" of the adhesive layer, by using an applicator, each of the solutions for forming an adhesive layer used above was cast onto a glass plate (thickness: 1 mm) such that the film thickness became 20 μm after drying, and the cast solution was dried for 10 minutes or longer at an atmospheric temperature of 80° C. and then peeled from the glass plate. For the obtained adhesive layer sample, a tensile modulus was tested and calculated by the same method as that used for obtaining the tensile modulus of the resin film.

[Test Example 6] Thickness

"Thickness" was observed and measured by the following method by using a Scanning Electron microscope (SEM).

The cross-section of each of the constituent members (the resin film, the adhesive layer, or the HC layer) or the cross-section of a member (for example, the liquid crystal panel or a portion thereof) including each of the constituent members was exposed by a common method such as an ion beam or a microtome. Then, the exposed cross-section was observed using SEM. During the cross-section observation, the cross-section was divided into four equal parts in the width direction of the member, and the arithmetic mean of thicknesses at three points of divisions except for both ends was calculated and adopted as the thickness of various films.

interference unevenness is not different from that of Comparative Example 1, and the suppression of the interference unevenness is insufficient.

In contrast, in all of the optical films according to the embodiment of the present invention of Examples 1 to 9 obtained by bonding the resin film (A) and the resin film (C) with the adhesive layer (B) containing a polysaccharide, the interference unevenness was sufficiently suppressed, the recess was not generated even after 1000 keystrokes (evaluations A to C), and the keystroke durability was also excellent.

TABLE 3

| | First resin film (A) | | | Adhesive layer (B) | | | |
|---|---|---|---|---|---|---|---|
| | Type of resin, | Modulus of elasticity Gpa | Refractive index | Liquid No. | Type of resin, Additive | Degree of substitution | Modulus of elasticity Gpa | Refractive index |
| Example 1 | TAC | 4.8 | 1.49 | A-1 | Amylose | 0 | 4.5 | 1.50 |
| Example 2 | TAC | 4.8 | 1.49 | A-2 | DAC | 1.8 | 4.9 | 1.50 |
| Example 3 | TAC | 4.8 | 1.49 | A-3 | CMC | 1.4 | 3.2 | 1.51 |
| Example 4 | TAC | 4.8 | 1.49 | A-4 | HPMC | 1.5 | 3.0 | 1.49 |
| Example 5 | PMMA | 3.2 | 1.50 | A-5 | HEC-1 | 2.3 | 3.7 | 1.50 |
| Example 6 | TAC | 4.8 | 1.49 | A-6 | HPC | 2.8 | 3.4 | 1.47 |
| Example 7 | TAC | 4.8 | 1.49 | A-7 | HEC-2 | 2.7 | 3.7 | 1.50 |
| Example 8 | TAC | 4.8 | 1.49 | A-5 | HEC-1 | 2.3 | 3.7 | 1.50 |
| Example 9 | TAC | 4.8 | 1.49 | A-8 | HEC-1, Boric acid | 2.3 | 3.7 | 1.51 |
| Comparative Example 1 | TAC | 4.8 | 1.49 | A-9 | PVA-117H | — | 1.7 | 1.52 |
| Comparative Example 2 | TAC | 4.8 | 1.49 | A-10 | PVA-117H Boric acid | — | 1.7 | 1.52 |

| | Second resin film (C) | | | Evaluation | | |
|---|---|---|---|---|---|---|
| | Type of resin | Modulus of elasticity Gpa | Refractive index | Adhesiveness | Keystroke durability | Interference unevenness |
| Example 1 | TAC | 4.8 | 1.49 | B | C | A |
| Example 2 | TAC | 4.8 | 1.49 | B | B | A |
| Example 3 | TAC | 4.8 | 1.49 | B | B | C |
| Example 4 | TAC | 4.8 | 1.49 | A | B | A |
| Example 5 | PMMA | 3.2 | 1.50 | A | B | A |
| Example 6 | TAC | 4.8 | 1.49 | A | A | C |
| Example 7 | TAC | 4.8 | 1.49 | A | A | A |
| Example 8 | TAC | 4.8 | 1.49 | A | A | A |
| Example 9 | TAC | 4.8 | 1.49 | AA | A | B |
| Comparative Example 1 | TAC | 4.8 | 1.49 | A | D | D |
| Comparative Example 2 | TAC | 4.8 | 1.49 | AA | C | D |

In Table 3, all of the optical films of examples and comparative examples have the first resin film (A), the first HC layer (HC layer 1) having a thickness of 15 μm, and the second HC layer (HC layer 2) having a thickness of 5 μm that are laminated in this order.

The degree of substitution means the degree of substitution of the polysaccharide constituting the adhesive layer (B).

As described in Table 3, in the optical film of Comparative Example 1, the resin film (A) and the resin film (C) are bonded by the adhesive layer (B) containing polyvinyl alcohol. In the optical film, interference unevenness was insufficiently suppressed, and a recess was generated during 1000 keystrokes (evaluation D), and the keystroke durability was also insufficient. The optical film of Comparative Example 2 is obtained by boric acid crosslinking of the polyvinyl alcohol contained in the adhesive layer (B) with respect to the optical film of Comparative Example 1. Although the optical film is excellent in adhesiveness, the In a case where the optical film of the embodiment of the present invention is used for the front panel of an image display apparatus, the image display apparatus, the mirror with an image display function, the resistive film-type touch panel, and the capacitance-type touch panel, it is considered that in the front panel and the like, the interference unevenness is sufficiently suppressed, the excellent keystroke durability is exhibited, and the manufacturing suitability is excellent.

EXPLANATION OF REFERENCES

1A: first resin film
1B: second resin film
2A: adhesive layer
3A: hard coat layer (HC layer)
4A, 4B: optical film
1: conductive film for touch panel
2: touch panel
4C: optical film
5: transparent insulating substrate 6A, 6B: conductive member
7A, 7B: protective layer
8: first conductive layer
9: second conductive layer
11A: first dummy electrode
11: first electrode
12: first peripheral wiring
13: first external connection terminal
14: first connector portion
15: first metal thin wire
21: second electrode
22: second peripheral wiring
23: second external connection terminal
24: second connector portion
25: second metal thin wire
C1: first cell
C2: second cell
D1: first direction
D2: second direction
M1: first mesh pattern
M2: second mesh pattern
S1: active area
S2: peripheral region

What is claimed is:

1. An optical film comprising, at least:
a first resin film;
an adhesive layer disposed on one side of the first resin film; and
a second resin film disposed on the adhesive layer,
wherein the adhesive layer contains a polysaccharide, and
the polysaccharide is a cellulose ether compound represented by Molecular formula (1), $$[C_6H_7O_2(OH)_{3-m}(OR)_m]_n \quad \text{Molecular formula (1),}$$

in the formula, R represents $*\!-\!(R^1O)_{p1}H$, $R^1$ represents a hydrocarbon group, p1 is an integer of 1 to 15, $*$ represents a binding site; and
m is 0.8 to 3 and n is 20 to 2,000.

2. The optical film according to claim 1,
wherein the first resin film and the second resin film are a cellulose ester resin film.

3. The optical film according to claim 2,
wherein the cellulose ester resin film is a cellulose acylate resin film.

4. A front panel of an image display apparatus, comprising:
the optical film according to claim 1.

5. An image display apparatus comprising:
the front panel according to claim 4; and
an image display device.

6. The image display apparatus according to claim 5,
wherein the image display device is a liquid crystal display device.

7. The image display apparatus according to claim 5,
wherein the image display device is an organic electroluminescence display device.

8. The image display apparatus according to claim 5,
wherein the image display device is an in-cell touch panel display device.

9. The image display apparatus according to claim 5,
wherein the image display device is an on-cell touch panel display device.

10. A resistive film-type touch panel comprising:
the front panel according to claim 4.

11. A capacitance-type touch panel comprising:
the front panel according to claim 4.

12. A mirror with an image display function using the image display apparatus according to claim 5.

* * * * *